United States Patent [19]
Yoshida et al.

[11] Patent Number: 5,400,114
[45] Date of Patent: Mar. 21, 1995

[54] REAR-PROJECTION SCREEN AND A REAR PROJECTION IMAGE DISPLAY EMPLOYING THE REAR-PROJECTION SCREEN

[75] Inventors: Takahiko Yoshida, Miura; Koji Hirata, Kamakura; Hiroki Yoshikawa, Hiratsuka; Masayuki Muranaka, Yokohama; Isao Yoshizaki, Yokohama; Atsuo Osawa, Yokohama, all of Japan

[73] Assignee: Hitachi, Ltd., Tokyo, Japan

[21] Appl. No.: 938,861

[22] Filed: Sep. 1, 1992

[30] Foreign Application Priority Data

| Sep. 5, 1991 | [JP] | Japan | 3-252831 |
| Oct. 28, 1991 | [JP] | Japan | 3-307230 |
| Dec. 24, 1991 | [JP] | Japan | 3-355569 |
| Jun. 1, 1992 | [JP] | Japan | 4-140388 |

[51] Int. Cl.$^6$ ............................................. G03B 21/60
[52] U.S. Cl. .................................. 359/457; 359/460
[58] Field of Search ............... 359/453, 457, 455, 456, 359/460

[56] References Cited

U.S. PATENT DOCUMENTS

| 4,054,907 | 10/1977 | Itoh et al. | 358/60 |
| 4,432,010 | 2/1984 | Oguino | 358/60 |
| 4,536,056 | 8/1985 | Oguino | 350/128 |
| 4,762,393 | 8/1988 | Gerritsen et al. | 350/128 |
| 4,919,515 | 4/1990 | Hasegawa et al. | 350/128 |

FOREIGN PATENT DOCUMENTS 58-3530  1/1983  Japan.
58-93043 6/1983  Japan.

*Primary Examiner*—Richard A. Wintercorn
*Attorney, Agent, or Firm*—Fay, Sharpe, Beall, Fagan, Minnich & McKee

[57] ABSTRACT

A rear-projection screen for a rear-projection image display comprising a Fresnel lens sheet (2) and a lenticular lens sheet (3), or a Fresnel lens sheet (2), a lenticular lens sheet (3) and a light absorbing sheet (4). The entrance surface (21) of the Fresnel lens sheet (2) or the entrance surface (41) of the light absorbing sheet (4) is formed by contiguously and vertically arranging a plurality of horizontally elongate lenticular lenses. The thickness of the Fresnel lens sheet (2) is approximately equal to that of the lenticular lens sheet (3). The entrance surface (31) and the exit surface (32) of the lenticular lens sheet (3) are formed by contiguously and horizontally arranging a plurality of vertically elongate lenticular lenses. Particles of a light diffusing material, which is essential to the prior art rear-projection screen, are not necessarily dispersed in the base sheet (30) of the lenticular lens sheet (3). The rear-projection image display provided with this rear-projection screen has satisfactory focusing characteristics and enhanced vertical directional characteristics and is capable of displaying an image in high brightness and high contrast.

37 Claims, 35 Drawing Sheets

FIG. 38a  FIG. 38b  FIG. 38c
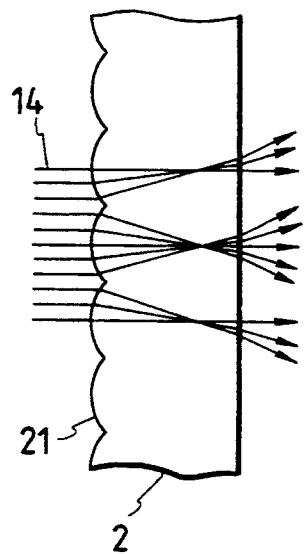
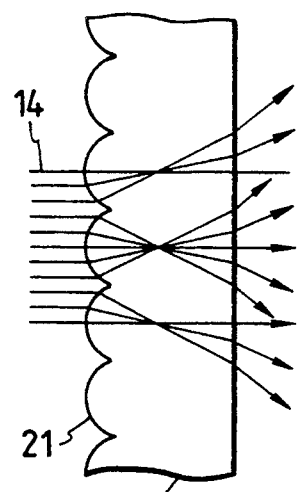
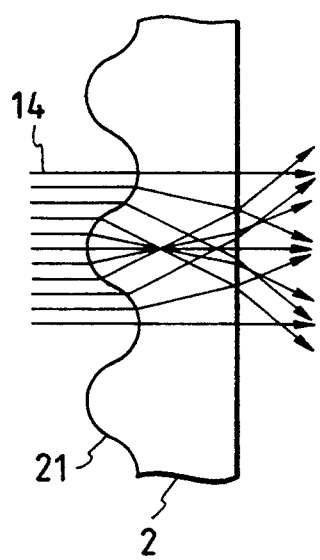
FIG. 39
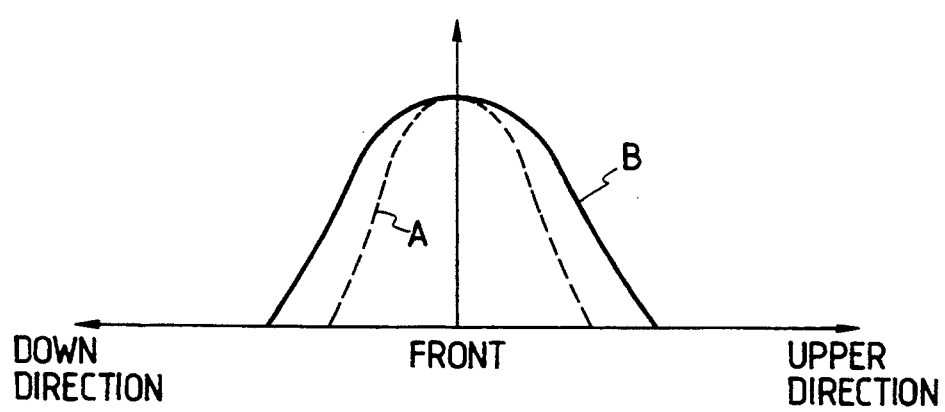
VERTICAL VIEWING ANGLE β (DEGREE)

REAR-PROJECTION SCREEN AND A REAR PROJECTION IMAGE DISPLAY EMPLOYING THE REAR-PROJECTION SCREEN

BACKGROUND OF THE INVENTION

The present invention relates to a rear-projection screen and a rear-projection image display employing the rear-projection screen.

A rear-projection image display, such as a rear-projection television set, magnifies an image displayed on a small video source, such as a projection CRT (cathode-ray tube) or a liquid crystal display, by a projection lens and projects the image on a rear-projection screen. The image quality of the rear-projection image display has been greatly improved in recent years, and rear-projection image displays have come into wide use in the domestic and industrial fields.

When the rear-projection image display uses a projection CRT as a video source, an image of the three primary colors is composed on a rear-projection screen by combining red, green and blue images by the combined function of a CRT and a projection lens to display the image in a sufficiently high brightness on the rear-projection screen.

As stated in Japanese Patent Laid-open (Kokai) Nos. 56-117226 and 58-93043, such a rear-projection image display employs a two-layer laminated rear-projection screen consisting of a Fresnel lens sheet and a lenticular lens sheet. The lenticular lens sheet includes a diffusion material dispersed in particles in the lenticular sheet or formed in a diffusion layer over the surface of the lenticular lens.

FIG. 1 is a perspective view of an essential portion of a prior art rear-projection screen.

Referring to FIG. 1, a rear-projection screen 1 consists of a Fresnel lens sheet 2 and a lenticular lens sheet 3'. A video source, such as the screen of a CRT, is disposed behind the Fresnel lens sheet 2. The respective base sheets of the Fresnel lens sheet 2 and the lenticular lens sheet 3' are formed of a transparent, thermoplastic resin. Particles of a diffusion material 15 are dispersed in the base sheet of the lenticular lens sheet 3'. The Fresnel lens sheet 2 has an entrance surface 21 and an exit surface 22. The entrance surface 21 has the shape of a vertical arrangement of a plurality of horizontally elongate lenticular lenses each having the shape of a portion of a cylinder, and the exit surface 22 has the shape of the stepped setbacks of a Fresnel lens.

The lenticular lens sheet 3' has an entrance surface 31 formed by horizontally arranging a plurality of first vertically elongate lenticular lenses, and an exit surface 32 formed by horizontally arranging a plurality of second vertically elongate lenticular lenses substantially similar to the first vertically elongate lenticular lenses, and a plurality of ridges 33 formed between the adjacent second vertically elongate lenticular lenses, respectively. The upper surface of each ridge 33 is coated with a black, light absorbing strip 16.

Light rays emitted from points on an image displayed on the screen of a projection CRT travel through a projection lens, not shown, and fall on the entrance surface 21 of the Fresnel lens sheet 2. If the entrance surface 21 is a flat plane, the light rays emerging from the exit surface 22 of the Fresnel lens 2 are collimated substantially by the Fresnel lens forming the exit surface 22 of the Fresnel lens sheet 2, and then the substantially parallel light rays fall on the lenticular lens sheet 3'.

The parallel light rays are directed toward a focus near the second vertically elongate lenticular lenses forming the exit surface 32 by the first vertically elongate lenticular lenses forming the entrance surface 31, the light rays are diffused horizontally from the focus, the light rays are diffused vertically and horizontally by the particles of the diffusion material 15 dispersed in the base sheet of the lenticular lens sheet 3', and emerges from the surface of the lenticular lens sheet 3' on the image viewing side.

However, since the entrance surface 21 of the Fresnel lens sheet 2 is formed of the horizontally elongate lenticular lenses as shown in FIG. 1, the light rays falling on the entrance surface 21 of the Fresnel lens sheet 2 are diffused vertically by the horizontally elongate lenticular lenses, and the light rays are further diffused vertically by the particles of the diffusion material 15 dispersed in the base sheet of the lenticular lens sheet 3'.

The horizontally elongate lenticular lenses forming the entrance surface 21 of the Fresnel lens sheet 2 will be described in detail hereinafter.

Referring to FIG. 2 showing the Fresnel lens sheet 2 of the rear-projection screen 1 of FIG. 1 in a vertical sectional view, the entrance surface 21 of the Fresnel lens sheet 2 is formed, as mentioned above, by vertically arranging the plurality of horizontally elongate lenticular lenses at a pitch smaller than the pitch of scanning lines of the projected image or that of picture elements. The pitch of the lenticular lenses is determined so that moiré resulting from interference between the lenticular lenses and the scanning lines and moiré resulting from interference between the lenticular lenses and portions of the rings of the Fresnel lens of the Fresnel lens sheet 2, corresponding to the upper and lower portions of the screen are minimized. More concretely, the horizontally elongate lenticular lenses are arranged at a pitch far smaller than those of the first vertically elongate lenticular lenses and the second vertically elongate lenticular lenses of the lenticular lens sheet 3', and the pitch of the horizontally elongate lenticular lenses is determined so that the ratio between the pitch of the scanning lines and the pitch of the horizontally elongate lenticular lens is not the ratio of simple integers.

For example, if the rear-projection screen is 800 mm in horizontal size and 600 mm in vertical size, the horizontal pitch of the first vertically elongate lenticular lenses and the second vertically elongate lenticular lenses is 0.78 mm, and the number of horizontal scanning lines on the rear-projection screen is 480, the pitch of the scanning lines is 1.25 mm. In most cases, the pitch of the rings of the Fresnel lens is in the range of about 0.1 mm to about 0.12 mm, and the pitch of the horizontally elongate lenticular lenses is in the range of about 0.08 mm to about 0.1 mm, when the pitch of scanning lines is 1.25 mm.

When the incident light rays 14 fall on the horizontally elongate lenticular lenses forming the entrance surface 21, the angle of incidence of the light rays 14 for the same scanning line or the same picture element is dependent on the point of incidence. Accordingly, the light rays 14 are refracted at different angles of refraction, so that the incident light rays 14 are diffused vertically. Furthermore, if the radius of curvature of the horizontally elongate lenticular lens is relatively small, the incident angles of the incident light rays are relatively large and, consequently, the light rays 14 are diffused in a greater angular range and the vertical viewing angle increases.

The vertically elongate lenticular lenses forming the entrance surface 31 and exit surface 32 of the lenticular lens sheet 3' will be described in detail hereinafter.

Referring to FIGS. 3 and 4 showing the lenticular lens sheet 3' of the rear-projection screen 1 of FIG. 1 in horizontal sectional views, the surface of each first vertically elongate lenticular lens forming the entrance surface 31 (FIG. 1) is a portion of the surface of an elliptic cylinder of a cross section having the shape of an ellipse having a major axis extending in the direction of the thickness of the lenticular lens sheet 3', i.e. along a line 1—1', having one focus positioned within the base sheet and the other focus positioned near the exit surface 32. The eccentricity e of the ellipse is approximately equal to the reciprocal of the refractive index n of the base sheet.

As shown in FIG. 3, all the green rays falling on the first vertically elongate lenticular lens in parallel to the major axis of the ellipse converge on the focus positioned near the exit surface 32, and then the green rays diverge horizontally from the focus. As shown in FIG. 4, all the red and blue rays falling on the first vertically elongate lenticular lens at an angle to the major axis of the ellipse converge on the focus positioned on the exit surface 32, and then the red and blue rays diverge horizontally from the focus.

The surface of each second vertically elongate lenticular lens forming the exit surface 32 is a portion of the surface of an elliptic cylinder substantially resembling the mirror image of the surface of the corresponding first vertically elongate lenticular lens. The second vertically elongate lenticular lens makes the horizontal directional characteristics of the emerging red, green and blue rays parallel to each other.

The light diffusion material 15 dispersed in the base sheet of the lenticular lens sheet 3', i.e. a lenticular lens sheet 3' containing dispersed particles of the light diffusing material 15, will be described in detail hereinafter.

Referring to FIGS. 5a and 5b showing the lenticular lens sheet 3' of the rear-projection screen 1 of FIG. 1 in a vertical sectional view and a horizontal sectional view, respectively, particles of the light diffusing material 15 are dispersed in the base sheet of the lenticular lens sheet 3' to diffuse the incident light rays 14 vertically and horizontally while the incident light rays 14 travel from the entrance surface 31 to the exit surface 32. The angular range of diffusion of the light rays 14 increases, the directional characteristics are widened and the viewing angle increases with the increase of the quantity of the light diffusing material 15 contained in the base sheet of the lenticular lens sheet 3'.

Some problems in the foregoing prior art transparent screen TS to be solved will be described hereinafter.

First problem is insufficient range in the vertical viewing angle and the horizontal viewing angle.

Referring to FIG. 6, the vertical viewing angle and the horizontal viewing angle are 0° when the viewing position is on a line FD, i.e., a perpendicular at an image point on the rear-projection screen TS. The brightness of the image point on the rear-projection screen TS as viewed from the viewing position on the line FD is $B_0$, and the brightness of the image point as viewed from a viewing position on a line extending at a horizontal angle $\alpha$ is $B_\alpha$. Then, the relative brightness $H=B_\alpha/B_0$. Similarly, the brightness of the image point as viewed from a viewing position on a line extending at a vertical viewing angle $\beta$ is $B_\beta$ and the relative brightness $H=B_\beta/B_0$.

If the relative brightness H is smaller than a threshold, the image point is scarcely visible. The ranges of the horizontal viewing angle $\alpha$ and the vertical viewing angle $\beta$, in which the image point is visible, will be referred to as a horizontal angular range HR of visibility and a vertical angular range VR of visibility, respectively. The horizontal viewing angle $\alpha$ and the vertical viewing angle $\beta$ making the relative brightness $H=B_\alpha/B_0=50\%$ and the relative brightness $H=B_\beta/B_0=50\%$ will be referred to as a specific horizontal viewing angle and a specific vertical viewing angle.

FIG. 7 is a graph showing the directional characteristics of the prior art rear-projection screen, in which the horizontal viewing angle $\alpha$ and the vertical viewing angle $\beta$ are measured on the horizontal axis, a curve indicated by continuous lines represents horizontal directional characteristics, and a curve indicated by broken lines represents vertical directional characteristics.

As shown in FIG. 7, the image point on the rear-projection screen is invisible when the horizontal viewing angle $\alpha$ is outside an angular range of $\pm 47°$ or when the vertical viewing angle $\beta$ is outside an angular range of $\pm 25°$. The specific vertical viewing angle, at which the relative brightness $H=B_\beta/B_0=50\%$, is as small as on the order of $\pm 9°$.

FIG. 8 is a graph showing the vertical directional characteristics of the horizontally elongate lenticular lens of the Fresnel lens sheet 2 of the prior art rear-projection screen.

As shown in FIG. 8, the prior art rear-projection screen having the Fresnel lens sheet 2 provided with horizontally elongate lenticular lenses having a radius of curvature on the order of 0.3 mm has a vertical angular range of visibility on the order of $\pm 4°$. The combined functions of the horizontally elongate lenticular lenses and the light diffusing material dispersed in the base sheet of the lenticular lens sheet 3 makes the vertical angular range of visibility of the rear-projection screen $\pm 25°$.

FIG. 9 is a graph showing desirable directional characteristics of a rear-projection screen.

As shown in FIG. 9, the vertical directional characteristics and the horizontal directional characteristics are wider than those of the prior art rear-projection screen, and both the desirable horizontal angular range of visibility and the desirable vertical angular range of visibility are on the order of $\pm 70°$.

The expansion of the vertical directional characteristics and increase in the specific vertical viewing angle to improve the directional characteristics of the prior art rear-projection screen can be achieved by increasing the quantity of the light diffusing material 15 contained in the base sheet of the lenticular lens sheet 3' or reducing the radius of curvature of the horizontally elongate lenticular lenses forming the entrance surface 21 of the Fresnel lens sheet 2.

However, increase in the quantity of the light diffusing material 15 contained in the base sheet of the lenticular lens sheet 3' of the prior art rear-projection screen entails the following problems.

FIG. 10 is a vertical sectional view of the rear-projection screen of FIG. 1, showing the vertical diffusion of the incident light rays 14.

As shown in FIG. 10, the incident light rays 14 falling on the Fresnel lens sheet 2 are refracted and diffused vertically by the horizontally elongate lenticular lenses forming the entrance surface 21. The diffused light rays fall on the lenticular lens sheet 3'. Since the diffused light rays are further diffused by the light diffusing material 15 contained in the base sheet of the lenticular lens sheet 3' as the diffused light rays travel through the lenticular lens sheet 3', the width d of the light rays outgoing from the lenticular lens sheet 3' is greater than the width of the incident light rays 14, and the width of the scanning line or the size of the picture element is increased on the exit surface 32 and, consequently, the image focusing characteristics is deteriorated.

If the quantity of the light diffusing material 15 contained in the base sheet of the lenticular lens sheet 3' is increased to enhance the vertical directional characteristics of the rear-projection screen, the width of the scanning line or the size of the picture element will be further increased on the exit surface 32 of the lenticular lens sheet 3' and, consequently, the image focusing characteristics will be further deteriorated.

As shown in FIGS. 5a, 5b and 10, the incident light rays 14 undergo not only diffusion but also scattering in the lenticular lens sheet 3' containing the light diffusing material 15. Therefore, some of the light rays 14 are reflected toward the entrance surface 31 (FIG. 10), stray in the lenticular lens sheet 3' or are absorbed by the light absorbing strips 16. Such light rays are unable to reach the foci positioned near the exit surface 32 and unable to emerge from the exit surface 32, which reduces the brightness of the rear-projection screen. The degree of reduction in the brightness increases with increase in the light diffusing material content of the base sheet of the lenticular lens sheet 3'.

The light rays among the incident light rays 14, scattered by the light diffusing material 15 and strayed in the lenticular lens sheet 3' are unnecessarily reflected repeatedly in the projecting optical system and some of them finally reach the exit surface 32 of the lenticular lens sheet 3' to deteriorate the contrast of the image. Although nearly half of the ambient light, such as illuminating light, is absorbed by the light absorbing strips 16 formed on the exit surface 32 of the lenticular lens sheet 3' the ambient light falling on the second vertically elongate lenticular lenses forming the exit surface 32 is reflected diffusibly by the light diffusing material 15, which also deteriorates contrast in the image. Thus, the effect of the light diffusing material 15 on the deterioration of contrast is significant.

Reduction in the radius of curvature of the horizontally elongate lenticular lenses forming the entrance surface 21 of the Fresnel lens sheet 2 of the prior art rear-projection screen of FIG. 1 entails the following problems.

As shown in FIG. 10, the incident light rays 14 falling on the Fresnel lens sheet 2 are refracted and diffused vertically by the horizontally elongate lenticular lenses forming the entrance surface 21, the vertically diffused light rays fall on the lenticular lens sheet 3', and the vertically diffused light rays are further diffused by the light diffusing material 15 dispersed in the base sheet of the lenticular lens sheet 3'. Accordingly, the width d of the light rays on the exit surface 32 of the lenticular lens sheet 3' is greater than that of the incident light rays 14 on the entrance surface 21 of the Fresnel lens sheet 2. Consequently, the width of a scanning line or the size of a picture element is increased on the exit surface 32 to deteriorate the image focusing characteristics.

If the radius of curvature of the horizontally lenticular lenses forming the entrance surface 21 of the Fresnel lens sheet 2 is reduced to enhance the vertical directional characteristics, the width of a scanning line or the size of a picture element on the exit surface 32 of the lenticular lens sheet 3' is further increased.

Thus, it is impossible to enhance the vertical directional characteristics of the prior art rear-projection screen without deteriorating the image focusing characteristics, brightness and contrast.

Second problem is the reduction of color shift. Color shift is the variation of the color of an image according to the horizontal viewing angle $\alpha$ resulting from change in the color balance of the three primary colors, i.e., red, green and blue, due to slight difference between the respective directional characteristics of the three primary colors when the red, green and blue light rays are diffused horizontally by the lenticular lens sheet 3, details of which will be given later.

As mentioned above, the surfaces of the second vertically elongate lenticular lenses forming the exit surface 32 of the lenticular lens sheet 3 make the incident red, green and blue rays substantially parallel to each other. Such a function of the vertically elongate lenticular lenses reduces color shift to some extent. However, the effect of this function is not necessarily satisfactory.

FIG. 11 is a graph showing the directional characteristics of the lenticular lens sheet 3' of FIG. 4 for red rays and blue rays.

As shown in FIG. 11, the difference in relative brightness between red rays and blue rays for horizontal viewing angle $\alpha = 45°$ is 50% and such a large difference causes color shift. Accordingly, the difference in relative brightness between red rays and blue rays needs to be reduced greatly.

Thus, the degree of color shift with the prior art rear-projection screen is not small enough.

Third problem is the minimization of moiré. As mentioned above, efforts are made in determining the dimensions of the components of the prior art rear-projection screen relating with moiré, including the pitch of the horizontally elongate lenticular lenses so that moiré may be minimized. However, the effect of the efforts on minimizing moiré is not necessarily satisfactory, because horizontal bright lines and horizontal dark lines are formed alternately on the exit surface 22 of the Fresnel lens sheet 2 of the rear-projection screen due to the light focusing characteristics of the horizontally elongate lenticular lenses, the details of which will be given later.

Thus, the prior art rear-projection screen is unable to minimize moiré satisfactorily to a small extent.

SUMMARY OF THE INVENTION

The present invention has been made in view of the foregoing problems in the prior art rear-projection screen and it is therefore an object of the present invention to provide a rear-projection screen capable of focusing an image satisfactorily, of displaying the image in a sufficiently high brightness and high contrast and of minimizing color shift and moiré to a satisfactorily small extent, and having high vertical directional characteristics.

Another object of the present invention is to provide a rear-projection image display employing a rear-projection screen capable of focusing an image satisfactorily, of displaying the image in a sufficiently high brightness and high contrast and of minimizing color shift and moiré to a satisfactorily small extent, and having high vertical directional characteristics.

In one aspect of the present invention, a rear-projection screen for a rear-projection image display is of a two-layer laminated structure consisting of a Fresnel lens sheet and a lenticular lens sheet or of a three-layer laminated structure consisting of a Fresnel lens sheet, a lenticular lens sheet and a semitransparent, colored light absorbing sheet superposed in that order. ①Either the entrance surface or the exit surface of the Fresnel lens sheet, or ② the entrance surface of the light absorbing sheet, or both said ① and ② are formed by vertically arranging a plurality of horizontally elongate lenticular lenses. The horizontally elongate lenticular lenses are horizontally elongate convex lenticular lenses convex toward a video source and horizontally elongate concave lenticular lenses concave toward the video source, which are arranged alternately.

The incident light rays are diffused vertically primarily by the horizontally elongate lenticular lenses forming the entrance surface of the Fresnel lens sheet, by the horizontally elongate lenticular lenses forming the entrance surface of the light absorbing sheet, or by both the horizontally elongate lenticular lens forming the entrance surface, and the incident light rays are diffused vertically secondarily by a light diffusing material contained in the lenticular lens sheet or a light diffusing material contained in the light absorbing sheet.

The thickness of the Fresnel lens sheet is smaller than that of the Fresnel lens sheet of the prior art rear-projection screen and 2.5 times the thickness of the lenticular lens sheet or below. When the light absorbing sheet is used, the thickness of the light absorbing sheet is greater than those of the Fresnel lens sheet and the lenticular lens sheet.

In a second aspect of the present invention, a rear-projection image display comprises: the rear-projection screen in the first aspect of the present invention; a projection lens unit comprising a plurality of lenses including a convexo-concave lens disposed nearest to a video source with its convex surface facing the video source; a coupler connecting the projection lens unit to the video source; and a liquid coolant sealed in a space formed in the coupler between the convexo-concave lens of the projection lens unit and the video source.

The sealed liquid coolant improves the contrast of the image.

The rear-projection image display may additionally comprise a reflecting mirror consisting of a base and a reflective optical thin film and disposed in a projection light passage between the projection lens unit and the rear-projection screen with the reflective optical thin film facing the projection lens unit and the rear-projection screen.

The reflecting mirror with the reflective optical thin film facing the projection lens unit and the rear-projection screen improves image focusing characteristics.

BRIEF DESCRIPTION OF THE DRAWINGS

The above and other objects, features and advantages of the present invention will become more apparent from the following description taken in connection with the accompanying drawings, in which:

FIGS. 38a, 38b and 38c are vertical sectional views of a Fresnel lens sheet included in a prior art rear-projection screen, a Fresnel sheet included in the rear-projection screen of FIG. 35 and a Fresnel lens sheet included in the rear-projection screen of FIG. 36, respectively;

FIG. 39 is a graph showing the vertical directional characteristics of a rear-projection screen employing the horizontally elongate lenticular lens of FIG. 38;

DESCRIPTION OF THE PREFERRED EMBODIMENTS

Figure 1:
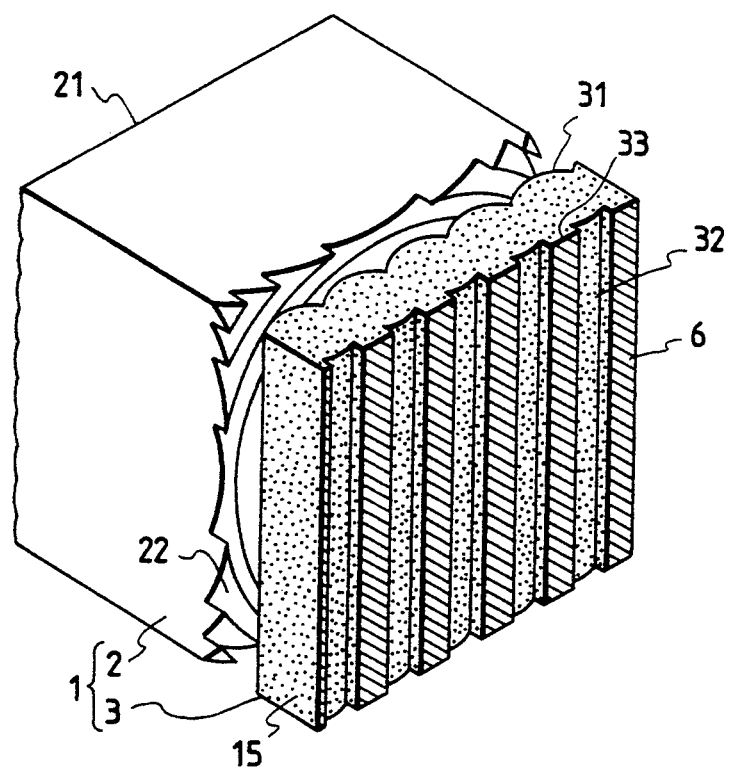
FIG. 1 is a perspective view of an essential portion of a prior art rear-projection screen.
Figure 2:
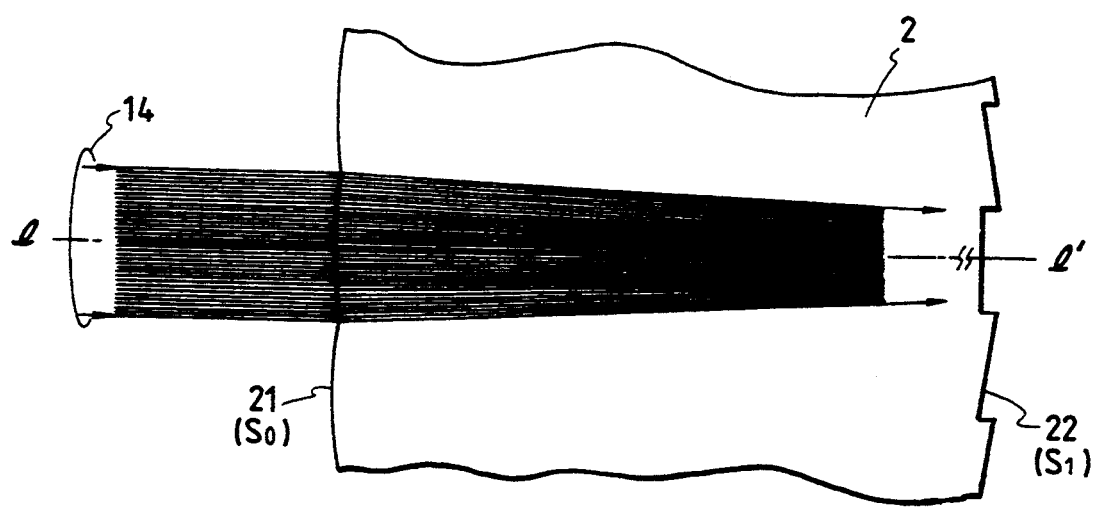
FIG. 2 is a vertical sectional view of a Fresnel lens sheet included in the prior art rear-projection screen.
Figure 3:
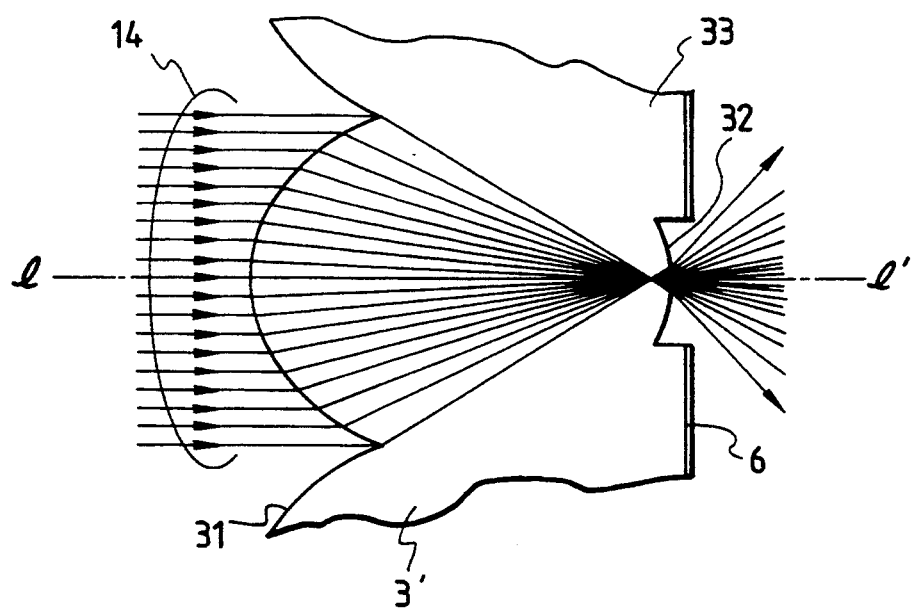
FIG. 3 is a horizontal sectional view of a lenticular lens sheet in the prior art rear-projection screen.
Figure 4:
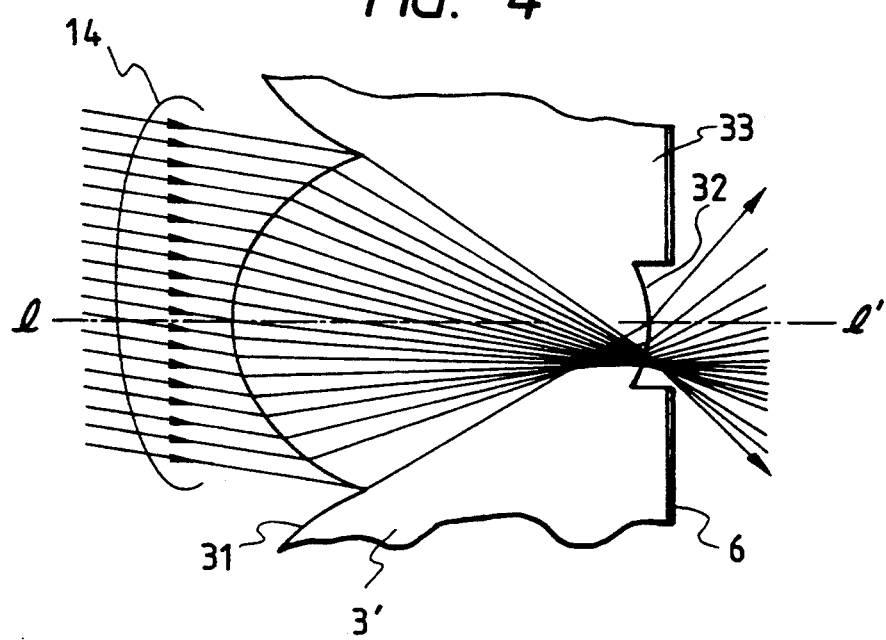
FIG. 4 is a horizontal sectional view of a lenticular lens sheet of the prior art rear-projection screen.
Figure 5A:
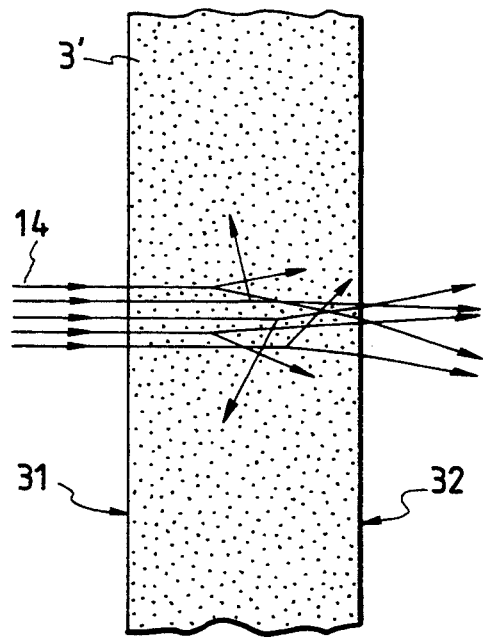
FIGS. 5a and 5b are a vertical sectional view and a horizontal sectional view, respectively, of a lenticular lens sheet included in the prior art rear-projection screen.
Figure 5B:
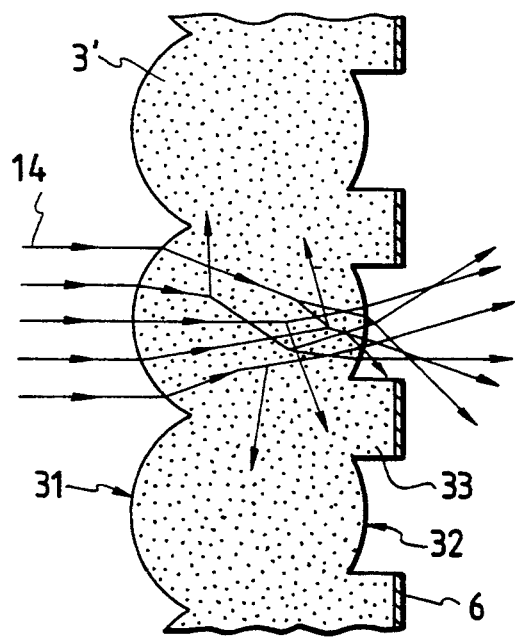
Figure 6:
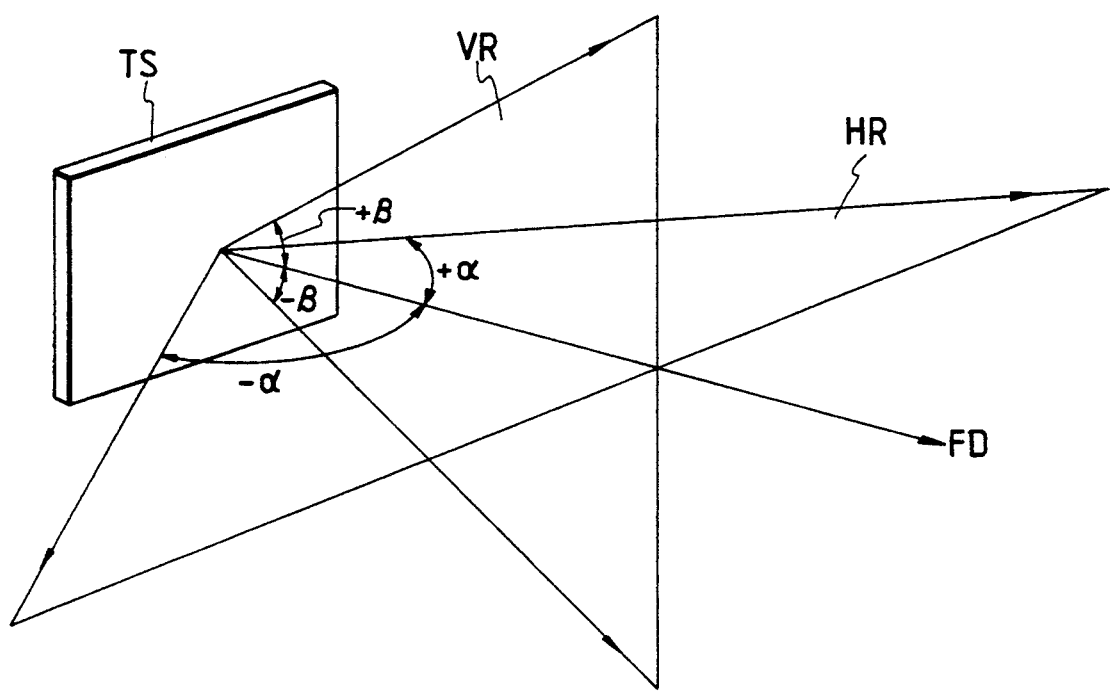
FIG. 6 is a perspective view of assistance in explaining horizontal viewing angle $\alpha$ and vertical viewing angle $\beta$.
Figure 7:
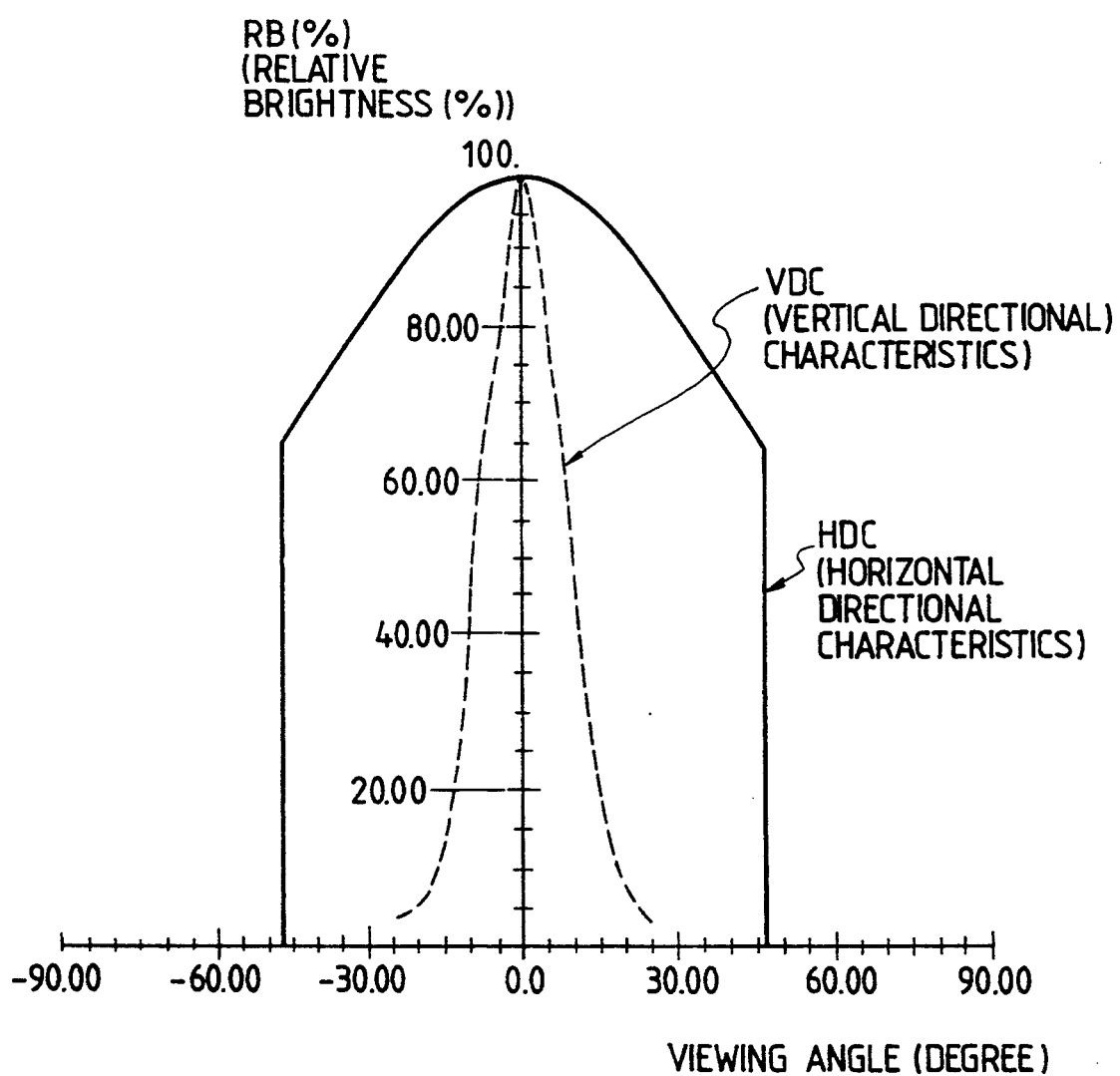
FIG. 7 is a graph showing the horizontal directional characteristics and the vertical directional characteristics Of the prior art rear-projection screen.
Figure 8:
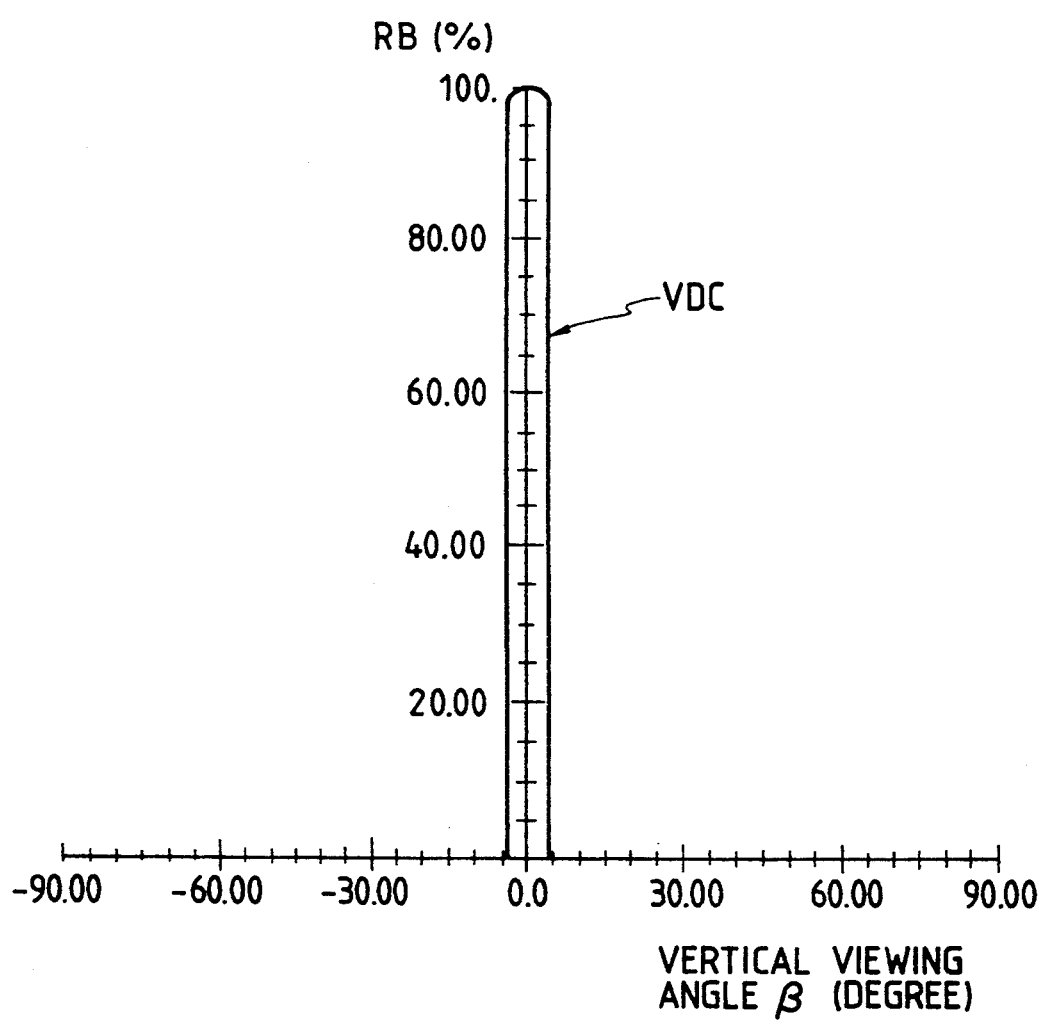
FIG. 8 is a graph showing the vertical directional characteristics of one of the horizontally elongate lenticular lenses of the Fresnel lens sheet of the prior art rear-projection screen.
Figure 9:
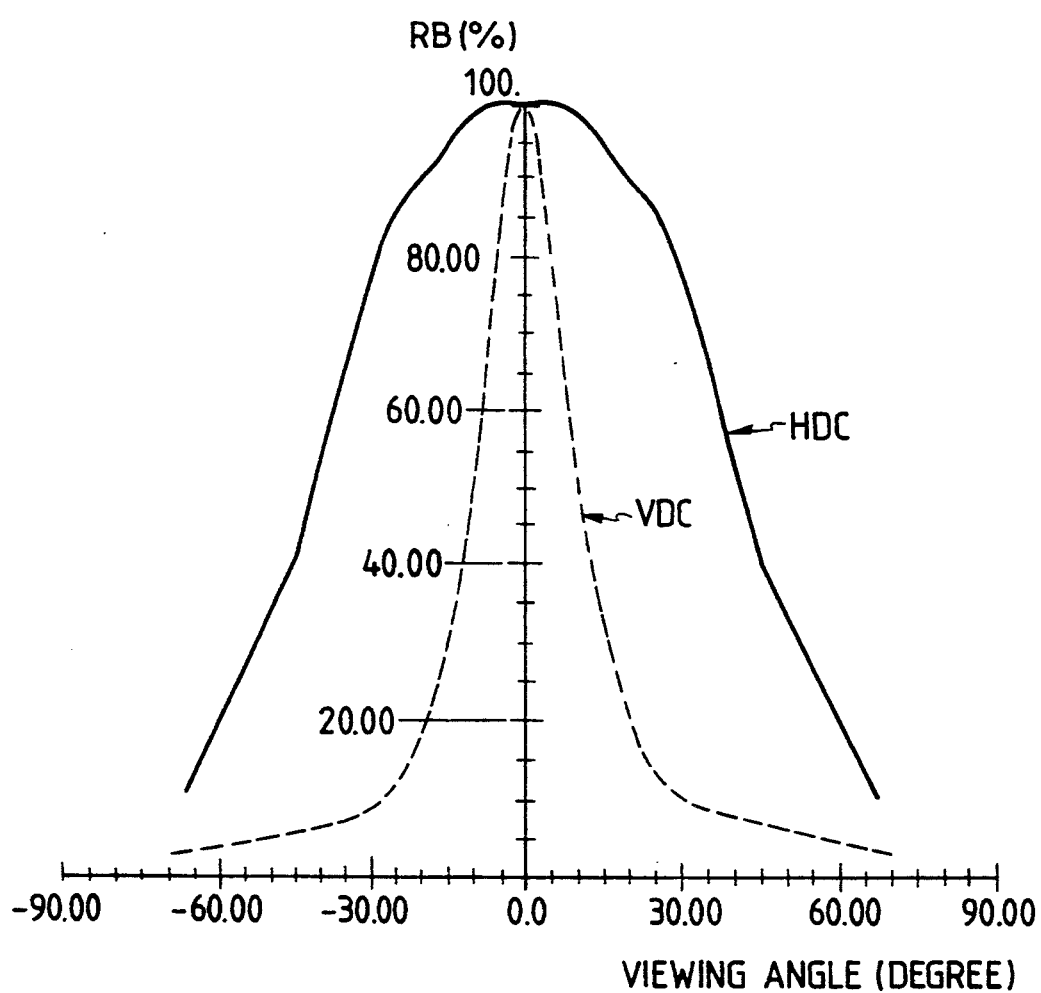
FIG. 9 is a graph showing ideal horizontal directional characteristics and ideal vertical directional characteristics of a rear-projection screen.

In a rear-projection image display provided with the foregoing rear-projection screen, light rays emitted by a video source, such as a projection CRT, travel through a projection lens unit and fall on the rear-projection screen, the Fresnel lens sheet collimates the light rays, the first vertically elongate lenticular lenses forming the entrance surface of the lenticular lens sheet and the second vertically elongate lenticular lenses forming the exit surface of the lenticular lens sheet diffuse the substantially parallel light rays horizontally and, if the rear-projection screen is provided with a light absorbing sheet, the horizontally diffused light rays travel through the light absorbing sheet and emerge from the rear-projection screen toward the viewing side.

Since the horizontal diffusion of the light rays is dependent on the shape of the vertically elongate lenticular lenses forming the entrance surface or the exit surface of the lenticular lens sheet, it is possible to enhance the horizontal directional characteristics of the rear-projection screen and to suppress color shift to the least extent.

Since the vertical diffusion of the light rays is dependent mainly on the shape of the horizontally elongate lenticular lenses forming the entrance surface or the exit surface of the Fresnel lens sheet or on the shape of the horizontally elongate lenticular lenses forming the entrance surface of the light absorbing sheet, it is possible to enhance the vertical directional characteristics and to increase the specific vertical viewing angle.

As stated above, according to the present invention, the vertical directional characteristics can be sufficiently enhanced by the horizontally elongate lenticular lenses of the Fresnel lens sheet or of the light absorbing sheet, the lenticular lens sheet or the light absorbing sheet need not contain any light diffusing material at all or needs to contain a light diffusing material in a very small light diffusing material content. Accordingly, a sharp image is displayed on the rear-projection screen. Since stray light rays occur scarcely due to the scatter of the incident light rays by the light diffusing material and the scatter of the ambient light by the light diffusing material occurs scarcely, the image can be displayed in a sufficiently high brightness and high contrast.

When the entrance surface of the Fresnel lens sheet is formed of horizontally elongate lenticular lenses, the Fresnel lens sheet is formed in a thickness approximately equal to that of the lenticular lens sheet to dispose the horizontally elongate lenticular lenses of the Fresnel lens sheet and the vertically elongate lenticular lenses forming the entrance surface of the lenticular lens sheet close to each other. Accordingly, the origin of horizontal diffusion of the light rays and the origin of vertical diffusion of the light rays are close to each other and hence the focusing characteristics are further improved.

If the rear-projection screen is provided with a semitransparent, colored light absorbing sheet on the surface thereof on the viewing side, the image light is subjected once to light absorption, whereby the quantity of the image light projected by the video source is reduced in proportion to the transmissivity of the light absorbing sheet. On the other hand, most part of the ambient light, such as illuminating light, goes into the light absorbing sheet and returns at least once and undergoes light absorption at least twice, whereby the quantity of the ambient light is reduced in proportion to the square of the transmissivity of the light absorbing sheet. Thus, the reduction of the ambient light is greater than that of the image light, and hence the contrast of the image exposed to the ambient light is improved.

A semitransparent, colored lenticular lens sheet may be employed for the same effect instead of a transparent lenticular lens sheet coated with a semitransparent, colored light absorbing sheet.

When the entrance surface of the Fresnel lens sheet is formed of horizontally elongate lenticular lenses that diffuse the incident light rays vertically, the sharpness of the image can be improved by forming the light absorbing sheet in a thickness greater than those of the Fresnel lens sheet and the lenticular lens sheet and forming the Fresnel lens sheet in a thickness smaller than that of the Fresnel lens sheet of the prior art rear-projection screen.

The sharpness of the image can be further improved by vertically diffusing the light rays primarily by the horizontally elongate lenticular lenses forming the entrance surface of the light absorbing sheet.

If the lenticular lenses forming the entrance surface or the exit surface of the Fresnel lens sheet are formed in an optimum shape to reduce the difference in brightness between a portion of having a high relative brightness and a portion having a low relative brightness in vertical brightness distribution on the exit surface to the least possible extent, moiré resulting from the interference between the horizontally elongate lenticular lenses and the Fresnel lens of the Fresnel lens sheet can be minimized.

A rear-projection screen in a first embodiment according to the present invention will be described hereinafter with reference to FIGS. 12 to 30.

Figure 12:
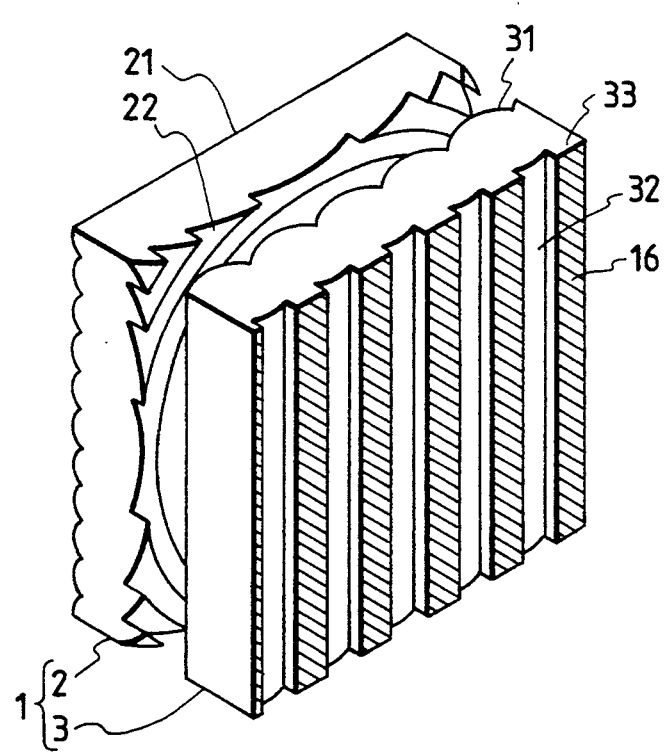
FIG. 12 is a perspective view of an essential portion of a rear-projection screen in a first embodiment according to the present invention.

Referring to FIG. 12, a rear-projection screen 1 consists of a Fresnel lens sheet 2 and a lenticular lens sheet 3. The Fresnel lens sheet 2 and the lenticular lens sheet 3 are fastened together at their ends. The respective base sheets of the Fresnel lens sheet 2 and the lenticular lens sheet 3 are formed of a substantially transparent, thermoplastic resin.

A plurality of first horizontally elongate lenticular lenses are arranged in a continuous vertical arrangement to form the entrance surface 21 of the Fresnel lens sheet 2. Stepped setbacks of a Fresnel lens are formed in the exit surface 22 of the Fresnel lens sheet 2.

A plurality of first vertically elongate lenticular lenses are arranged in a continuous horizontal arrangement to form the entrance surface 31 of the lenticular lens sheet 3. A plurality of second vertically elongate lenticular lenses are arranged substantially opposite to the first vertically elongate lenticular lenses, respectively, to form the exit surface 32 of the lenticular lens sheet 3. Ridges 33 are formed between the adjacent second vertically elongate lenticular lenses, and the top surfaces of the ridges 33 are coated with light absorbing strips 16 of a limited width, respectively.

This rear-projection screen is different from the prior art rear-projection screen of FIG. 1 in that the thickness of the Fresnel lens sheet 2 is smaller than that of the Fresnel lens sheet of the prior art rear-projection screen and approximately equal to that of the lenticular lens sheet 3, the shape of the first horizontally elongate lenticular lenses forming the entrance surface 21 of the Fresnel lens sheet 2, the shape of the first vertically elongate lenticular lenses forming the entrance surface 31 of the lenticular lens sheet 3 and the shape of the second vertically elongate lenticular lenses forming the exit surface 32 of the lenticular lens sheet 3 are of new designs, and the base sheet of the lenticular lens sheet 3 contains no light diffusing material.

The Fresnel lens sheet 2 of the rear-projection screen 1 of FIG. 12 will be described in detail.

The Fresnel lens forming the exit surface 22 of the Fresnel lens sheet 2 collimates red rays, green rays and blue rays of a projected image so that substantially parallel red rays, substantially parallel green rays and substantially parallel blue rays fall on the lenticular lens sheet 3.

Figure 13:
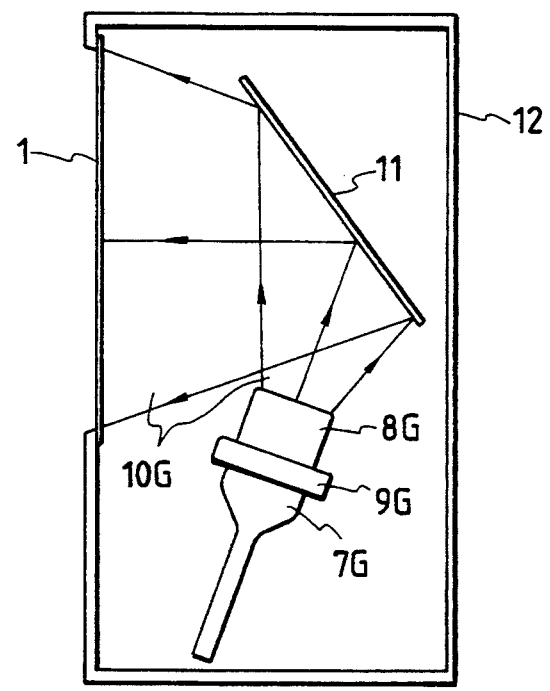
FIG. 13 is a sectional view of an essential portion of a rear-projection image display employing the rear-projection screen of FIG. 12.
Figure 14:
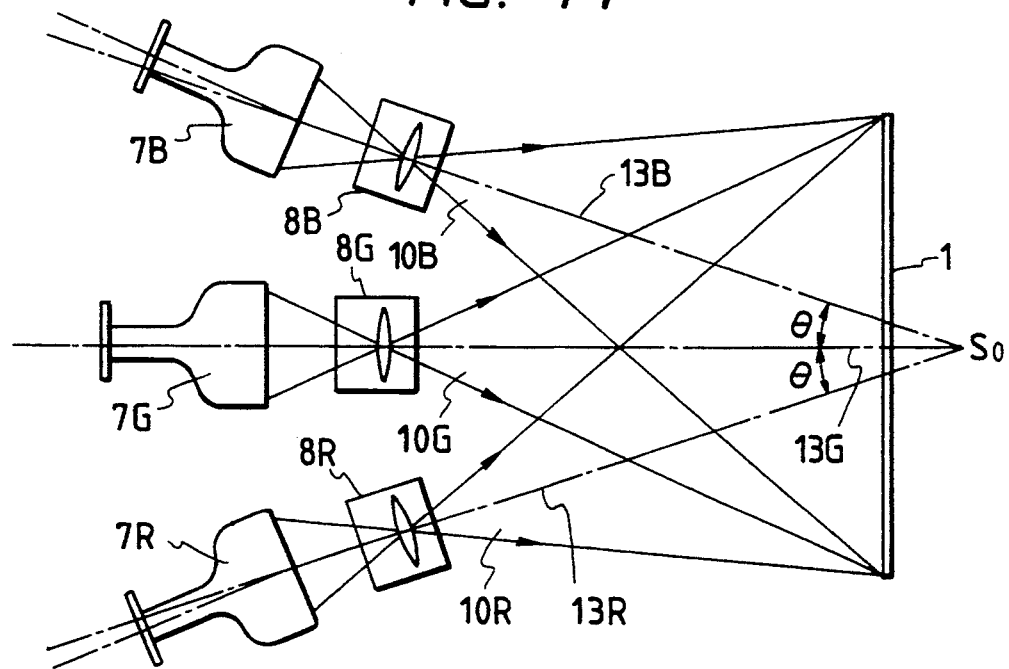
FIG. 14 is a diagrammatic view of a projection optical system included in the rear-projection image display of FIG. 13, developed on a horizontal plane.

FIG. 13 is a sectional view of an essential portion of a rear-projection image display employing the rear-projection screen of FIG. 12, and FIG. 14 is a schematic horizontal development of a projection optical system included in the rear-projection image display of FIG. 13.

Referring to FIGS. 13 and 14, there are shown the rear-projection screen 1, red, green and blue projection CRTs 7R, 7G and 7B, projection lens units 8R, 8G and 8B through which red rays 10R, green rays 10G and blue rays 10B projected by the red, green and blue projection CRTs travel, respectively, a coupler 9G connecting the projection CRT 7G and the projection lens unit 8G, a reflecting mirror 11, which is omitted in FIG. 14, for reflecting the red rays 10R, the green rays 10G and the blue rays 10B, a console 12 (FIG. 13), the respective optical axes 13R, 13G and 13B of the projection lens units 8R, 8G and 8B. The optical axes 13R, 13G and 13B intersect each other at an angular offset $\theta$ at a point $S_0$ near the center of the rear-projection screen 1.

The light rays 10R, 10G and 10B diverge from the projection lens units 8R, 8G and 8B, and fall on the rear-projection screen 1. The light rays of a color, for example, red rays 10R forming each picture element of an image formed on the rear-projection screen 1 are not parallel rays and the red rays 10R fall on the rear-projection screen 1 along directions deviating from the main light rays of the central picture element on the rear-projection screen 1. Light intensity is highest in the direction of travel of the principal ray of each picture element on the rear-projection screen 1. Accordingly, a portion of the image is bright and the rest of portions of the image is very dark for the viewer located at some fixed position apart from the rear-projection image display.

Since the Fresnel lens forming the exit surface 22 of the Fresnel lens sheet 2 of the rear-projection screen 1 collimates the red rays 10R, the green rays 10G and the blue rays 10B falling on the entrance surface 21 before the red rays 10R, the green rays 10G and the blue rays 10B enter the lenticular lens sheet 3, brightness distribution on the rear-projection screen 1 is improved.

As mentioned above, the optical axis 13G of the green projection lens unit 8G intersects the red optical axis 13R and the blue optical axis 13B at the angular offset $\theta$. Accordingly, the respective incident angles of the red, green and blue principal rays for each picture element on the rear-projection screen 1 on the Fresnel lens sheet 2 are different from each other and go out from the Fresnel lens sheet 2 in different directions, respectively. Accordingly, the respective incident angles of the red rays, green rays and the blue rays on the lenticular lens sheet 3 are different from each other.

When the red rays, the green rays and the blue rays are diffused horizontally by the lenticular lens sheet 3, each picture element is brightest when viewed in the direction of travel of the principal ray and hence the balance of the three primary colors, i.e., red, green and blue, changes according to the position of the viewer with respect to the horizontal direction and, consequently, the color of the image changes. This phenomenon is called "color shift".

The first horizontally elongate lenticular lenses forming the entrance surface 21 of the Fresnel lens sheet 2 diffuse the incident light rays 14 vertically.

Figure 15:
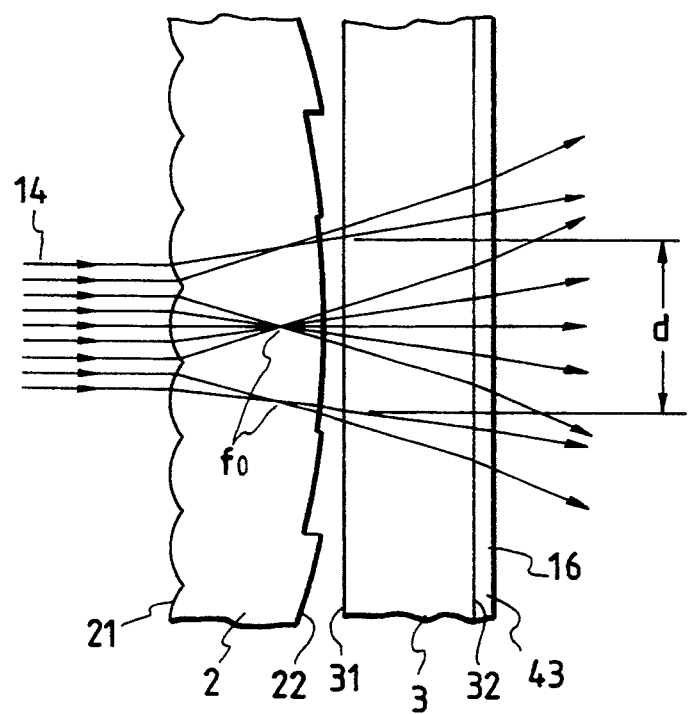
FIG. 15 is a vertical sectional view of the rear-projection screen of FIG. 12.

FIG. 15 is a vertical sectional view of the rear-projection screen of FIG. 12 in which parts like or corresponding to those shown in FIG. 12 are denoted by the same reference characters and the description thereof will be omitted.

Referring to FIG. 15, the incident light rays 14 for a scanning line or a picture element fall on the horizontally elongate lenticular lenses forming the entrance surface 21 at different positions on the horizontally elongate lenticular lenses at different incident angles, respectively, and the incident light rays 14 are refracted at different angles of refraction, respectively. Consequently, the incident light rays 14 are diffused vertically. If the radius of curvature of the horizontally elongate lenticular lenses is reduced, the respective incident angles of the light rays are increased and the angular range of vertical diffusion of the incident rays 14 is increased, whereby the vertical directional characteristics of the rear-projection screen 1 is enhanced and the specific vertical viewing angle is increased.

The pitch of the horizontally elongate lenticular lenses must be smaller than the pitch of the scanning lines or the pitch of the picture elements, and the pitch of the horizontally elongate lenticular lenses must be determined taking into consideration the combined effect of the setbacks of the Fresnel lens and the horizontally elongate lenticular lenses of the Fresnel lens sheet 2 on the occurrence of moiré.

Occurrence of moiré resulting from the interference between the scanning lines and the horizontally elongate lenticular lenses is the most significant problem. The intensity of moiré can be reduced to a practically insignificant level by reducing the pitch of the horizontally elongate lenticular lenses to a value far smaller than the horizontal pitch of the first vertically elongate lenticular lenses and the pitch of the scanning lines, and determining the pitch of the horizontally elongate lenticular lenses so that the ratio between the pitch of the scanning lines and that of the horizontally elongate lenticular lenses is not the ratio of simple integers.

For example, suppose that the horizontal size and vertical size of the rear-projection screen 1 are 800 mm and 600 mm, respectively, the horizontal pitch of the first vertically elongate lenticular lenses is 0.78 mm, the number of scanning lines on the rear-projection screen 1 is 450 and the pitch of the scanning lines is 1.33 mm. Then, only a very indistinct moiré is formed when the pitch of the setbacks of the Fresnel lens is 0.105 mm and the pitch of the horizontally elongate lenticular lenses is on the order of 0.091 mm.

The prior art rear-projection screen of FIG. 1 diffuses the light rays vertically primarily by particles of the light diffusing material 15 dispersed in the base sheet of the lenticular lens sheet 3 and has directional characteristics covering a relatively wide angular range.

As mentioned above, since the base sheet of the lenticular lens sheet 3 of the rear-projection screen 1 of the present invention does not contain any particles of the light diffusing material, the rear-projection screen 1 has vertical directional characteristics covering a relatively narrow angular range and no image can be seen on the rear-projection screen 1 from a position outside a relatively narrow angular range of view if the shape of the horizontally elongate lenticular lenses is that of a simple cylinder or a simple elliptic cylinder. Accordingly, it is preferable that the horizontally elongate lenticular lenses have an aspheric shape which will provide the rear-projection screen with directional characteristics covering a relatively wide angular range.

The lenticular lens sheet 3 will be described hereinafter.

Referring to FIG. 12, the first vertically elongate lenticular lenses forming the entrance surface 31 of the lenticular lens sheet 3 diffuse horizontally the light rays traveled through the Fresnel lens sheet 2 for each picture element so that diffused light rays emerge from the exit surface 32 of the lenticular lens sheet 3.

Each of the first vertically elongate lenticular lenses forming the entrance surface 31 of the lenticular lens sheet 3 of the prior art rear-projection screen disclosed in Japanese Patent Laid-open No. 58-59436 has the shape of a portion of an elliptic cylinder. The elliptic cross section of the elliptic cylinder has a major axis extending in the direction of thickness of the lenticular lens sheet 3, one focus positioned within the base sheet of the lenticular lens sheet 3, the other focus positioned near the exit surface 32, and an eccentricity e approximately equal to the reciprocal of the refractive index n of the base sheet.

The prior art rear-projection screen 1 of FIG. 1 diffuses the light rays horizontally primarily by the vertically elongate lenticular lenses forming the entrance surface 31 and secondarily by the particles of the light diffusing material 15 dispersed in the base sheet of the lenticular lens sheet 3. Thus, the prior art rear-projection screen has directional characteristics covering a relatively wide angular range.

Since any particles of the light diffusing material 15 are not dispersed in the base sheet of the lenticular lens 3 of the rear-projection screen 1 in the first embodiment according to the present invention shown in FIG. 12, the rear-projection screen 1 has horizontal directional characteristics covering a relatively narrow angular range and no image can be seen from a position outside a relatively narrow angular range due, if the shape of the first vertically elongate lenticular lenses is the same as that of the vertically elongate lenticular lenses of the prior art lenticular lens sheet 3. Accordingly, in the first embodiment, the shape of the first vertically elongate lenticular lenses must be designed so that the rear-projection screen has directional characteristics covering a relatively wide angular range even though the base sheet of the lenticular lens sheet 3 does not contain any light diffusing material 15.

The second vertically elongate lenticular lenses forming the exit surface 32 of the lenticular lens sheet 3 has a shape substantially resembling the mirror image of the shape of the first vertically elongate lenticular lenses forming the entrance surface 31. The second vertically elongate lenticular lenses make the directional characteristics for the red rays, the green rays and the blue rays substantially parallel to each other, which reduces color shift effectively.

The first vertically elongate lenticular lenses are designed so that the light rays incident on the lenticular lens sheet 3 pass only the central portions of the second vertically elongate lenticular lenses forming the exit surface 32 and do not pass portions of the second vertically elongate lenticular lenses around the boundaries of the adjacent second vertically elongate lenticular lenses. The ridges 33 are formed in portions of the exit surface 32 around the boundaries of the adjacent second vertically elongate lenticular lenses and the upper surfaces of the ridges 33 are coated with the light absorbing strips 16, respectively.

Each light absorbing strip 16 absorbs part of the ambient light, such as illuminating light, falling thereon to enhance the contrast of the image displayed on the rear-projection screen when the rear-projection screen is exposed to the ambient light.

As mentioned above, the base sheet of the lenticular lens sheet 3 of the rear-projection screen in the first embodiment does not contain any particles of the light diffusing material 15, and the horizontally elongate lenticular lenses forming the entrance surface 21 of the Fresnel lens sheet 2 are of a new design differing from that of the horizontally elongate lenticular lenses forming the entrance surface of the Fresnel lens sheet of the prior art rear-projection screen.

If the radius of curvature of the horizontally elongate lenticular lenses of the Fresnel lens sheet 2 of the prior art rear-projection screen 1 of FIG. 1 is reduced or the light diffusing material content of the lenticular lens sheet 3 of the prior art rear-projection screen is increased to enhance the vertical directional characteristics, the focusing characteristics are deteriorated.

On the other hand, even if the radius of curvature of the horizontally elongate lenticular lenses of the Fresnel lens sheet 2 of the rear-projection screen in the first embodiment is reduced to enhance the vertical directional characteristics, the focusing characteristics are not deteriorated because of the following reasons.

Since the Fresnel lens sheet 2 is formed in a small thickness approximately equal to that of the lenticular lens sheet 3 so that the first horizontally elongate lenticular lenses forming the entrance surface 21 of the Fresnel lens sheet 2 and the first vertically elongate lenticular lenses forming the entrance surface 31 of the lenticular lens sheet 3 are close to each other and no particle of the light diffusing material 15 is dispersed in the base sheet of the lenticular lens sheet 3, the focusing characteristics are not deteriorated even if the radius of curvature of the horizontally elongate lenticular lenses is reduced. That is, since the origin of horizontal divergence of the incident light rays 14 and the origin of vertical divergence of the incident light rays 14 in the rear-projection screen are close to each other and the light rays 14 are not scattered by the particles of the light diffusing material, the focusing characteristics are not deteriorated.

Figure 10:
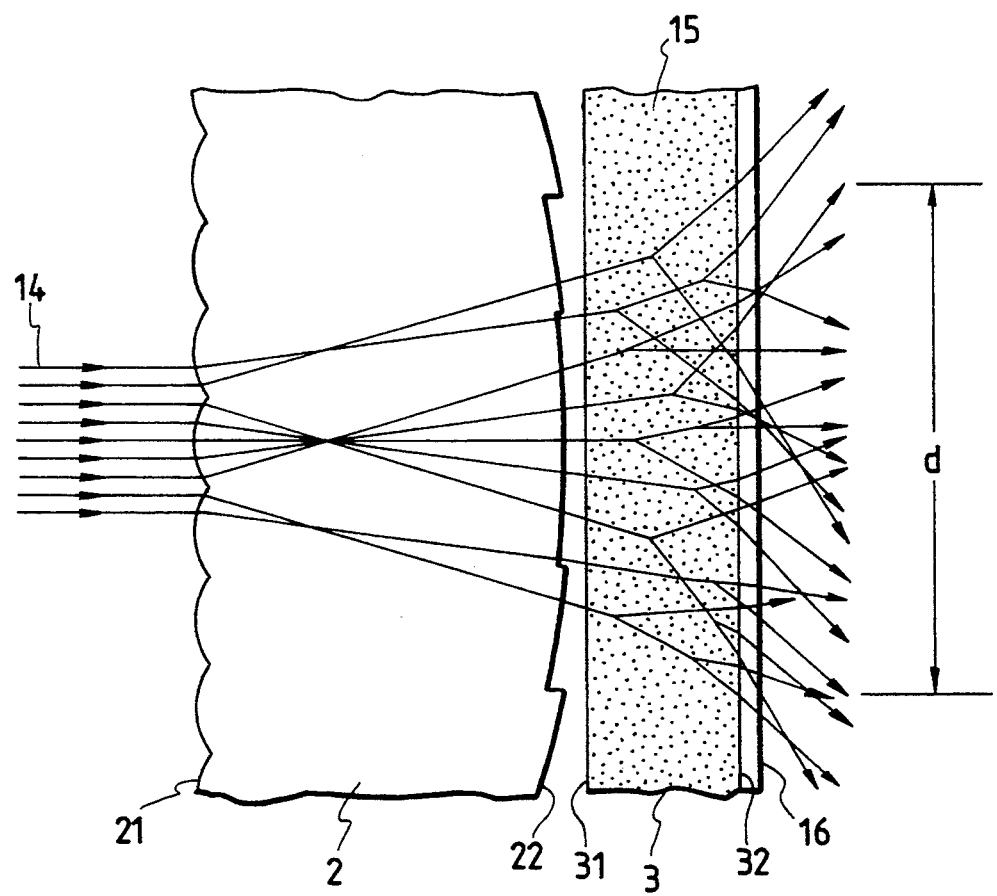
FIG. 10 is a vertical sectional view of the rear-projection screen of FIG. 1.
Figure 11:
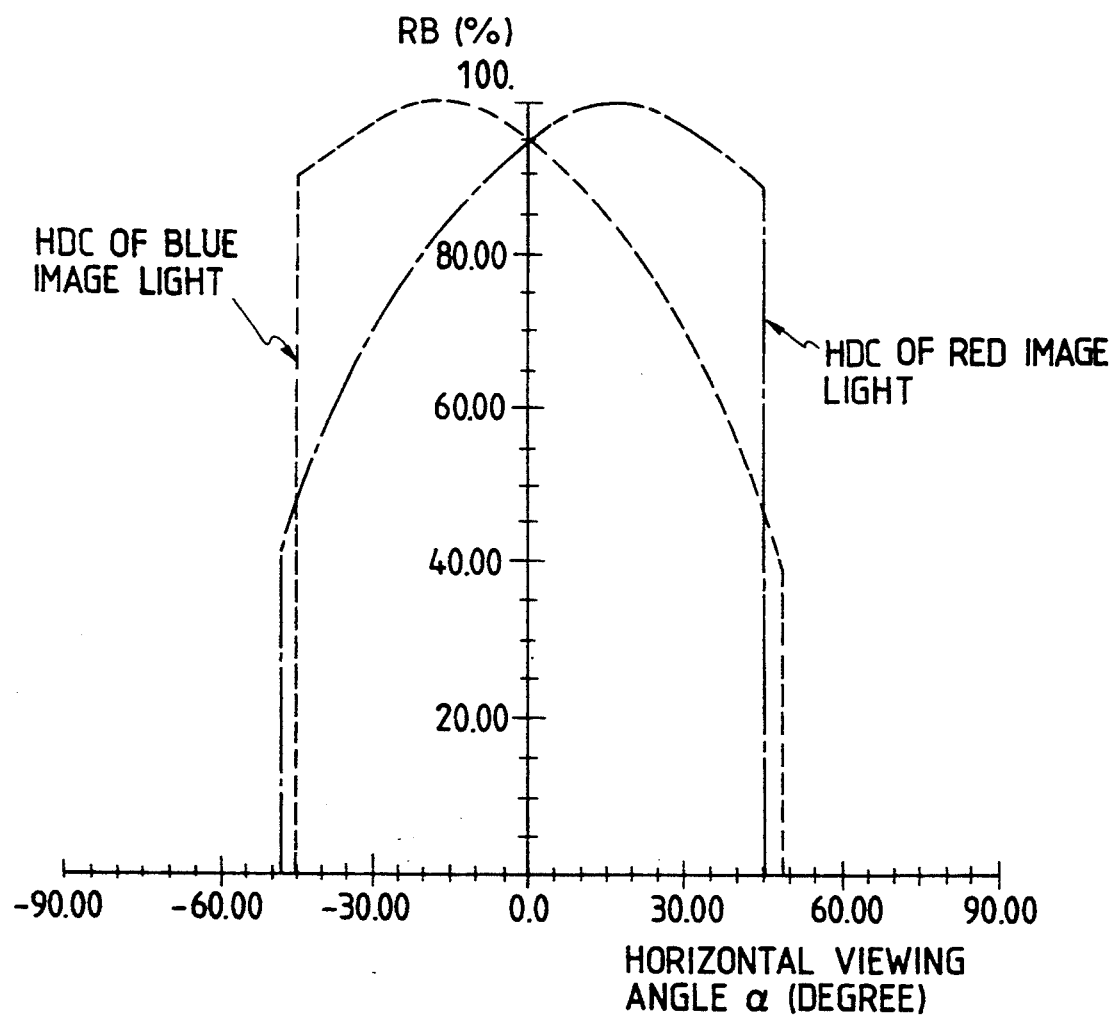
FIG. 11 is a graph showing the horizontal directional characteristics of the prior art rear-projection screen for red rays and blue rays.

More concretely, as shown in FIG. 15, the incident light rays 14 falling on the Fresnel lens sheet 2 are refracted so as to converge on the focus $f_0$ within the Fresnel lens sheet 2 by the horizontally elongate lenticular lenses forming the entrance surface 21 of the Fresnel lens sheet 2, the light rays 14 are diffused vertically from the focus $f_0$, and then, the vertically diffused light rays 14 are diffused horizontally by the vertically elongate lenticular lenses forming the entrance surface 31 of the lenticular lens sheet 3. Since the vertically diffused light rays are not diffused by the light diffusing material 15 before the same reach the exit surface 32 of the lenticular lens sheet 3, the vertical width d of the incident light rays 14 on the display surface of the rear-projection screen 1 is approximately equal to the vertical width of the light rays on the exit surface 22 of the Fresnel lens sheet 2 and hence this vertical width d is smaller than the vertical width d (FIG. 10) of the light rays on the display surface of the prior art rear-projection screen. The smaller the thickness of the Fresnel lens sheet 2, the smaller the vertical width of the light rays on the exit surface 22 of the Fresnel lens sheet 2.

Figure 16:
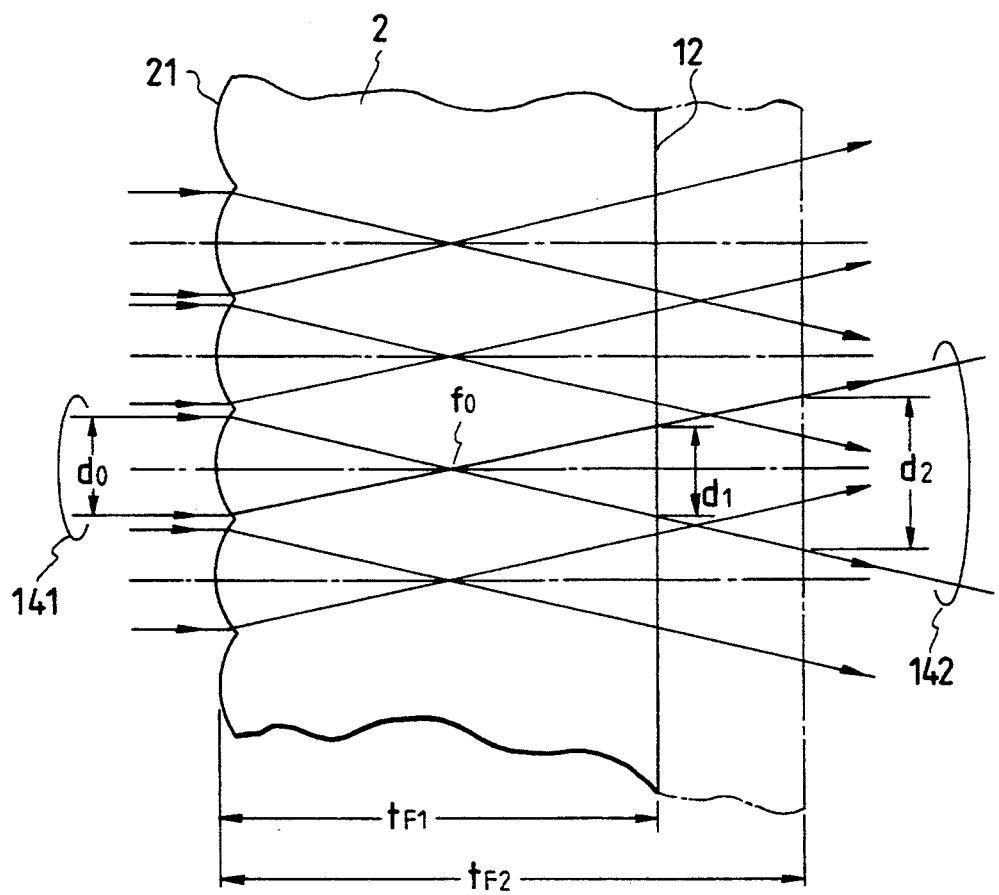
FIG. 16 is a vertical sectional view of a Fresnel lens sheet included in the rear-projection screen of FIG. 12.

FIG. 16 is a vertical sectional view of the Fresnel lens sheet 2, in which the Fresnel lens forming the exit surface 22 is omitted for simplicity.

Referring to FIG. 16, when the thickness of the Fresnel lens sheet 2 is $t_{F1}$ or $t_{F2}$, the width of the light rays on the exit surface 22 of the Fresnel lens sheet 2 is $d_1$ or $d_2$. Practically, the image is displayed clearly and the focusing characteristics of the rear-projection screen are satisfactory when the thickness $t_F$ of the Fresnel lens sheet 2 and the thickness $t_L$ of the lenticular lens sheet 3 meet an inequality:

$$t_F \leq 2.5 t_L.$$

Since the incident light rays falling on the entrance surface 31 of the lenticular lens sheet 3 are not scattered by the light diffusing material 15 and any stray light rays are produced while the incident light rays travel through the lenticular lens sheet 3, the rear-projection screen 1 is more satisfactory in the brightness and contrast of the image than the prior art rear-projection screen. Furthermore, since the ambient light falling on the exit surface 32 is not scattered by the light diffusing material 15, the contrast of the image displayed on the rear-projection screen is higher by far than that of the image displayed on the prior art rear-projection screen. In FIG. 16, indicated at 141 are incident light rays and at 142 are diffused light rays.

Figure 17:
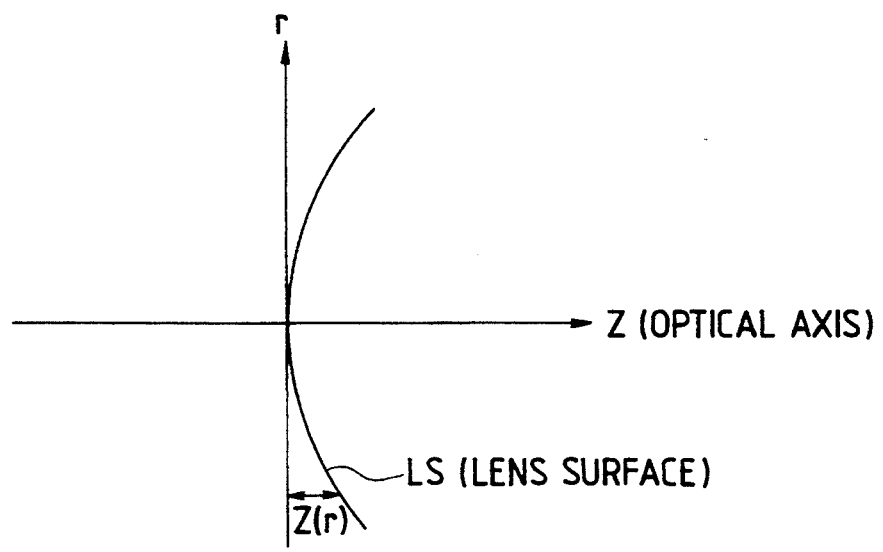
FIG. 17 is a diagram of a coordinate system for defining the aspheric shape of each of the lenticular lenses of a rear-projection screen.

The concrete design data of the horizontally elongate lenticular lenses of the Fresnel lens sheet 2, and the vertically elongate lenticular lenses of the lenticular lens sheet 3 of the rear-projection screen in the first embodiment will be described hereinafter. FIG. 17 shows a coordinate system for defining the aspheric shape of each lenticular lens, in which the axis Z-axis corresponds to the optical axis of the lenticular lens, the direction of travel of the light rays is measured to the right on the Z-axis, the r-axis is perpendicular to the Z-axis, and r is the distance along the r-axis from the Z-axis. The height of the surface of the lenticular lens is defined as a function $Z(r)$ of r represented by an equation (1).

$$Z(r) = (r^2/RD)/(1 + \sqrt{1 - (1 + CC) \cdot r^2/RD^2}) + AE \cdot r^4 + AF \cdot r^6 + AG \cdot r^8 + AH \cdot r^{10} \quad (1)$$

(Both of $Z(r)$ and r shall be used the unit "mm".) where RD is the radius of curvature, and CC, AE, AF, AG and AH are aspheric factors. Although the equation (1) includes terms up to the tenth order term of r, the equation (1) may include 2nth order terms of r, where n is 6 and above. The equation (1) including terms up to 2nth order term of r higher than the tenth order term of r also defines a lens surface symmetrical with respect to the Z-axis.

Examples of the horizontally elongate lenticular lenses for the Fresnel lens sheet 2 will be described hereinafter.

A technical means for increasing the vertical viewing angle β will be described with reference to FIG. 18 of assistance in explaining the function of the horizontally elongate lenticular lenses having a lens surface $S_0$ and forming the entrance surface 21 to diffuse the incident light rays vertically, in which indicated at 145 are diffused light rays and at 146 are paraxial rays.

Figure 18:
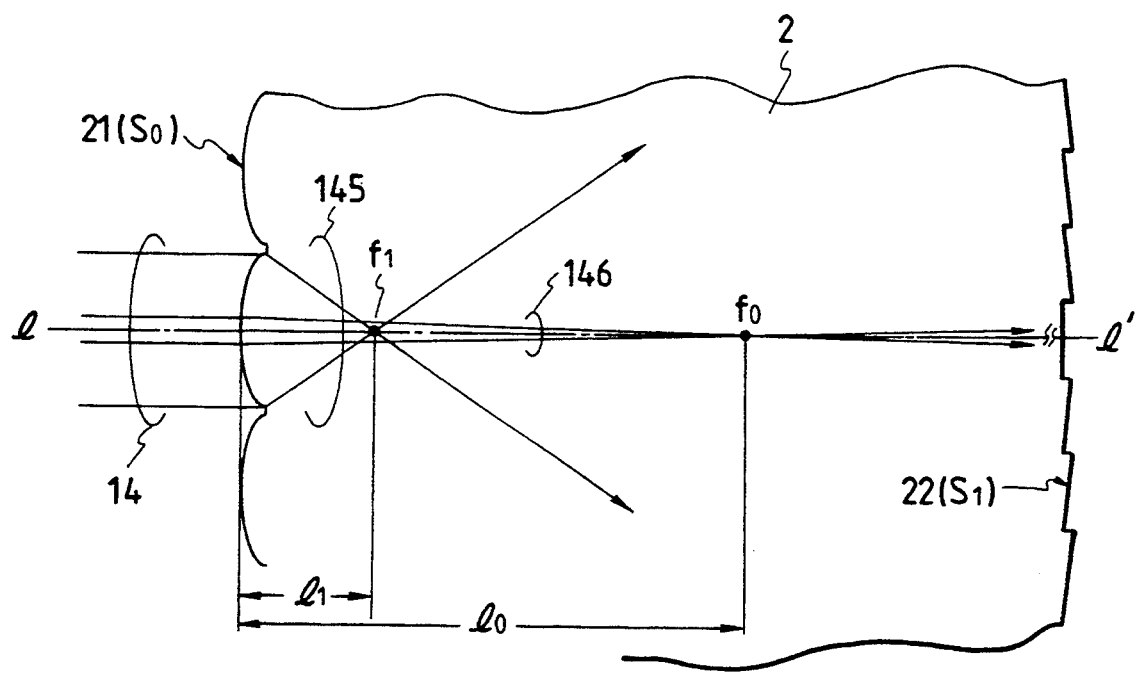
FIG. 18 is a fragmentary sectional view of assistance in explaining the diffusing function of the horizontally elongate lenticular lens of the rear-projection screen of FIG. 12.

Referring to FIG. 18, the incident light rays 14 fall on the lens surface $S_0$ forming the entrance surface 21, converge on foci $f_0$ and $f_1$, and then travel toward the lens surface $S_1$ forming the exit surface 22 diverging from the foci $f_0$ and $f_1$. Thus, the incident light rays 14 are diffused.

A central portion of the lens surface $S_0$ nearer to the optical axis 1—1' is formed in a gently convex shape convex toward the video source so that the portion has a weak refracting power, and a peripheral portion of the lens surface $S_1$ farther from the optical axis 1—1' is formed in a sharply convex shape so that the other portion has a strong condensing power. Thus, the lens surface $S_0$ is formed so that the refractive power of the horizontally elongate lenticular lens increases with distance from the optical axis 1—1'; that is, the focal length $l_0$ of the central portion of the horizontally elongate lenticular lens is far longer than the focal length $l_1$ of the peripheral portion of the horizontally elongate lenticular lens. Thus, the light rays falling on the peripheral portion of the lens surface $S_0$ are refracted at angles of refraction greater than the angles of refraction at which the light rays falling on the central portion of the lens surface $S_0$ to provide the rear-projection screen 1 with enhanced vertical directional characteristics.

Figure 19:
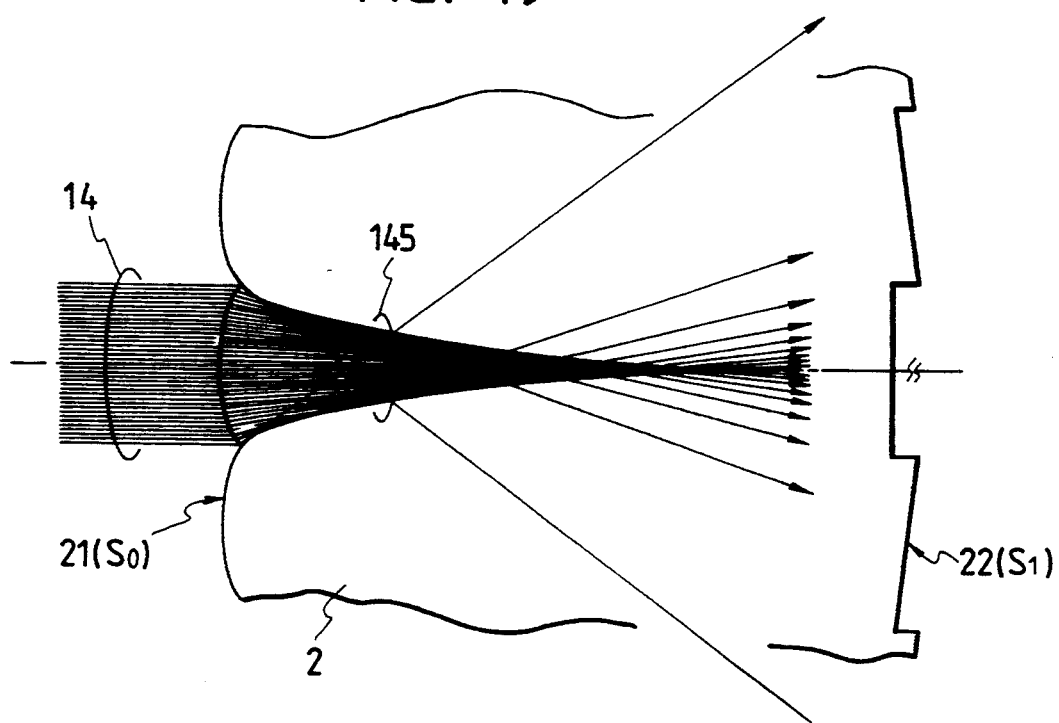
FIG. 19 is a fragmentary sectional view of assistance in explaining a horizontally elongate lenticular lens of a structure specified in Table 1 and the vertical diffusion of light rays.

Table 1 shows design data of the factors of the equation (1) for the horizontally elongate lenticular lens forming the entrance surface 21 of the Fresnel lens sheet 2, and the convex Fresnel lens forming the exit surface 22 of the Fresnel lens sheet 2 and FIG. 19 is a schematic, vertical sectional view of a horizontally elongate lenticular lens represented by the design data shown in Table 1.

As shown in Table 1 and FIG. 19, the lens surface $S_0$ forming the entrance surface 21 is convex toward the video source and has a radius of curvature of 0.105 mm, a spacing t, i.e., the distance between the lens surfaces $S_0$ and $S_1$ along the optical axis, of 2.0 mm and a refractive index of 1.570.

When the center of curvature of the lens surface is behind the lens surface with respect to the direction of travel of the light rays, the radius of curvature is represented by a positive value.

The effective radius P/2 of 0.04 mm means that $0 \leq r \leq 0.04$ mm for the function $f(r)$ expressed by the equation (1).

TABLE 1

| Lens surface | Entrance ($S_0$) | Exit ($S_1$) |
|---|---|---|
| Radius of curvature RD (mm) | 0.105 | −410.74 |
| Aspheric factors | | |
| CC | 5.82 | 0.0 |
| AE | 0.0 | 0.0 |
| AF | 0.0 | 0.0 |
| AG | 0.0 | 0.0 |
| AH | 0.0 | 0.0 |
| Effective radius (P/2) (Mm) | 0.04 | — |
| Spacing (t) (mm) | 2.0 | |
| Refractive index | 1.570 | |

Figure 20:
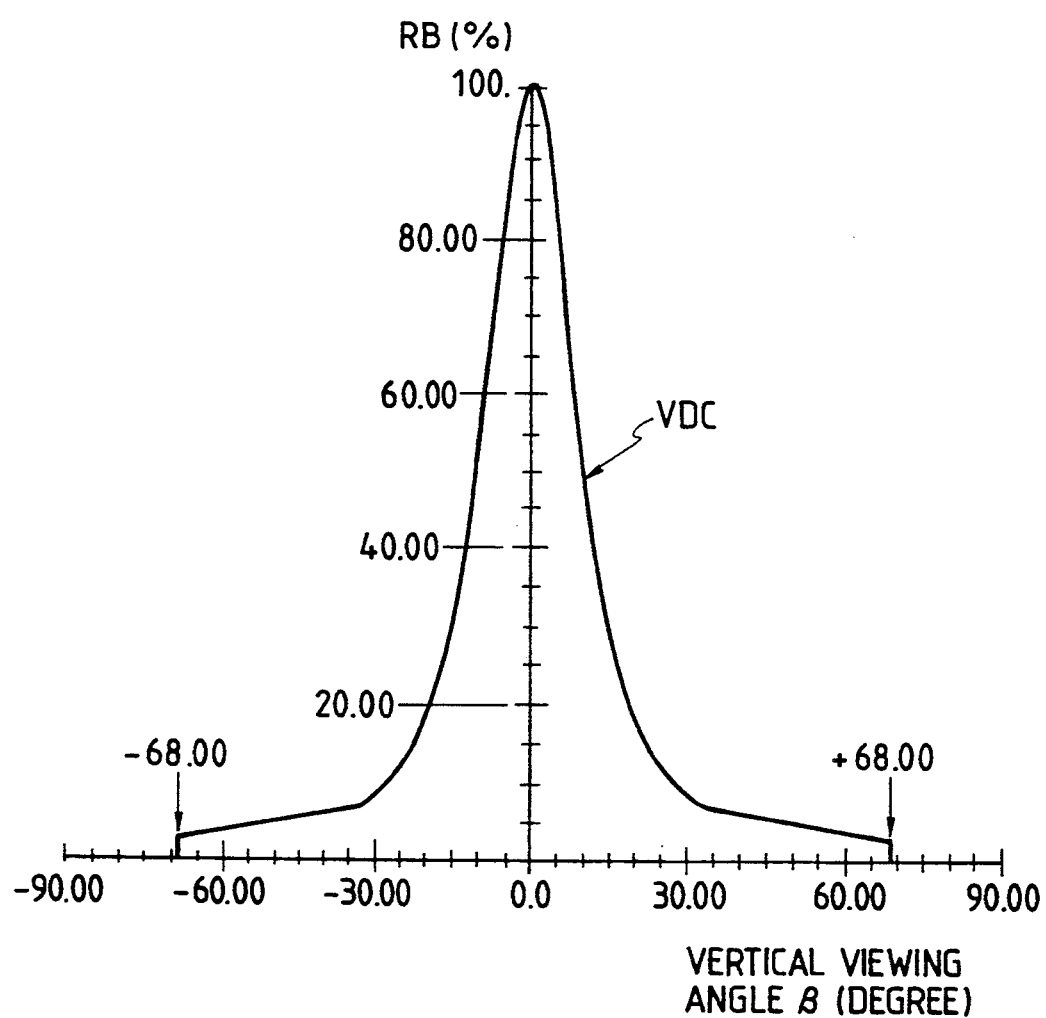
FIG. 20 is a graph showing the vertical directional characteristics of the lenticular lens of a structure specified in Table 1.

FIG. 20 shows the vertical directional characteristics of the rear-projection screen provided with a Fresnel lens sheet 2 employing the horizontally elongate lenticular lens of Table 1.

As is obvious from FIG. 20, the vertical angular range of visibility is ±68°, and the specific vertical viewing angle is ±10°, which are a sufficiently wide vertical angular range of visibility and a sufficiently large specific vertical viewing angle.

Figure 21:
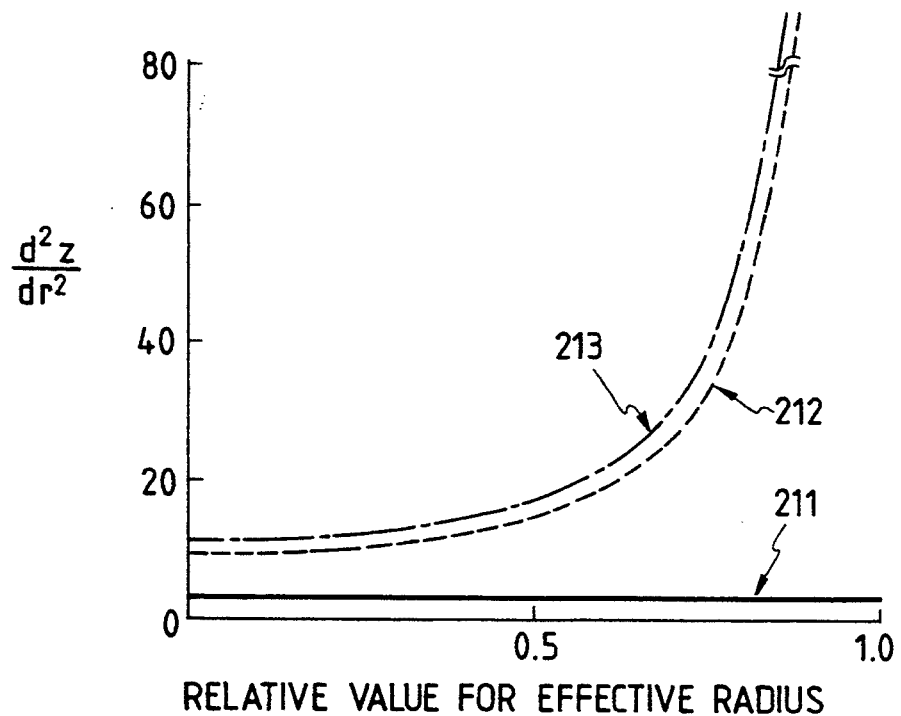
FIG. 21 is a graph comparatively showing the dependence of the performance of the rear-projection screen of the present invention and the prior art rear-projection screen on the shape of horizontally elongate lenticular lenses.

FIG. 21 is a graph comparatively showing the dependence of refracting effection the shape of the horizontally elongate lenticular lenses forming the entrance surface of the Fresnel lens sheet of the rear-projection screen in the first embodiment and the prior art rear-projection screen.

Referring to FIG. 21, the second derivative of the function $Z(r)$ of the equation (1) with respect to r is measured on the vertical axis and the distance from the optical axis relative to effective radius, which will be referred to as "relative distance", is measured on the horizontal axis. In FIG. 21, a curve 211 indicated by a continuous line represents the characteristics of the horizontally elongate lenticular lens of the prior art rear-projection screen, and a curve 212 indicated by a broken line represents the characteristics of the horizontally elongate lenticular lens specified in Table 1 of the rear-projection screen in the first embodiment. A curve 213 indicated by an alternate long and short dash line will be described later.

As mentioned above, the dependence of the refracting effect of a portion of the horizontally elongate lenticular lens on the distance of the same from the optical axis 1—1' can be understood from the value of the second derivative. As indicated by the curve 212, the values of the second derivative for the horizontally elongate lenticular lens of the rear-projection screen in the first embodiment increases with the distance from the optical axis 1—1', which corresponds to increase in the refractive power with the distance from the optical axis 1—1'. On the other hand, as indicated by the curve 211, the values of the second derivative for the horizontally elongate lenticular lens of the prior art rear-projection screen remains substantially constant regardless of the increase in the distance from the optical axis 1—1'; that is, the refractive power is not dependent on the distance from the optical axis 1—1'.

Examples of the vertically elongate lenticular lenses of the lenticular lens sheet 3 will be described hereinafter with reference to FIGS. 22 and 23 in terms of technical means for increasing the horizontal viewing angle α.

Figure 22:
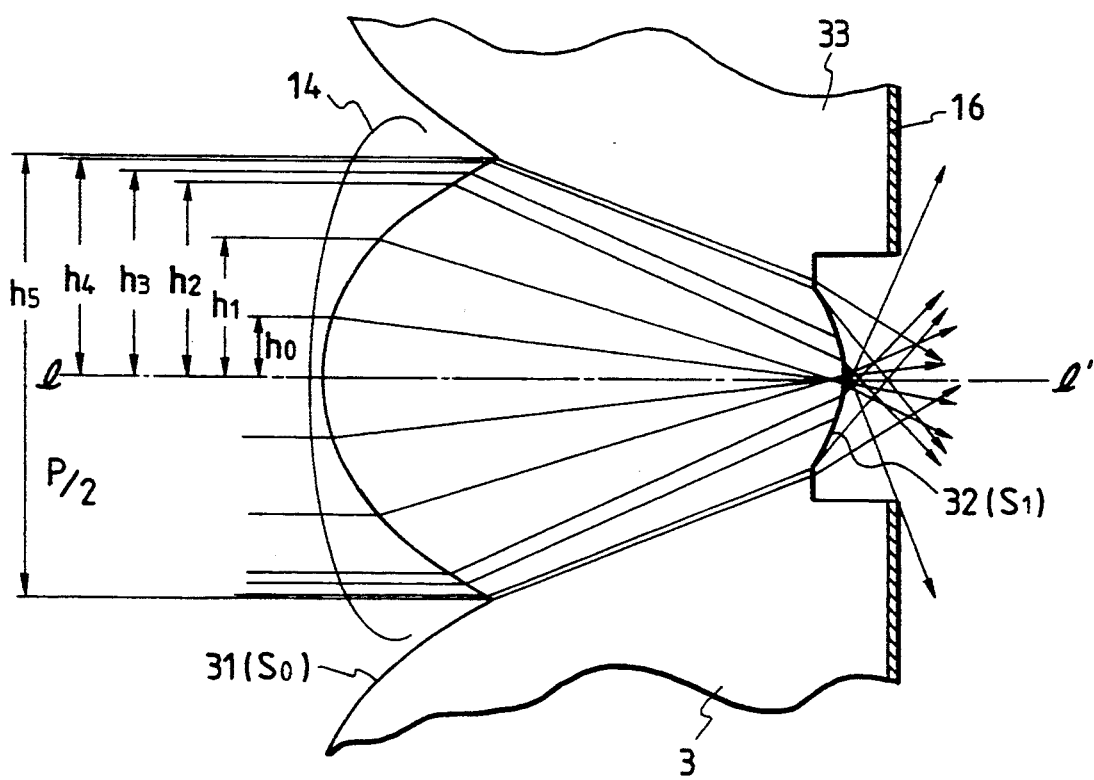
FIG. 22 is a diagrammatic view of assistance in explaining the diffusing function of vertically elongate lenticular lens of the rear-projection screen of FIG. 12.
Figure 23:
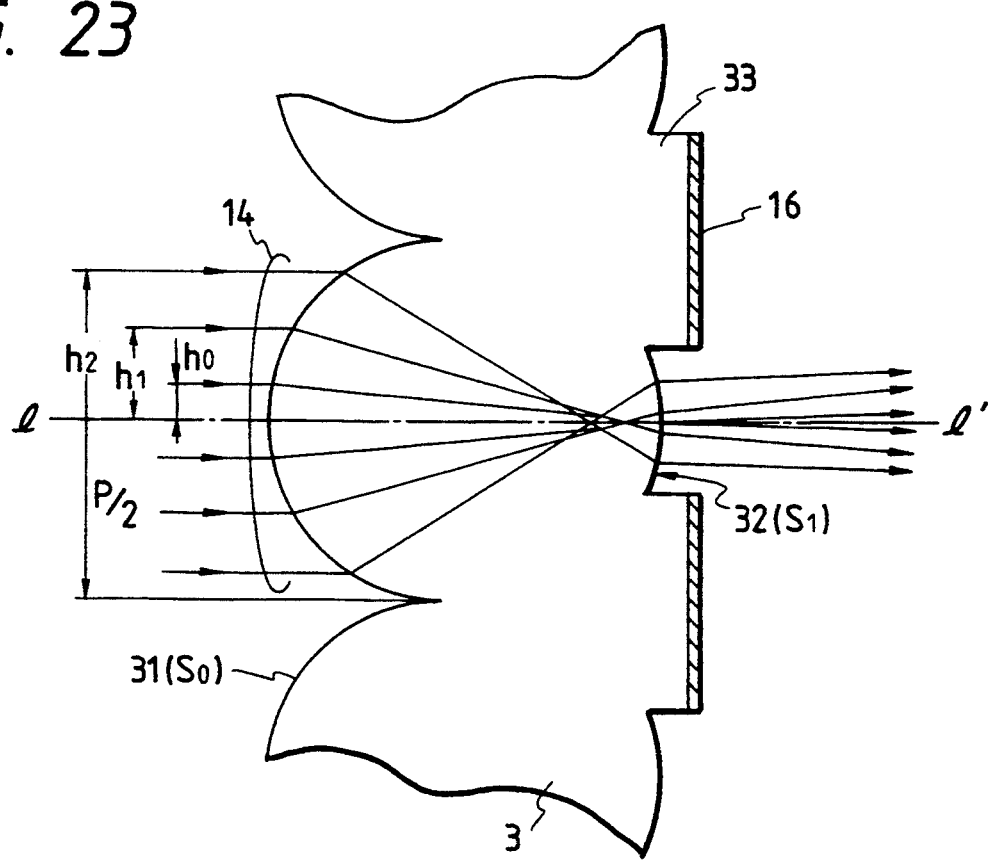
FIG. 23 is a diagrammatic view of assistance in explaining the diffusing function of the vertically elongate lenticular lens of an ordinary rear-projection screen.

FIG. 22 is a horizontal sectional view of the lenticular lens sheet 3 of FIG. 12 and FIG. 23 is a horizontal sectional view of a prior art lenticular lens sheet 3'.

Referring to FIG. 23, when the first vertically elongate lenticular lens forming the entrance surface 31 of the lenticular lens sheet 3 has the shape of a portion of a circular cylinder, a mode of refracting a paraxial light ray falling at a point at a distance $h_0$ from the optical axis 1—1' on the entrance surface 31 and a mode of refracting a peripheral light ray falling at a point at a distance $h_2$ from the optical axis 1—1' on the entrance surface 31 are different from each other, and the paraxial light ray falling at the point at the distance $h_0$ from the optical axis, 1—1' on the entrance surface 31 and the light ray falling at the point at the distance $h_2$ from the optical axis 1—1' on the entrance surface 31 come to a focus at different positions on the optical axis 1—1' respectively That is, the point where the light ray falling at the position at the distance $h_2$ from the optical axis 1—1' comes to a focus is nearer to the entrance surface 31 than the point where the paraxial light ray falling at the point at the distance $h_0$ from the optical axis 1—1' comes to a focus. Such a phenomenon is called, in general, longitudinal, spherical aberration. Vertical, spherical aberration in which a point where a light ray initially farther from the optical axis 1—1' comes to a focus is nearer to the entrance surface 31 than a point where a light ray initially nearer to the optical axis 1—1' comes to a focus will be referred to as "positive, longitudinal, spherical aberration", and vertical spherical aberration in which a point where a light ray initially farther from the optical axis 1—1' comes to a focus is farther from the entrance surface 31 than a point where a light ray initially nearer to the optical axis 1—1' comes to a focus will be referred to as "negative, longitudinal, spherical aberration".

In the rear-projection screen in the first embodiment, the entrance surface 31 has the shape shown in FIG. 22, which causes negative, longitudinal, spherical aberration and makes the light rays initially near from the optical axis 1—1' come to a focus at a position near the exit surface 32. The exit surface 32 is convex toward the image viewing side.

When the entrance surface 31 and the exit surface 32 are formed respectively in such shapes, the light rays initially remote from the optical axis 1—1' fall on the exit surface 32 at incident angles nearly equal to the critical angle and hence the light rays are refracted at large angles of refraction on the exit surface 32. Accordingly, the horizontal viewing angle α of the rear-projection screen in the first embodiment is far greater than that of the prior art rear-projection screen.

Technical means for suppressing color shift will be described hereinafter with reference to FIG. 24.

Figure 24:
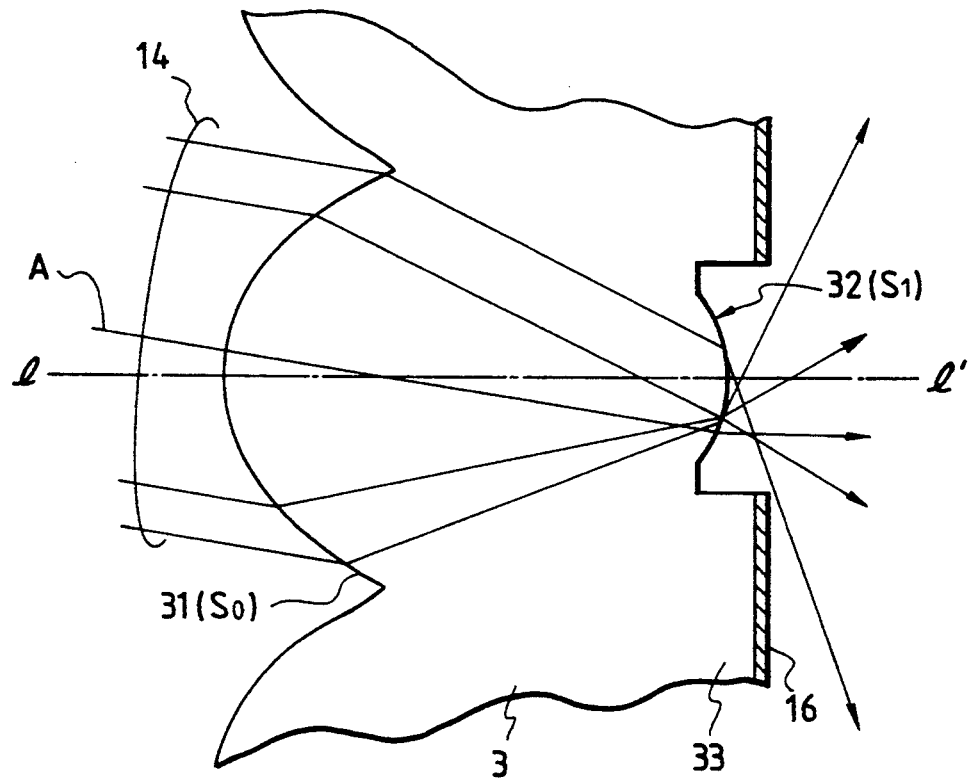
FIG. 24 is a diagrammatic view of assistance in explaining the diffusing function of the vertically elongate lenticular lens sheet of a rear-projection screen of FIG. 12.

Referring to FIG. 24, as mentioned above, the red rays and the blue rays fall on the entrance surface 31 of the lenticular lens sheet 3 obliquely. Accordingly, it is necessary that the light rays A falling on the entrance surface 31 at positions near the optical axis 1—1' travel substantially parallel to the optical axis 1—1' after being refracted on the exit surface 32 to suppress color shift.

The entrance surface 31 and the exit surface 32 of the lenticular lens sheet 3 of the rear-projection screen in the first embodiment are formed in shapes which make the light rays A travel substantially in parallel to the optical axis 1—1' after refraction on the exit surface 32.

Design data of such entrance surfaces 31 and such exit surfaces 32 are shown in Tables 2 and 3.

Figure 25:
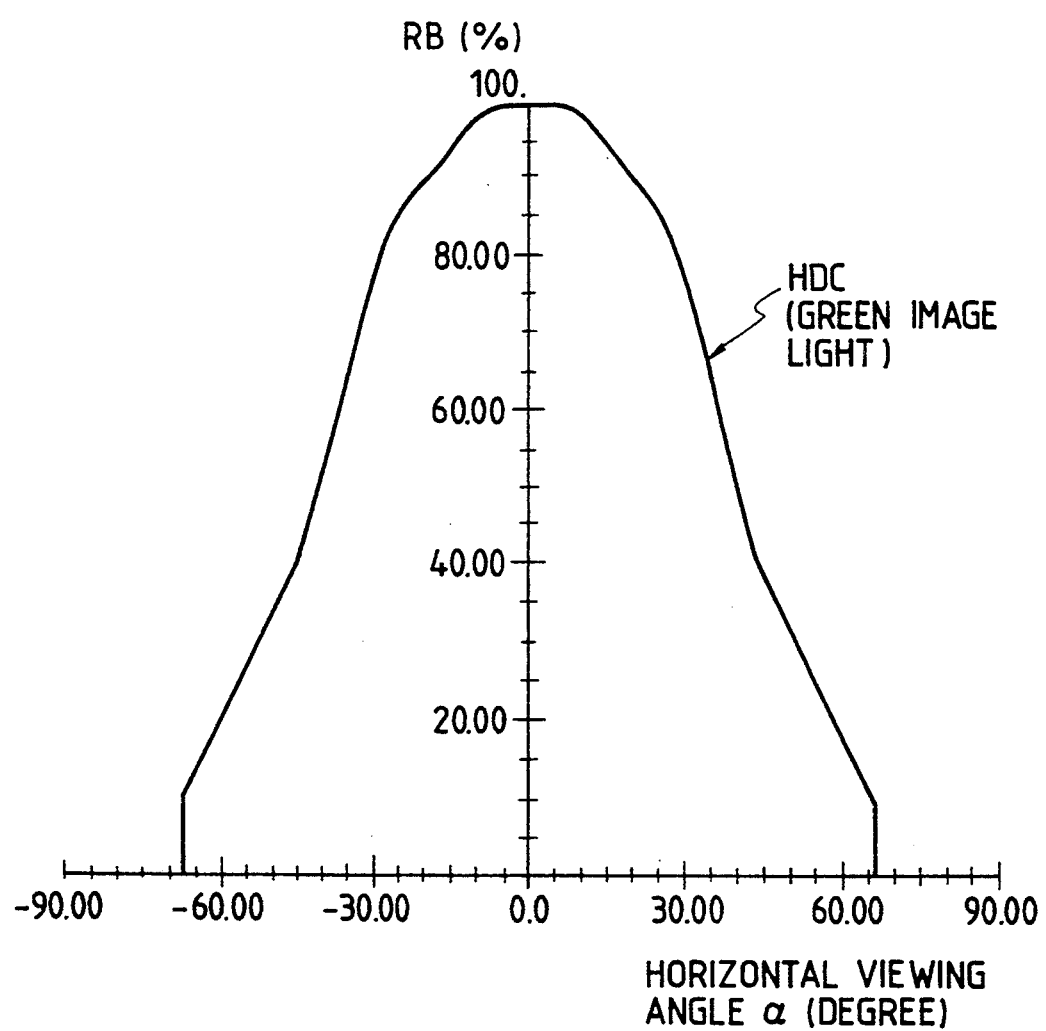
FIG. 25 is a graph showing the horizontal directional characteristics of a lenticular lens sheet of a structure specified in Table 2.
Figure 26:
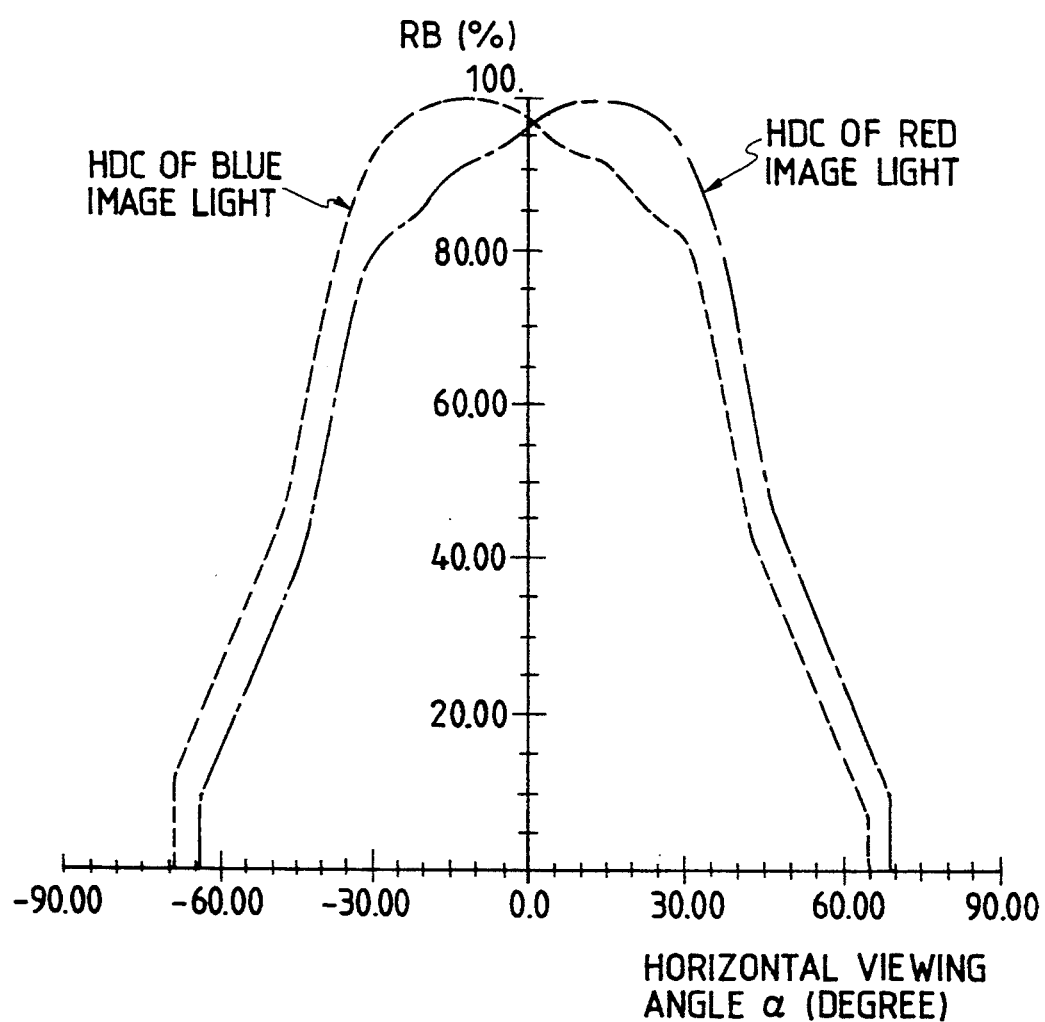
FIG. 26 is a graph showing the horizontal directional characteristics of the lenticular lens sheet of a structure specified in Table 2 for red rays and blue rays.

FIG. 25 is a graph showing the horizontal directional characteristics of a lenticular lens sheet 3 having the entrance surface 31 and the exit surface 32 of the design data specified in Table 2, and FIG. 26 is a graph showing the horizontal directional characteristics of the lenticular lens sheet 3 having the entrance surface 31 and the exit surface 32 of the design data specified in Table 2 for red rays or blue rays.

As is obvious from FIG. 25, the horizontal angular range of visibility is ±67°, which is far greater than the horizontal viewing angle α of the prior art rear-projection screen. As is obvious from FIG. 26, the degree of color shift is half the degree of color shift on the prior art rear-projection screen.

Figure 27:
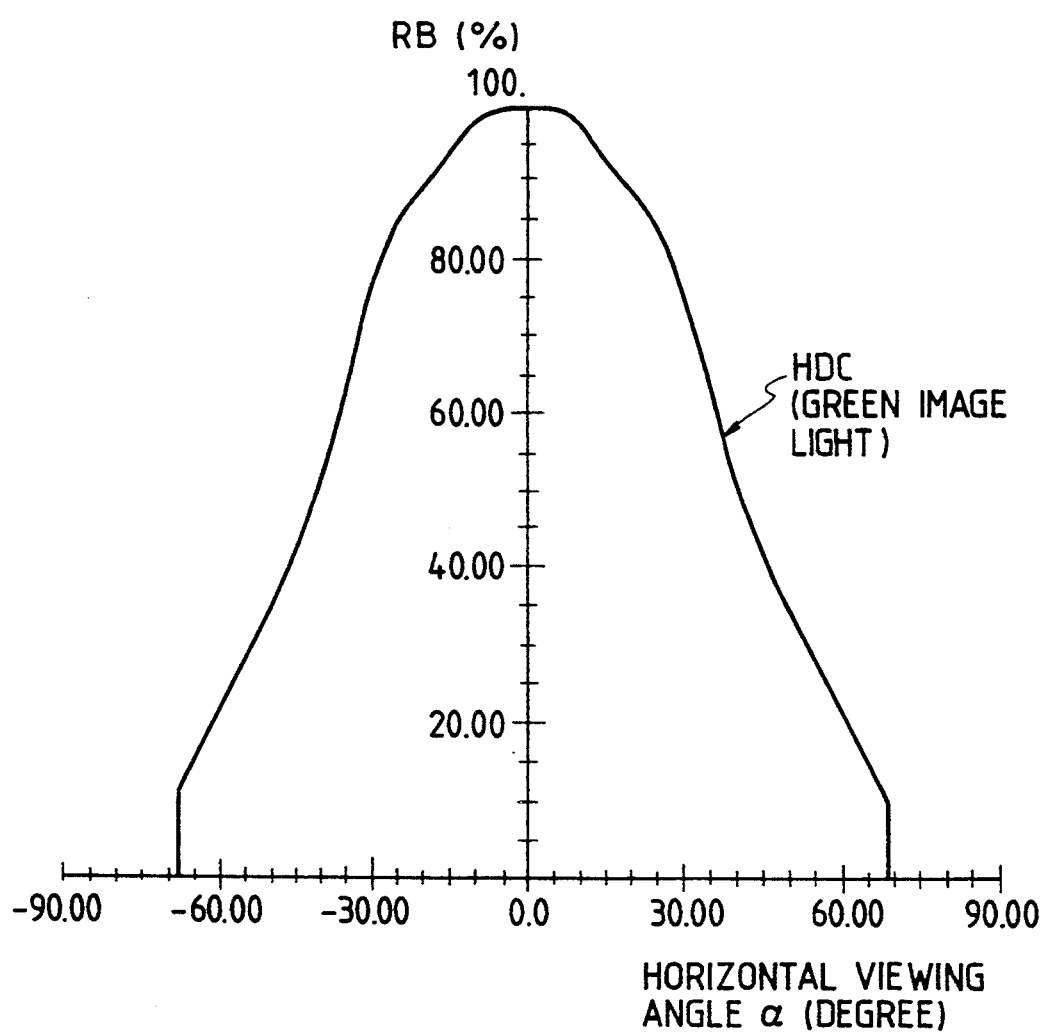
FIG. 27 is a graph showing the horizontal directional characteristics of a lenticular lens sheet of a structure specified in Table 3.
Figure 28:
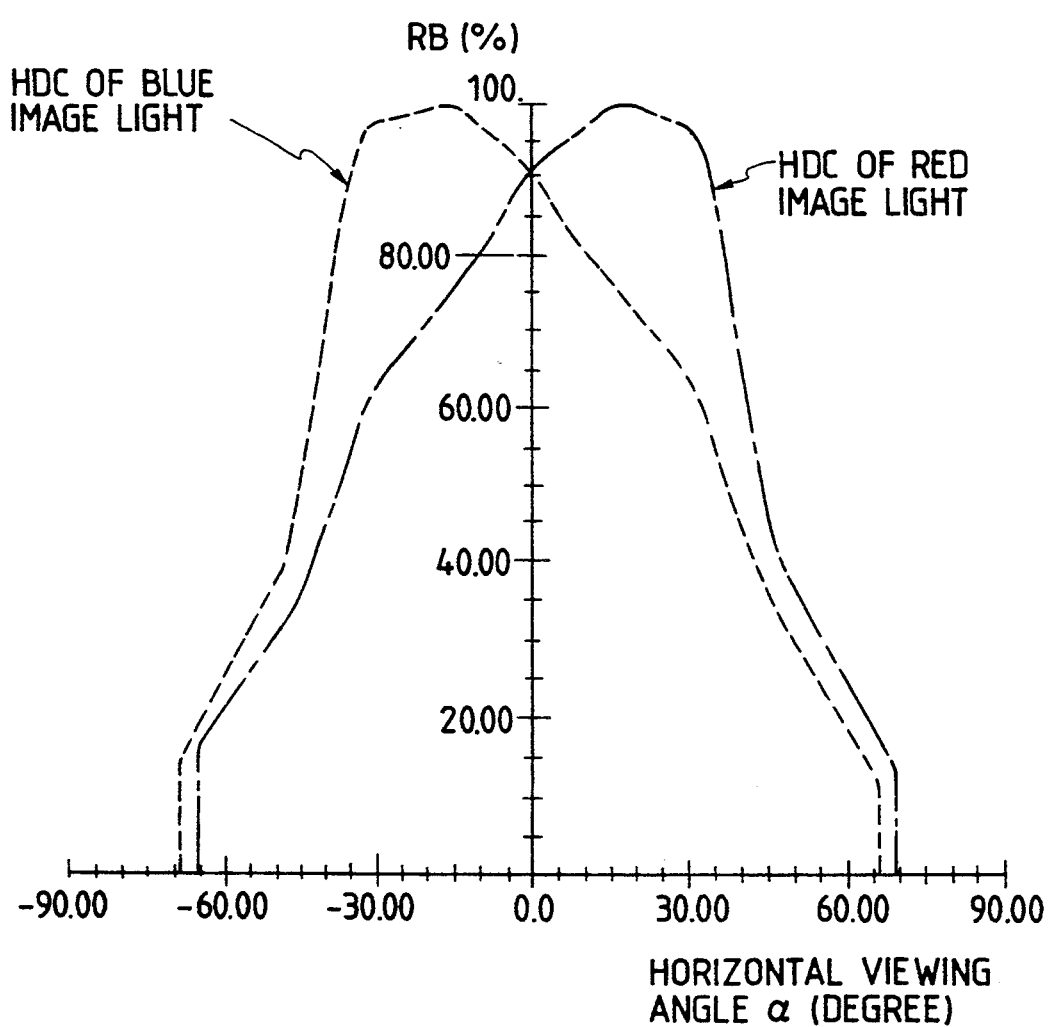
FIG. 28 is a graph showing the horizontal directional characteristic of the lenticular lens sheet of a structure specified in Table 3 for red rays and blue rays.

FIG. 27 is a graph showing the horizontal directional characteristics of a lenticular lens sheet 3 having the entrance surface 31 and the exit surface 32 of the design data specified in table 3, and FIG. 28 is a graph showing the horizontal directional characteristics of the lenticular lens sheet 3 having the entrance surface 31 and the exit surface 32 of the design data specified in Table 3 for red rays or blue rays.

TABLE 2

| Lens surface | Entrance ($S_0$) | Exit ($S_1$) |
| --- | --- | --- |
| Radius of curvature RD (mm) | 0.28845 | −0.20961 |
| Aspheric factors | | |
| CC | −0.954 | −0.400 |
| AE | 5.2 | −0.156 |
| AF | −75.0 | 9.045 |
| AG | 1211.0 | 12000.0 |
| AH | −5653.0 | 1200000.0 |
| Effective radius (P/2) (Mm) | 0.365 | 0.159 |
| Spacing (t) (Mm) | 0.88 | |
| Refractive index | 1.493 | |

TABLE 3

| Lens surface | Entrance ($S_0$) | Exit ($S_1$) |
| --- | --- | --- |
| Radius of curvature | 0.2885 | −0.2100 |
| Aspheric factors | | |
| CC | −0.954 | −3.669 |
| AE | 5.2 | −0.156 |
| AF | −75.0 | 9.044 |
| AG | 1211.0 | 1843.0 |
| AH | −5653.0 | 230640 |
| Effective radius (P/2) (mm) | 0.365 | 0.159 |
| Spacing (t) (mm) | 0.88 | |
| Refractive index | 1.49 | |

As shown in FIGS. 27 and 28, the rear-projection screen in the first embodiment is equivalent to or somewhat superior to the prior art rear-projection screen in the degree of color shift, and the horizontal angular range of visibility of ±68° of the rear-projection screen in the first embodiment is far greater than that of the prior art rear-projection screen.

Figure 29:
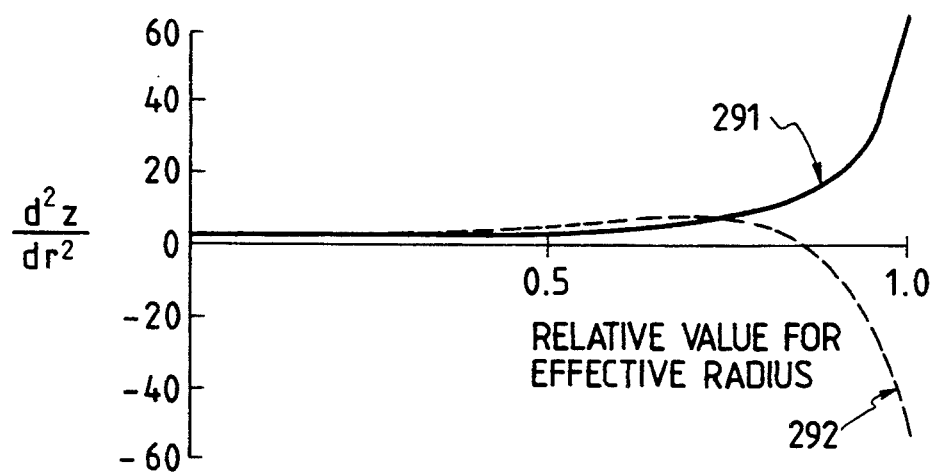
FIG. 29 is a graph comparatively showing the dependence of the performance of a rear-projection screen of the present invention and a prior art rear-projection screen on the shape of the first vertically elongate lenticular lens.

FIG. 29 is a graph comparatively showing the dependence of the refracting effect of the rear-projection screen in the first embodiment employing the lenticular lens sheet of the design data specified in Table 2 and the prior art rear-projection screen on the shape of the entrance surface, which is convex toward the video source, of the lenticular lens sheet, in which the second derivative $d^2Z/dr^2$ of the function $Z(r)$ represented by the equation (1) defining the shape of the entrance surface 31 of the lenticular lens sheet 3 is measured on the vertical axis and the relative distance from the optical axis, i.e., the distance from the optical axis normalized by the effective radius P/2, is measured on the horizontal axis, a curve 291 indicated by a continuous line and a curve 292 indicated by a broken line are for the prior art rear-projection screen and the rear-projection screen in the first embodiment having the entrance surface of the design data specified in Table 2, respectively.

The refracting effect of the entrance surface 31 at points at a distance from the optical axis can be understood from the value of the second derivative. As is obvious from the curve 292, the value of the second derivative for the entrance surface 31 of the rear-projection screen in the first embodiment becomes negative at positions at distances from the optical axis 1—1' greater than a certain value. And the refracting effect decreases with the distance from the optical axis 1—1'. On the other hand, as is obvious from the curve 291, the second derivative of the equation (1) for the prior art rear-projection screen increases and the refracting effect increases with the distance from the optical axis 1—1'.

Figure 30:
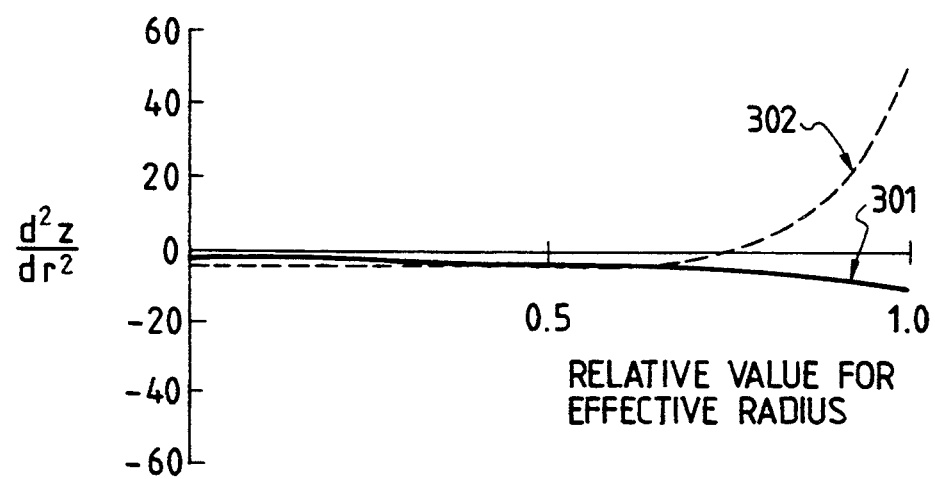
FIG. 30 is a graph comparatively showing the dependence of the performance of a rear-projection screen of the present invention and a prior art rear-projection screen on the shape of the second vertically elongate lenticular lens.

FIG. 30 is a graph comparatively showing the dependence of the refracting effect of the rear-projection screen in the first embodiment employing the lenticular lens sheet of the design specified in Table 2 and the prior art rear-projection screen on the shape of the exit surface, which is convex toward the viewing side, of the lenticular lens sheet., in which the second derivative of the equation (1) is measured on the vertical axis and the relative distance is measured on the horizontal axis, and a curve 301 indicated by a continuous line and a curve 302 indicated by a broken line are for the prior art rear-projection screen and the rear-projection screen in the first embodiment, respectively.

The second derivative for the exit surface of the rear-projection screen in the first embodiment increases with the distance from the optical axis 1—1' from negative values to positive values as indicated by the curve 302 and hence the refracting effect, i.e., focusing effect, of the exit surface decreases. On the other hand, the second derivative for the exit surface of the prior art rear-projection screen remains substantially constant at a negative value regardless of the distance from the optical axis 1—1' as indicated by the curve 301 and hence the refracting effect remains constant.

As is apparent from the foregoing description, the rear-projection screen in the first embodiment comprises the lenticular lens sheet 3 having the base sheet not containing any light diffusing material, and the Fresnel lens sheet 2 of a smallest possible thickness having the entrance surface 21 formed of the horizontally elongate lenticular lenses having an aspheric shape to exhibit improved focusing performance, to display an image in improved brightness and contrast, to enhance the vertical directional characteristics and to suppress color shift.

A rear-projection screen in a second embodiment according to the present invention will be described hereinafter with reference to FIGS. 31 and 32.

Figure 31:
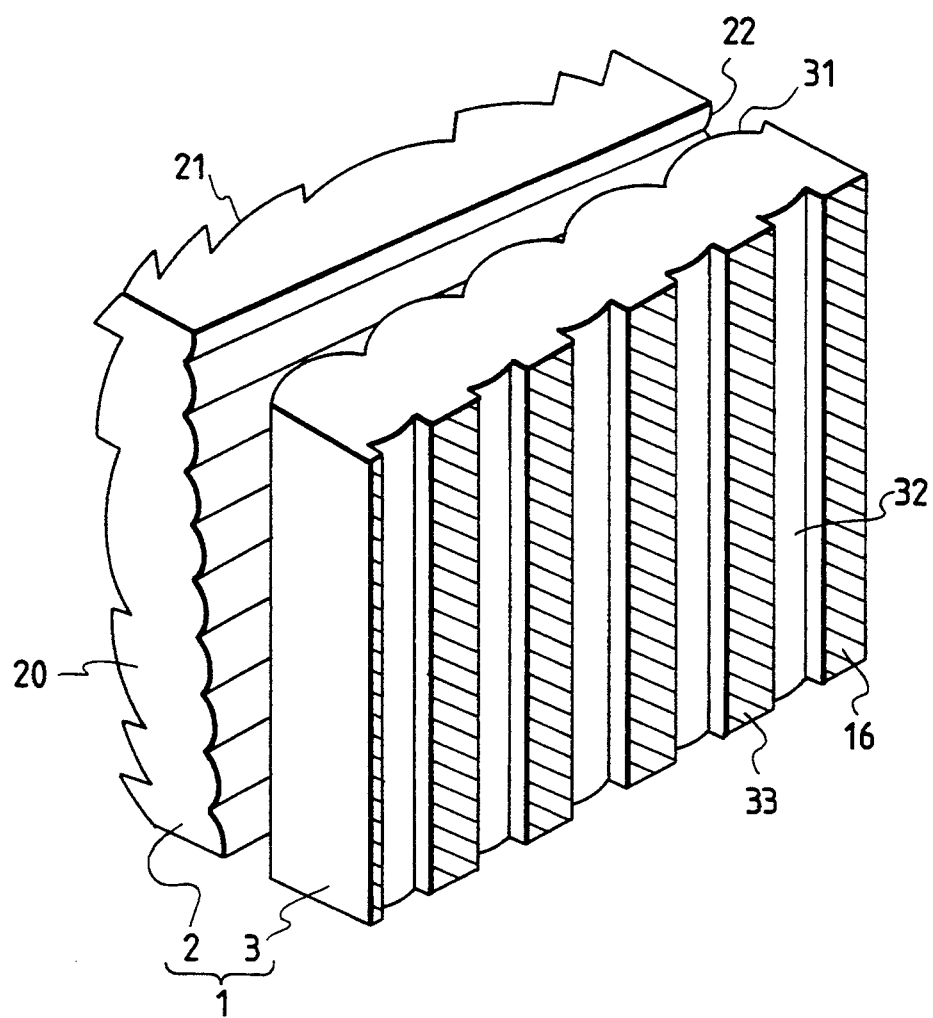
FIG. 31 is a perspective view of an essential portion of a rear-projection screen in a second embodiment according to the present invention.

FIG. 31 is a perspective view of an essential portion of the rear-projection screen in the second embodiment, in which parts like or corresponding to those of the rear-projection screen of FIG. 12 are denoted by the same reference characters and the description thereof will be omitted.

The rear-projection screen in the second embodiment is different from the rear-projection screen in the first embodiment in that the rear-projection screen in the second embodiment uses the entrance surface 21 and the exit surface 22 of the Fresnel lens sheet 2 of the rear-projection screen in the first embodiment as an exit surface and an entrance surface, respectively.

The vertical directional characteristics of the rear-projection screen in the second embodiment will be described with reference to FIG. 32.

The Fresnel lens sheet 2 of the rear-projection screen in the second embodiment has an entrance surface 21 and an exit surface 22 respectively corresponding to the exit surface 22 and the entrance surface 21 of the Fresnel lens sheet 2 of the design data specified in Table 1 of the rear-projection screen in the first embodiment.

Figure 32:
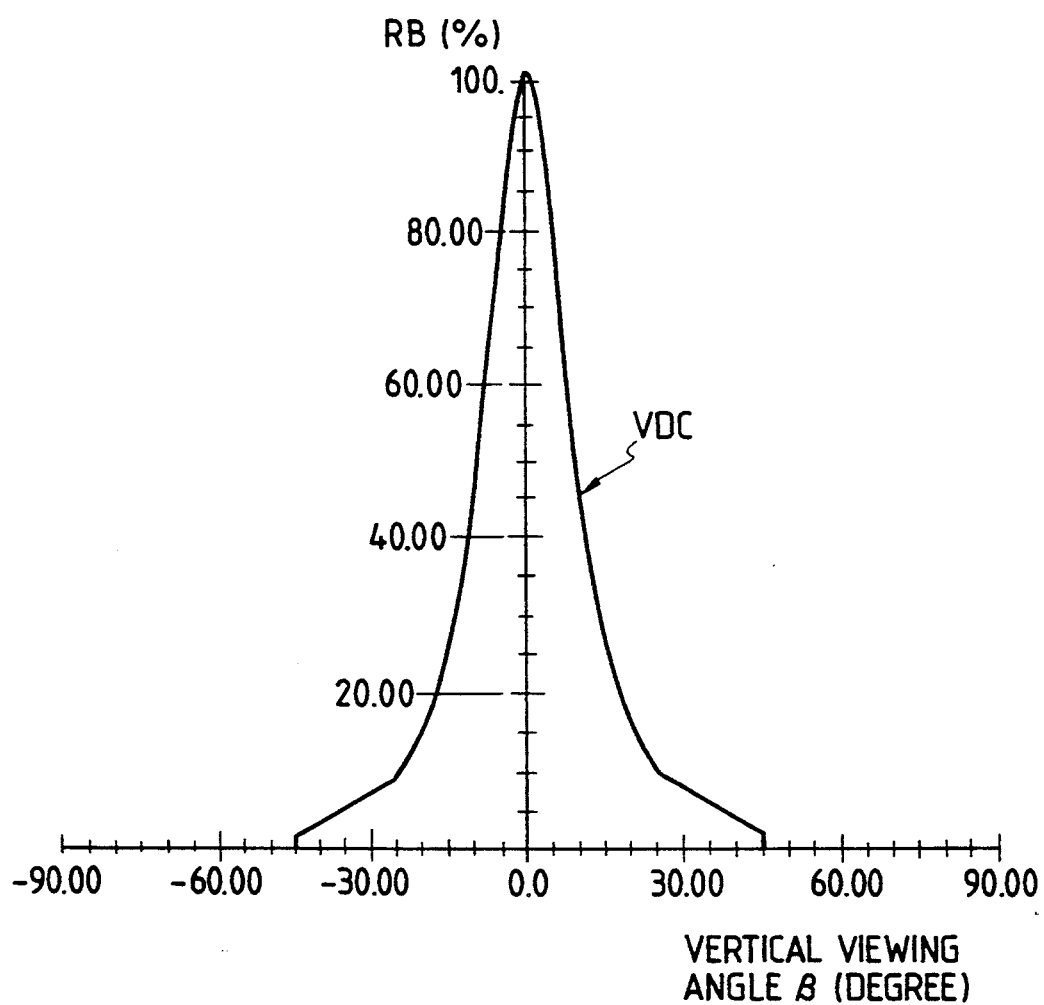
FIG. 32 is a graph showing the vertical directional characteristics of a horizontally elongate lenticular lens employed in the rear-projection screen of FIG. 31.

As shown in FIG. 32, the vertical angular range of visibility of the rear-projection screen is ±45° and the specific vertical viewing angle is ±10°, which are sufficiently large.

The dependence of the refracting effect of the horizontally elongate lenticular lenses of the Fresnel lens sheet 2 on the distance from the optical axis is indicated by a curve which is the mirror image of the curve 212 shown in FIG. 21.

The effect of rear-projection screen in the second embodiment is the same as that of the rear-projection screen in the first embodiment.

Although both the Fresnel lens sheets 2 and the lenticular lens sheets 3 of the rear-projection screens in the first and second embodiments are transparent, the lenticular lens sheets 3 may be a semitransparent, colored lenticular lens sheet.

When the rear-projection screen is provided with a semitransparent, colored lenticular lens sheet 3, the image light projected by the video source passes the semitransparent, colored lenticular lens sheet 3 once and undergoes light absorption once, whereby the quantity of the image light is reduced in proportion to the transmissivity of the semitransparent, colored lenticular lens sheet 3. On the other hand, most part of the ambient light, such as illuminating light, goes into the semitransparent, colored lenticular lens sheet 3 and returns at least once and undergoes light absorption at least twice, whereby the quantity of the ambient light is reduced in proportion to the square of the transmissivity of the semitransparent, colored lenticular lens sheet 3. Thus, the reduction of the ambient light is greater than that of the image light, and hence the contrast of the image exposed to the ambient light is improved.

In the first and second embodiment, either the Fresnel lens sheet 2 or the lenticular lens sheet 3 may be coated with an antireflection coating to improve the contrast of the image. Rear-projection screens employing an antireflection coating in modifications of the first embodiment will be described hereinafter with reference to FIGS. 33 and 34.

Figure 33:
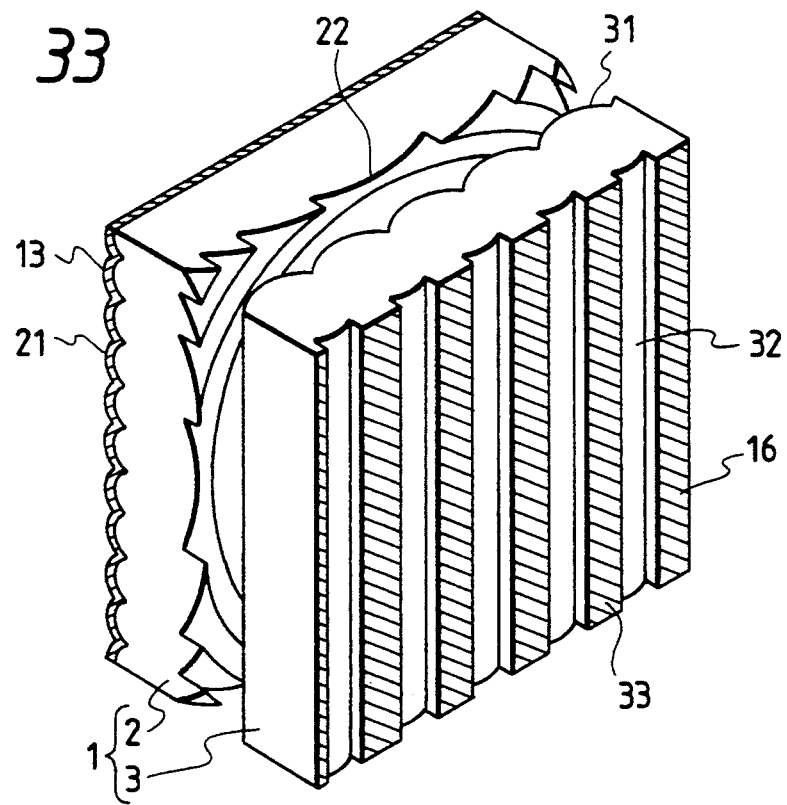
FIG. 33 is a perspective view of an essential portion of a modification of the rear-projection screen in the first embodiment according to the present invention.

Referring to FIG. 33, a Fresnel lens sheet 2 on the side of a video source has an entrance surface 21 coated with an antireflection coating 13 to improve the contrast of the image by reducing stray rays.

Figure 34:
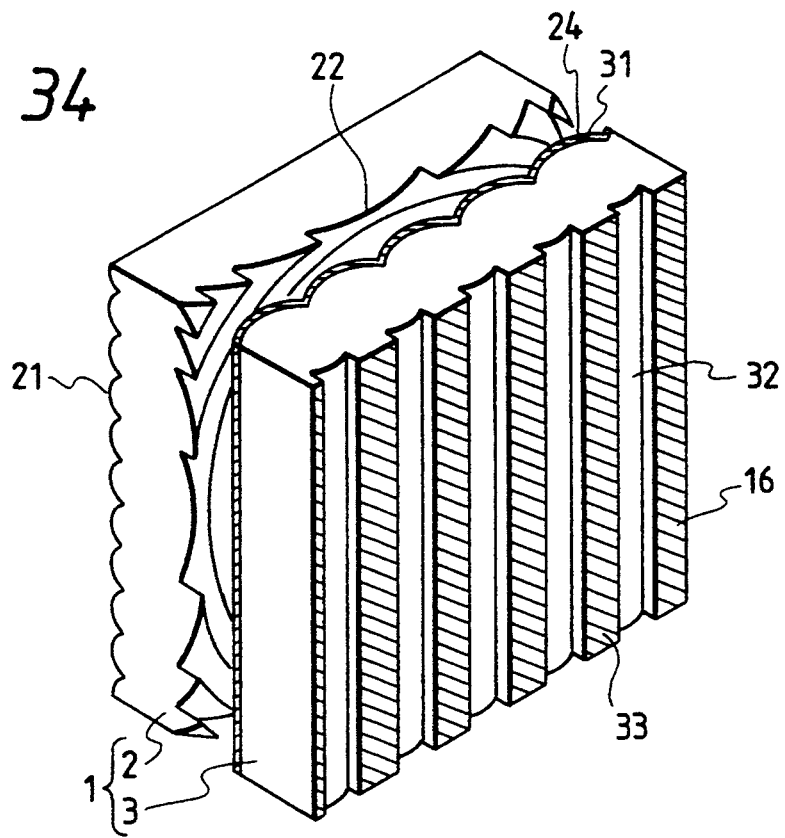
FIG. 34 is a perspective view of an essential portion of another modification of the rear-projection screen in the first embodiment according to the present invention.

Referring to FIG. 34, a lenticular lens sheet 3 on the viewing side has an entrance surface 31 coated with an antireflection coating 24 to improve the contrast of the image by reducing stray rays produced by multiple reflection between the lenticular lens sheet 3 and a Fresnel lens sheet 2 disposed adjacent to the lenticular lens sheet 3.

A desired surface of the rear-projection screen may be coated with an antireflection coating by applying a solution prepared, for example, by dissolving an amorphous fluorocarbon resin, such as CYTOP® (Asahi Glass, Ltd.) in a perfluoro-solvent of a specific concentration to a desired surface by a spin coating process or a dip coating process. Incidentally, an antireflection coating of CYTOP has a refractive index of 1.34 for D-rays of 589 nm in wavelength and is superior in performance to the conventional antireflection coating.

The exit surface 32 of the lenticular lens sheet 3 may be finished by a glare-proof process, an antistatic process and a surface hardening process, such as a hard coating process. A typical glare-proof process finishes the exit surface 32 of the lenticular lens sheet 3 in a mat surface or coats the exit surface 32 with an optical antireflection film. The glare-proof process reduces the reflection of ambient images and the ambient light on the exit surface 32. The antistatic process prevents the static attraction of dust to the surface of the lenticular lens sheet 3. The surface hardening process enhances the resistance of the surface of the lenticular lens sheet 3 against physical damages resulting from the impingement of matters on the surface of the lenticular lens sheet 3.

A rear-projection sheet in a third embodiment according to the present invention will be described hereinafter with reference to FIG. 35, in which parts like or corresponding to those of the rear-projection screen of FIG. 12 are denoted by the same reference characters and the description thereof will be omitted.

Figure 35:
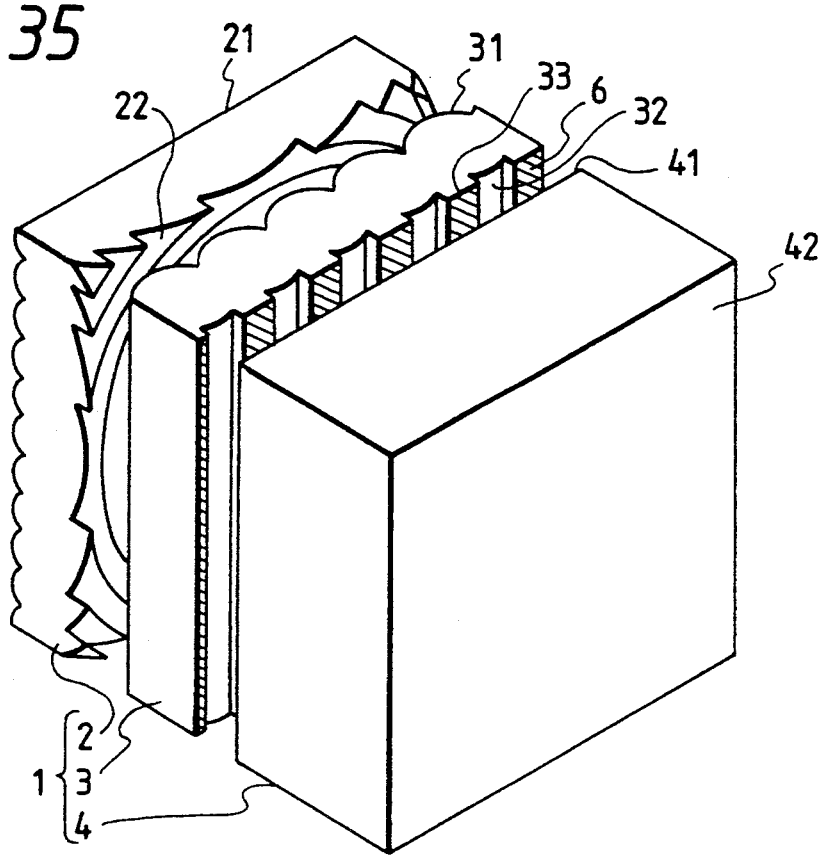
FIG. 35 is a perspective view of an essential portion of a rear-projection screen in a third embodiment according to the present invention.

Referring to FIG. 35, a rear-projection screen 1 in the third embodiment comprises a Fresnel lens sheet 2, a lenticular lens sheet 3 and a light absorbing sheet 4, which are fastened relative to each other. The light absorbing sheet 4 has a base sheet formed of a semitransparent, colored thermoplastic resin or a semitransparent, colored glass. The light absorbing sheet 4 has a flat entrance surface 41 and a flat exit surface 42. The rear-projection screen in the third embodiment is similar to the rear-projection screen of FIG. 12, except that the rear-projection screen in the third embodiment is provided additionally with the light absorbing sheet 4.

In the third embodiment, the light absorbing sheet 4 is formed of a semitransparent, colored thermoplastic resin and capable of absorbing the ambient light more intensively than the image light projected by the video source.

The image light projected by the video source travels once through the light absorbing sheet 4 and hence the quantity of the image light is reduced in proportion to the transmissivity of the light absorbing sheet 4. On the other hand, the ambient light excluding a portion thereof reflected by the exit surface 42 on the viewing side goes into and comes out from the light absorbing sheet 4 at least once and hence the quantity of the ambient light is reduced in proportion to the square of the transmissivity of the light absorbing sheet 4. Consequently, the contrast of the image displayed on the rear-projection screen is improved.

The image light is diffused vertically by horizontally elongate lenticular lenses forming the entrance surface 21 of the Fresnel lens sheet 2. The respective base sheets of the lenticular lens sheet 3 and the light absorbing sheet 4 do not contain any light diffusing material.

The rear-projection screen in the third embodiment, similarly to the rear-projection screen in the first embodiment, has improved focusing characteristics and enhanced vertical directional characteristics and is capable of displaying the image in improved brightness and contrast.

In the third embodiment, as well as in the first and second embodiments, there is restriction on the thickness of the lenticular lens sheet 3 to focus the incident light rays 14 by the first vertically elongate lenticular lenses forming the entrance surface 31 of the lenticular lens sheet 3 so that the light rays 14 pass through the second vertically elongate lenticular lenses forming the exit surface 32 of the lenticular lens sheet 3.

Such restriction applies also to the lenticular lens sheet 3 of the prior art rear-projection screen 1 of FIG. 1. In the prior art rear-projection screen 1, the Fresnel lens sheet 2 is formed in a thickness greater than that of the lenticular lens sheet 3 to secure a sufficiently high absorbing sheet 4. Consequently, the contrast of the image displayed on the rear-projection screen is improved.

The image light is diffused vertically by horizontally elongate lenticular lenses forming the entrance surface 21 of the Fresnel lens sheet 2. The respective base sheets of the lenticular lens sheet 3 and the light absorbing sheet 4 do not contain any light diffusing material.

The rear-projection screen in the third embodiment, similarly to the rear-projection screen in the first embodiment, has improved focusing characteristics and enhanced vertical directional characteristics and is capable of displaying the image in improved brightness and contrast.

In the third embodiment, as well as in the first and second embodiments, there is restriction on the thickness of the lenticular lens sheet 3 focus the incident light rays 14 by the first vertically elongate lenticular lenses forming the entrance surface 31 of the lenticular lens sheet 3 so that the light rays 14 pass through the second vertically elongate lenticular lenses forming the exit surface 32 of the lenticular lens sheet 3.

Such restriction applies also to the lenticular lens sheet 3 of the prior art rear-projection screen 1 of FIG. 1. In the prior art rear-projection screen 1, the Fresnel lens sheet 2 is formed in a thickness greater than that of the lenticular lens sheet 3 to secure a sufficiently high mechanical strength for the rear-projection screen 1. The thickness of the Fresnel lens sheet 2 of the rear-projection screen 1 of FIG. 35 is smaller than that of the Fresnel lens sheet of the prior art rear-projection screen and is approximately equal to that of the lenticular lens sheet 3, and the light absorbing sheet 4 is formed in a largest possible thickness. Accordingly, the mechanical strength of the rear-projection screen 1 of FIG. 35 is higher than that of the rear-projection screen 1 in the first embodiment shown in FIG. 12.

In the first, second and third embodiments, the entrance surface 21 or the exit surface 22 of the Fresnel lens sheet 2 is formed by the outward convex, horizontally elongate lenticular lenses. However, the entrance surface 21 may be formed in a different shape.

A rear-projection screen in a modification of the rear-projection screen in the third embodiment will be described with reference to FIG. 36.

Figure 36:
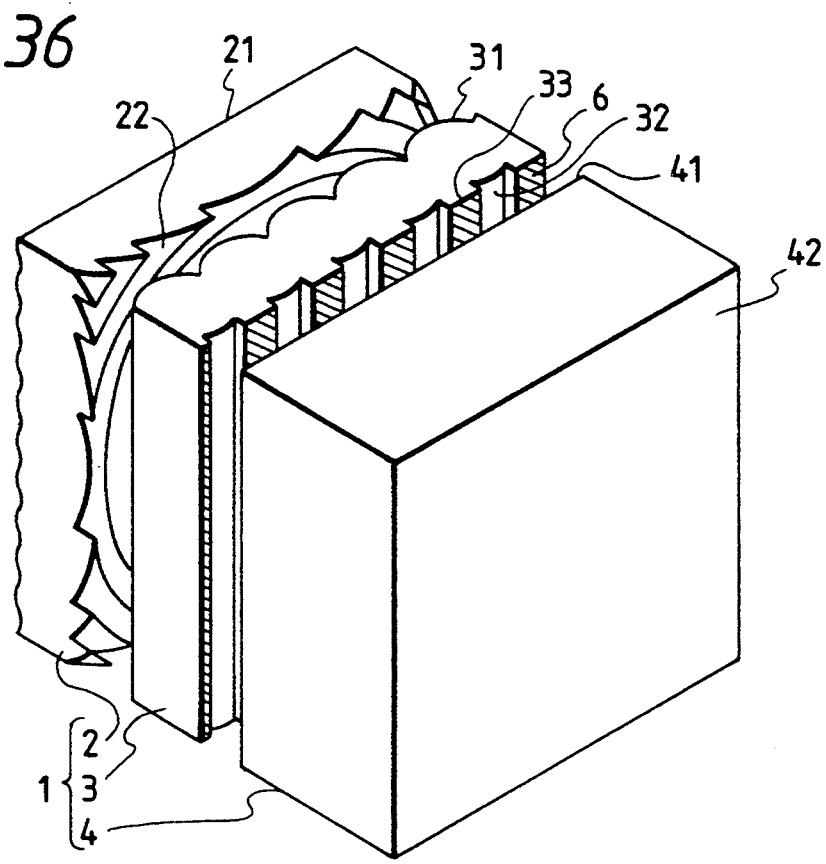
FIG. 36 is a perspective view of an essential portion of a modification of the rear-projection screen of FIG. 35.

Referring to FIG. 36, the rear-projection screen 1 has a Fresnel lens sheet 2 having an entrance surface 21 formed by alternately arranging horizontally elongate lenticular lenses convex toward the video source (these horizontally elongate lenticular lenses will be referred to as "horizontally elongate convex lenticular lenses") and horizontally elongate lenticular lenses concave toward the video source (these horizontally elongate lenticular lenses will be referred to as "horizontally elongate concave lenticular lenses").

Figure 37:
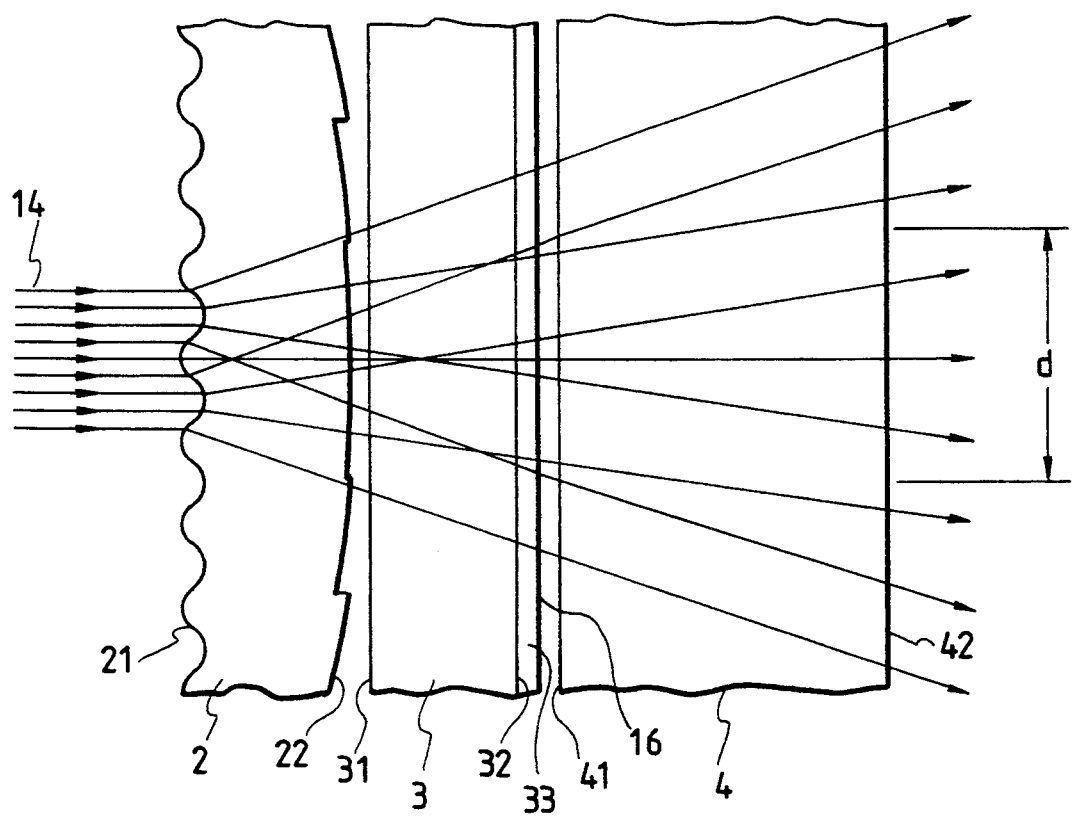
FIG. 37 is a fragmentary, vertical sectional view of the rear-projection screen of FIG. 36.

As shown in FIG. 37 showing the rear-projection screen 1 of FIG. 36 in a vertical sectional view, the incident light rays 14 falling on the Fresnel lens sheet 2 are diffused vertically by the horizontally elongate convex and concave lenticular lenses forming the entrance surface 21 and travel through a lenticular lens sheet 3 without being diffused vertically. Accordingly, the vertical width d of the outgoing light rays as viewed from the viewing side is substantially equal to the vertical width of the light rays on the exit surface 22 of the Fresnel lens sheet 2, so that the rear-projection screen 1 has satisfactory focusing characteristics.

The shape of the Fresnel lens sheet 2 of the rear-projection screen 1 of FIG. 36 facilitates molding the Fresnel lens sheet 2.

FIGS. 38a, 38b and 38c, are vertical sectional views of the Fresnel lens sheet 2 of the prior art rear-projection screen of FIG. 1, the Fresnel lens sheet 2 of the rear-projection screen 1 of FIG. 35 and the Fresnel lens sheet 2 of the rear-projection screen 1 of FIG. 36, respectively, in which the convex Fresnel lenses forming the exit surfaces of those Fresnel lens sheets 2 are omitted for simplicity.

As shown in FIG. 38a, the entrance surface 21 of the Fresnel lens sheet 2 of the prior art rear-projection screen 1 of FIG. 1 is formed by vertically arranging the horizontally elongate lenticular lenses convex toward the video source, and the shape of the surface of the horizontally elongate lenticular lenses has a relatively large radius of curvature. As shown in FIG. 38b, the entrance surface 21 of the Fresnel lens sheet 2 of the rear-projection screen 1 in the third embodiment is formed by vertically arranging the horizontally elongate lenticular lenses convex toward the video source, and the shape of the surface of the horizontally elongate lenticular lenses has a relatively small radius of curvature. Therefore, the surfaces of the adjacent horizontally elongate lenticular lenses intersect each other at an acute angle. Since the horizontally elongate lenticular lenses are arranged at a very small pitch in the range of 0.08 to 0.1 mm, portions of a molding die for molding the Fresnel lens sheet 2 having such horizontally elongate lenticular lenses, corresponding to the boundaries between the adjacent horizontally elongate lenticular lenses are liable to be rounded or deformed and, consequently, the molding die is unable to mold accurately portions of the Fresnel lens sheet 2 corresponding to the boundaries between the adjacent horizontally elongate lenticular lenses.

As shown in FIG. 38c, the entrance surface 21 of the Fresnel lens sheet 2 of the rear-projection screen of FIG. 36 is formed by alternately arranging the horizontally elongate convex lenticular lenses and the horizontally elongate concave lenticular lenses. Accordingly, the respective surfaces of the adjacent horizontally elongate convex and concave lenticular lenses do not intersect each other at an acute angle and the entrance surface 21 of the Fresnel lens sheet 2 has a continuously varying wavy shape. Accordingly, the entrance surface 21 of the Fresnel lens sheet 2 can be easily and accurately formed by molding.

If the radius of curvature of the horizontally elongate lenticular lenses of the rear-projection screen 1 of FIG. 36 is equal to that of the horizontally elongate lenticular lenses of the rear-projection screen 1 in the third embodiment, the vertical directional characteristics of the rear-projection screen 1 of FIG. 36 is substantially equivalent to those of the rear-projection screen 1 in the third embodiment.

FIG. 39 is a graph comparatively showing the respective vertical directional characteristics of the prior art rear-projection screen 1, the rear-projection screen 1 in the third embodiment and the rear-projection screen 1 in the modification of the third embodiment, in which vertical viewing angle is measured on the horizontal axis and relative brightness is measured on the vertical axis. In FIG. 39, a curve A represents the vertical directional characteristics of the prior art rear-projection screen employing the Fresnel lens sheet of FIG. 38a, and a curve B represents the vertical directional characteristics of the rear-projection screen in the third embodiment employing the Fresnel lens sheet of FIG. 38b and those of the rear-projection screen in the modification of the third embodiment, employing the Fresnel lens sheet of FIG. 38c. None of the respective lenticular lens sheets 3 of these rear-projection screens contain any light diffusing material. As is obvious from FIG. 39, the rear-projection screen employing the Fresnel lens sheet of FIG. 38c, similarly to the rear-projection screen employing the Fresnel lens sheet of FIG. 38b, has vertical directional characteristics covering a wide range of vertical viewing angle.

In determining the pitch of the horizontally elongate lenticular lenses forming the entrance surface 21 of the Fresnel lens sheet of FIG. 38c so as to reduce the degree of moiré, the pitch must be twice the distance between the highest point of the horizontally elongate convex lenticular lens and the lowest point of the adjacent horizontally elongate concave lenticular lens.

Table 4 shows design data of the horizontally elongate lenticular lenses forming the entrance surface 21 of the Fresnel lens sheet 2 of the rear-projection screen 1 in the modulation of the third embodiment, and the Fresnel lens forming the exit surface 22 of the same Fresnel lens sheet 2.

Figure 40:
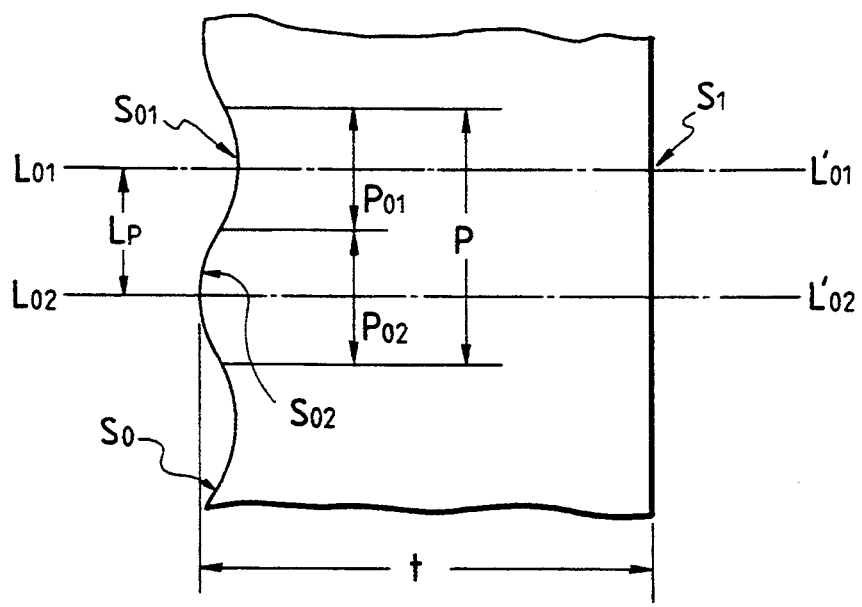
FIG. 40 is a fragmentary sectional view of a horizontally elongate lenticular lens of a structure specified in Table 4.

FIG. 40 is a schematic vertical sectional view of the horizontally elongate lenticular lenses of the design data specified Table 4.

TABLE 4

| Lens surface | Entrance ($S_0$) | | Exit ($S_1$) |
|---|---|---|---|
| | $S_{01}$ | $S_{02}$ | |
| Radius of curvature RD (mm) | −0.065625 | 0.065625 | −410.74 |
| Aspheric factors | | | |
| CC | 5.82 | 5.82 | 0 |
| AE | 0 | 0 | 0 |
| AF | 0 | 0 | 0 |
| AG | 0 | 0 | 0 |
| AH | 0 | 0 | 0 |
| Effective radius (P/2) (mm) | 0.25 | 0.25 | — |

TABLE 4-continued

| Lens surface | Entrance ($S_0$) | | Exit ($S_1$) |
|---|---|---|---|
| | $S_{01}$ | $S_{02}$ | |
| Spacing (t) (mm) | — | 2.0 | |
| Refractive index | | 1.517 | |

As shown in Table 4 and FIG. 40, the entrance surface 21 ($S_0$) consists of the surfaces $S_{01}$ of the horizontally elongate concave lenticular lenses and the surfaces $S_{02}$ of the horizontally elongate convex lenticular lenses. Since the respective effective radii (P/2) of the surfaces $S_{01}$ and $S_{02}$ are 0.025, and hence $0 \leq r \leq 0.025$ for $Z = Z(r)$ represented by the equation (1) for each of the surfaces $S_{01}$ and $S_{02}$.

The rear-projection screen employing the Fresnel lens sheet of the design data specified in Table 4 has vertical directional characteristics as shown in FIG. 20 similar to those of the rear-projection screen in the first embodiment employing the Fresnel lens sheet of the design data specified in Table 1.

Although one of the horizontally elongate convex lenticular lens convex toward the video source and the horizontally elongate concave lenticular lens concave toward the video source is the mirror image of the other as shown in FIG. 40, the horizontally elongate convex and concave lenticular lenses may be formed respectively in different shapes.

Figure 41A:
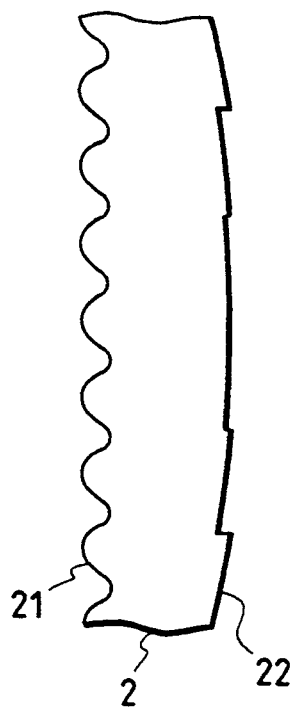
FIGS. 41a and 41b are fragmentary sectional views of a modification of the horizontally elongate lenticular lens of the rear-projection screen in the third embodiment.
Figure 41B:
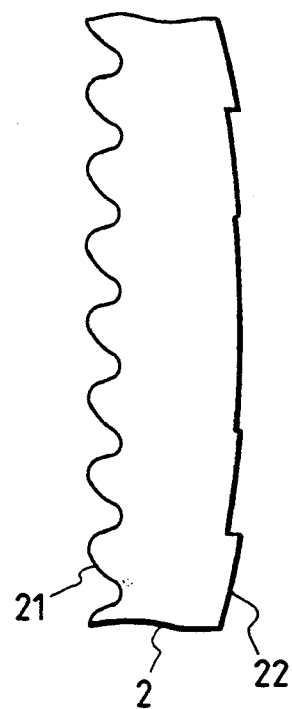

FIGS. 41a and 41b are vertical sectional views of the Fresnel lenses in modifications of the Fresnel lens sheet 2 employed in the rear-projection screen of FIG. 36.

Convex, horizontally elongate lenticular lenses and the concave, horizontally elongate lenticular lenses forming the entrance surface 21 of the Fresnel lens sheet 2 of FIG. 41a differ from each other in radius of curvature. Convex, horizontally elongate lenticular lenses and the concave, horizontally elongate lenticular lenses forming the entrance surface 21 of the Fresnel lens sheet 2 of FIG. 41b are vertically asymmetrical. The vertical directional characteristics of a rear-projection screen provided with the Fresnel lens sheet 2 of FIG. 41b are asymmetrical.

Table 5 shows the design data of the Fresnel lens sheet 2 of FIG. 41a.

TABLE 5

| Lens surface | Entrance ($S_0$) | | Exit ($S_1$) |
|---|---|---|---|
| | $S_{01}$ | $S_{02}$ | |
| Radius of curvature RD (mm) | −0.02625 | 0.105 | −410.74 |
| Aspheric factors | | | |
| CC | 5.82 | 5.82 | 0 |
| AE | 0 | 0 | 0 |
| AF | 0 | 0 | 0 |
| AG | 0 | 0 | 0 |
| AH | 0 | 0 | 0 |
| Effective radius (P/2) (mm) | 0.010 | 0.040 | — |
| Spacing (t) (mm) | — | 2.0 | |
| Refractive index | | 1.517 | |

The Fresnel lens sheet 2 of the design data specified in Table 5 differs from the Fresnel lens sheet 2 of the design data specified in Table 4 in that the effective radius of the surface $S_{01}$ of the concave horizontally elongate lenticular lenses is smaller than that of the surface $S_{02}$ of the horizontally elongate convex lenticular lenses. The rear-projection screen employing the Fresnel lens sheet 2 of the design data specified in Table 5 has vertical directional characteristics as shown in FIG. 20 similar to those of the rear-projection screen employing the Fresnel lens sheet 2 of the design data specified in Table 4.

As is apparent from the foregoing description, the rear-projection screen in the modification of the rear-projection screen in the third embodiment has improved focusing characteristics and enhanced vertical directional characteristics, and is capable of displaying an image in high brightness and high contrast and of being easily formed by molding.

A rear-projection screen in a fourth embodiment according to the present invention will be described hereinafter with reference to FIGS. 42 to 47.

Figure 42:
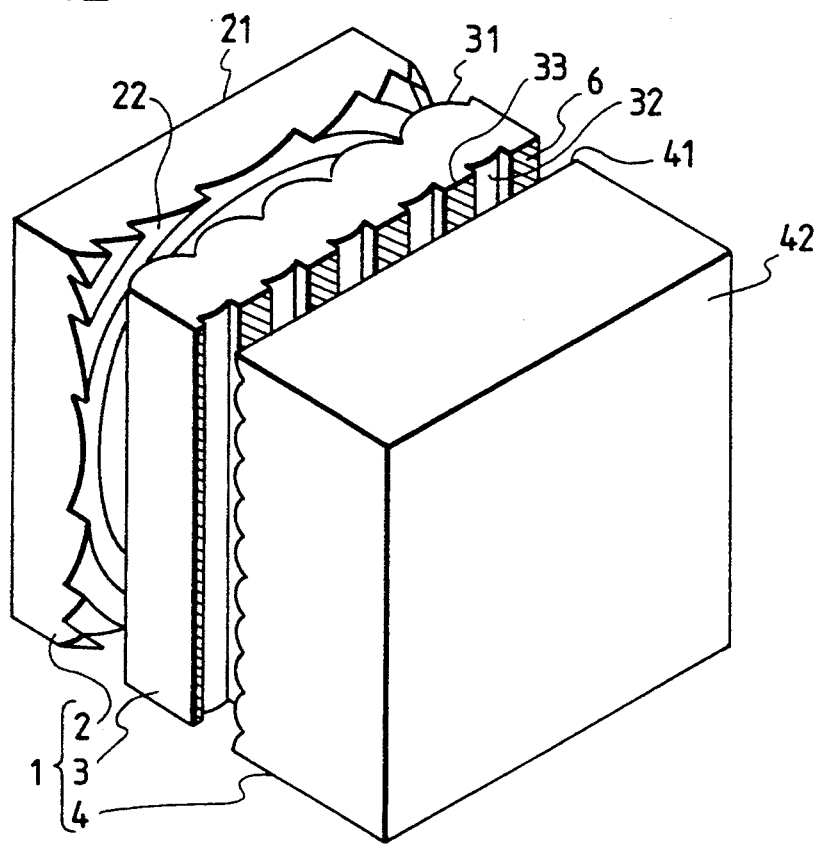
FIG. 42 is a perspective view of an essential portion of a rear-projection screen in a fourth embodiment according to the present invention.

FIG. 42 is a perspective view of an essential portion of the rear-projection screen in the fourth embodiment, in which parts like or corresponding to those of the rear-projection screen of FIG. 35 are denoted by the same reference characters and the description thereof will be omitted.

Referring to FIG. 42, the rear-projection screen 1 in the fourth embodiment is similar in construction to the rear-projection screen in the third embodiment shown in FIG. 35, except that the rear-projection screen in the fourth embodiment has a Fresnel lens sheet 2 having a flat entrance surface 21 not provided with any horizontally elongate lenticular lenses, and a light absorbing sheet 4 having an entrance surface 41 formed by vertically arranging a plurality of horizontally elongate lenticular lenses.

In the fourth embodiment, the light rays are diffused vertically by the horizontally elongate lenticular lenses forming the entrance surface 41 of the light absorbing sheet 4. The base sheet of a lenticular lens sheet 3 employed in the rear-projection screen in the fourth embodiment contains a light diffusing material scarcely.

Figure 43:
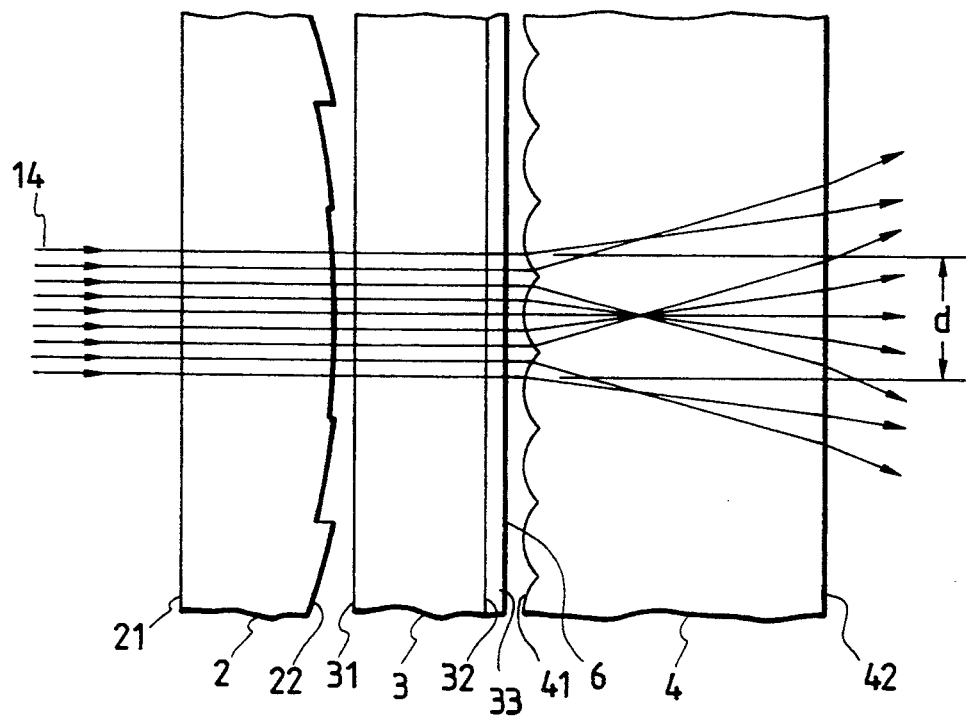
FIG. 43 is a fragmentary, vertical sectional view of the rear-projection screen of FIG. 42.

FIG. 43 is a vertical sectional view of the rear-projection screen of FIG. 42. In FIG. 43, parts like or corresponding to those shown in FIG. 37 are denoted by the same reference characters and the description thereof will be omitted.

Since the lenticular lens sheet 3 contains the light diffusing material 15 scarcely, the light rays 14 falling on the Fresnel lens sheet 2 travel through the Fresnel lens sheet 2 and the lenticular lens sheet 3 without being vertically diffused, and then the light rays 14 are diffused vertically by the horizontally elongate lenticular lenses forming the entrance surface 41 of the light absorbing sheet 4 as shown in FIG. 43. Accordingly, the vertical width d of the light rays as viewed from the viewing side is substantially equal to the vertical width of the light rays on the exit surface 32 of the lenticular lens sheet 3, so that the rear-projection screen 1 has satisfactory focusing characteristics.

The light absorbing sheet 4 is disposed with the entrance surface 41 thereof adjacent to the exit surface 32 of the lenticular lens sheet 3, and hence the origin of horizontal divergence of the light rays and that of vertical divergence of the light rays are close to each other. Accordingly, the focusing characteristics are not deteriorated.

When the ambient light falls on the rear-projection screen, the quantity of the ambient light reflected toward the viewing side by the horizontally elongate lenticular lenses forming the entrance surface 41 of the light absorbing sheet 4 is relatively large as compared with the quantity of the ambient light reflected toward the viewing side by the rear-projection screen in the third embodiment shown in FIG. 35 and thereby the contrast of the image is decreased. However, the decrease in the contrast of the image can be compensated with matting the entrance surface 41 of the light absorbing sheet 4 entirely or coating the entrance surface 41 of the light absorbing sheet 4 entirely with an antireflection film.

Table 6 shows the design data of the entrance surface 41 ($S_0$) and the exit surface 42 ($S_1$) of the light absorbing sheet 4 of the rear-projection screen in the fourth embodiment.

TABLE 6

| Lens surface | Entrance ($S_0$) | Exit ($S_1$) |
| --- | --- | --- |
| Radius of curvature | 0.09 | ∞ |
| Aspheric factors | | |
| CC | 4.06 | 0.0 |
| AE | 0.0 | 0.0 |
| AF | 0.0 | 0.0 |
| AG | 0.0 | 0.0 |
| AH | 0.0 | 0.0 |
| Effective radius (P/2) (mm) | 0.04 | — |
| Spacing (t) (mm) | 3.0 | |
| Refractive index | 1.493 | |

Figure 44:
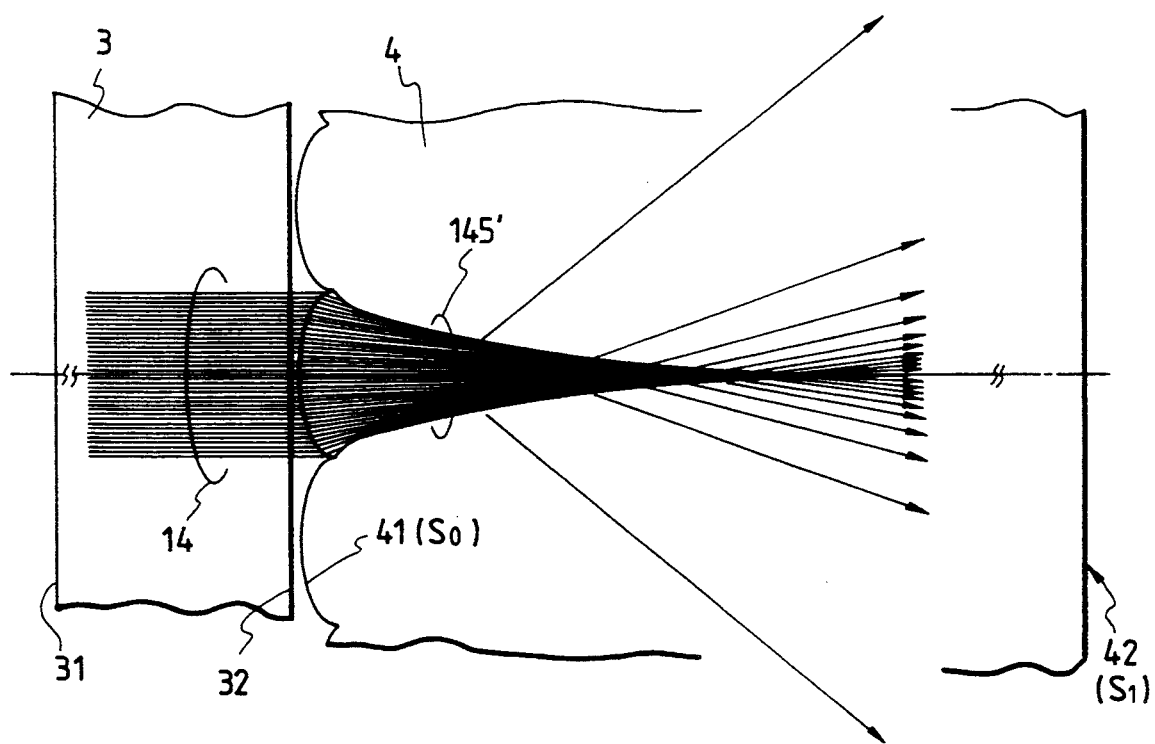
FIG. 44 is a sectional view of a horizontally elongate lenticular lens of a structure specified in Table 6.
Figure 45:
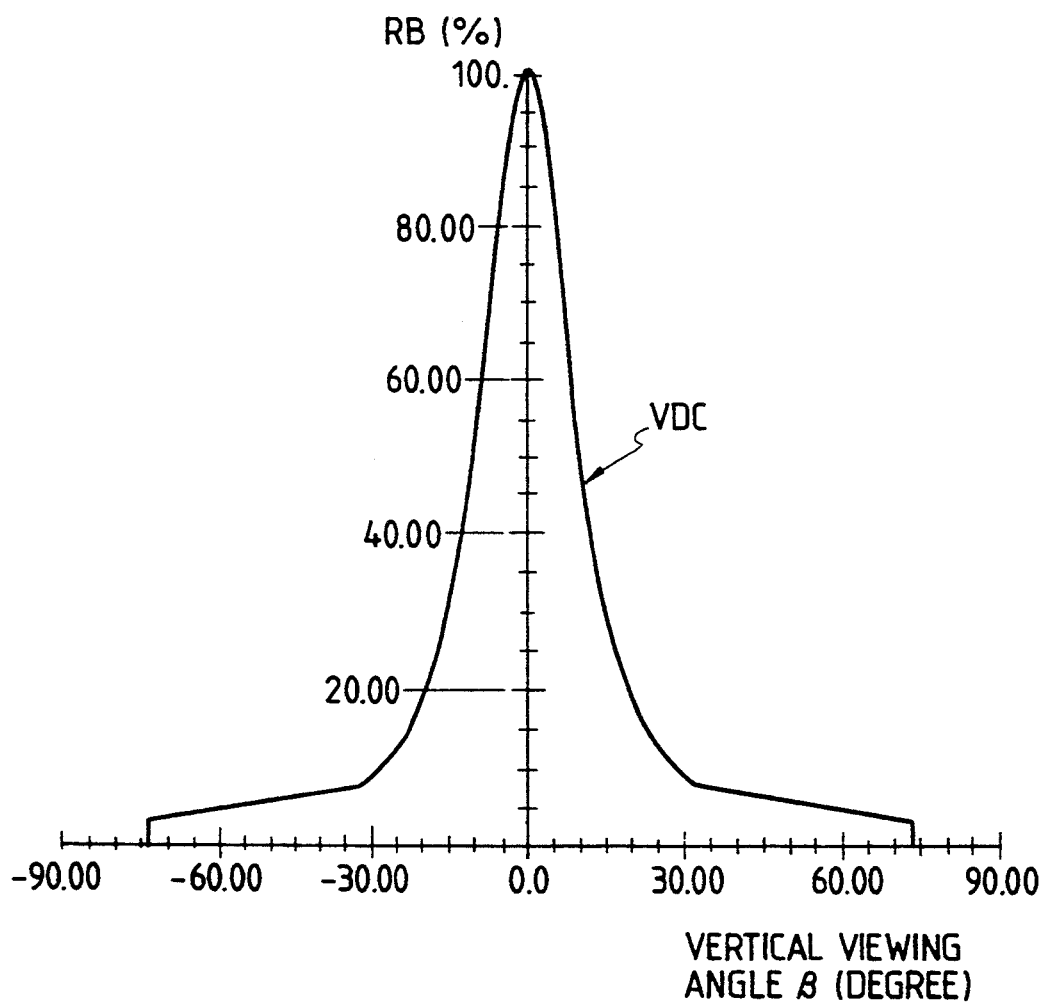
FIG. 45 is a graph showing the vertical directional characteristics of the horizontally elongate lenticular lens of FIG. 44.

FIG. 44 is a sectional view of of the light absorbing sheet 4 of the design data specified in Table 6, and FIG. 45 is a graph showing the vertical directional characteristics of the rear-projection screen employing the light absorbing sheet 4 of the design data specified in Table 6.

As is obvious from FIG. 45, the vertical angular range of visibility is as large as ±74° and the specific vertical viewing angle is ±10° which is sufficiently wide.

The variation of the refracting effect of the horizontally elongate lenticular lenses forming the entrance surface 41 of the light absorbing sheet 4 will be described with reference to FIG. 21.

Referring to FIG. 21, the second derivative of the equation (1) defining the shape of the entrance surface 41 of the light absorbing sheet 4 is measured on the vertical axis, and the relative distance, i.e., the distance from the optical axis normalized by the effective radius P/2, is measured on the horizontal axis. The curves 211 and 213 indicate the dependence of the refracting effect of the prior art rear-projection screen and the rear-projection screen employing the light absorbing sheet 4 of the design data specified in Table 6 on the relative distance, respectively.

As indicated by the curve 213, the second derivative of the equation (1) for the the horizontally elongate lenticular lenses forming the entrance surface 41 of the light absorbing sheet 4 increases with the relative distance in a positive range, which indicates that the refracting effect of the horizontally elongate lenticular lens increases with the relative distance. On the other hand, as indicated by the curve 211, the second derivative of the equation (1) for the prior art horizontally elongate lenticular lens remains substantially constant, which indicates that the refracting effect does not change.

Thus, the rear-projection screen in the fourth embodiment has satisfactory focusing characteristics and enhanced vertical directional characteristics and, is capable of displaying an image in high brightness and high contrast.

Since the aspheric shape of the horizontally elongate lenticular lenses of the light absorbing sheet 4 in the fourth embodiment is designed so as to secure vertical directional characteristics covering a wide range of vertical viewing angle without using any light diffusing material, the visual sensation of the brightness difference between adjacent portions of the exit surface 42 of the light absorbing sheet 4 corresponding to the vertically arranged horizontally elongate lenticular lenses is mitigated, and hence moiré is obscure. Such an effect of the horizontally elongate lenticular lenses of the light absorbing sheet 4 will be described hereinafter with reference to FIG. 46.

The horizontally elongate lenticular lens of the light absorbing sheet 4 in the fourth embodiment focuses the light rays in a mode shown in FIG. 44. The incident light rays falling on the entrance surface 41 of the light absorbing sheet 4 are focused on a focus within the light absorbing sheet 4 by the horizontally elongate lenticular lens, and then the light rays diverge from the focus and travel toward the exit surface 42. Thus, the light rays representing each picture element of an image are diffused in diffused light rays 145' in a predetermined range of diffusion.

Figure 46:
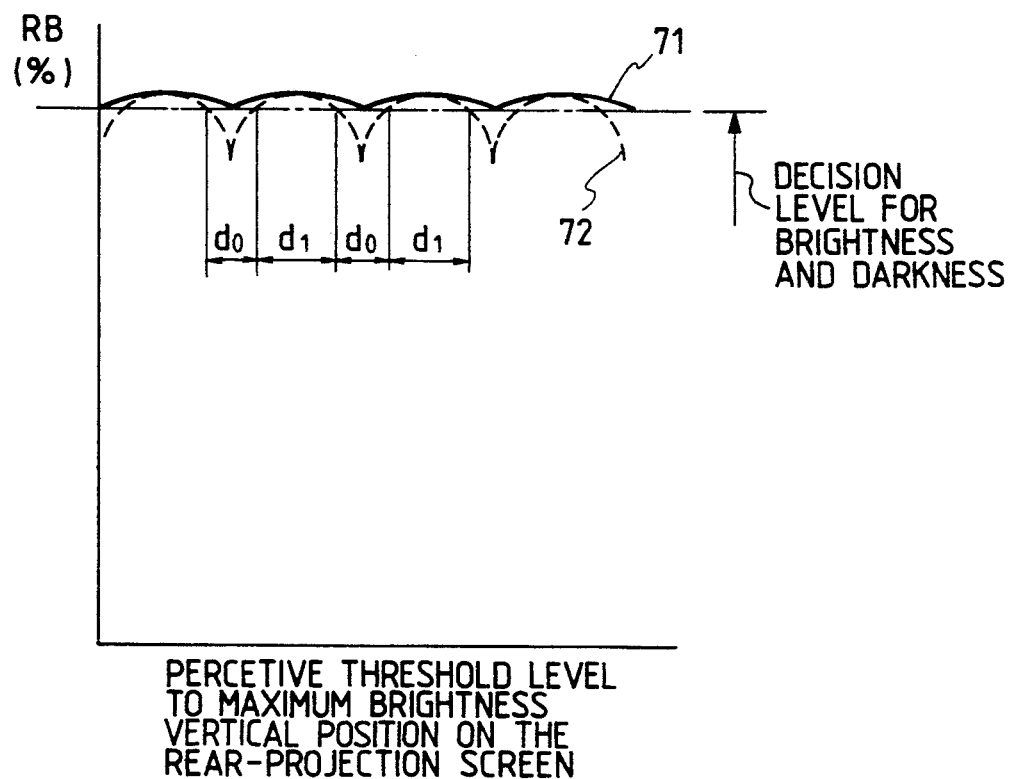
FIG. 46 is a graph comparatively showing brightness distribution with respect to vertical direction on the rear-projection screen of FIG. 1 and the rear-projection screen of FIG. 42.

Since this range of diffusion is very wide and the vertical directional characteristics cover a wide range of vertical viewing angle as shown in FIG. 45, a vertical brightness distribution curve 71 indicating the vertical brightness distribution on the exit surface 42 is relatively flat as shown in FIG. 46; that is, the brightness difference between the brighter portion and the darker portion is small. Accordingly, even if moiré is formed by the brighter lines and darker lines alternately appearing on the exit surface 41, the intensity of moiré is very low.

The entrance surface 41 of the light absorbing sheet 4 need not necessarily be formed by the horizontally elongate convex lenticular lenses convex toward the video source.

Figure 47:
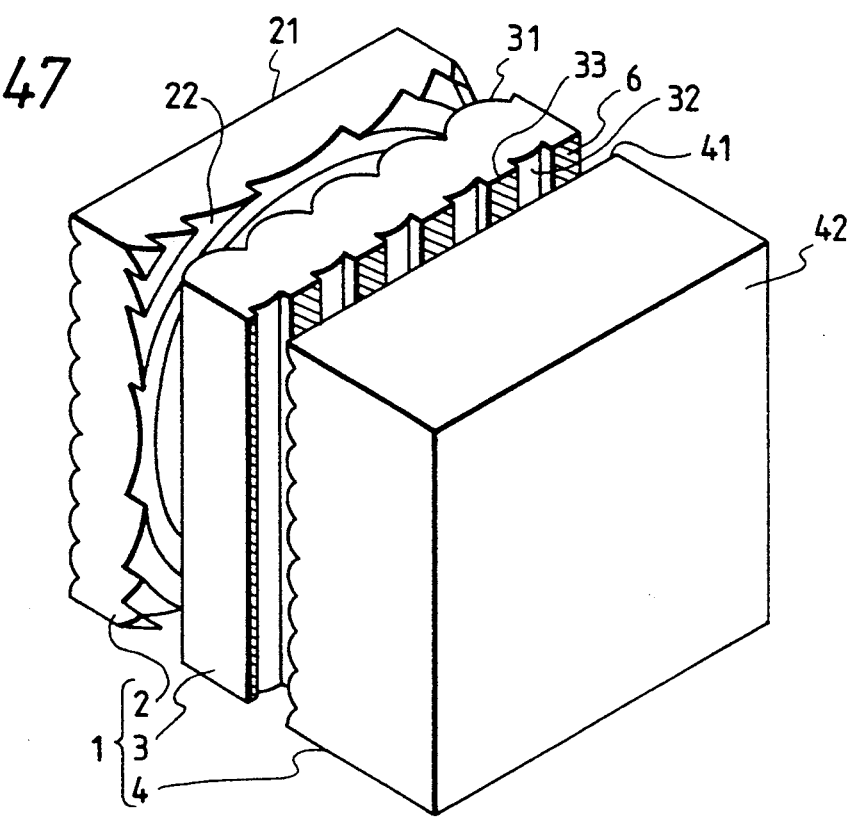
FIG. 47 is a perspective view of an essential portion of a modification of the rear-projection screen in a fourth embodiment according to the present invention.
Figure 48:
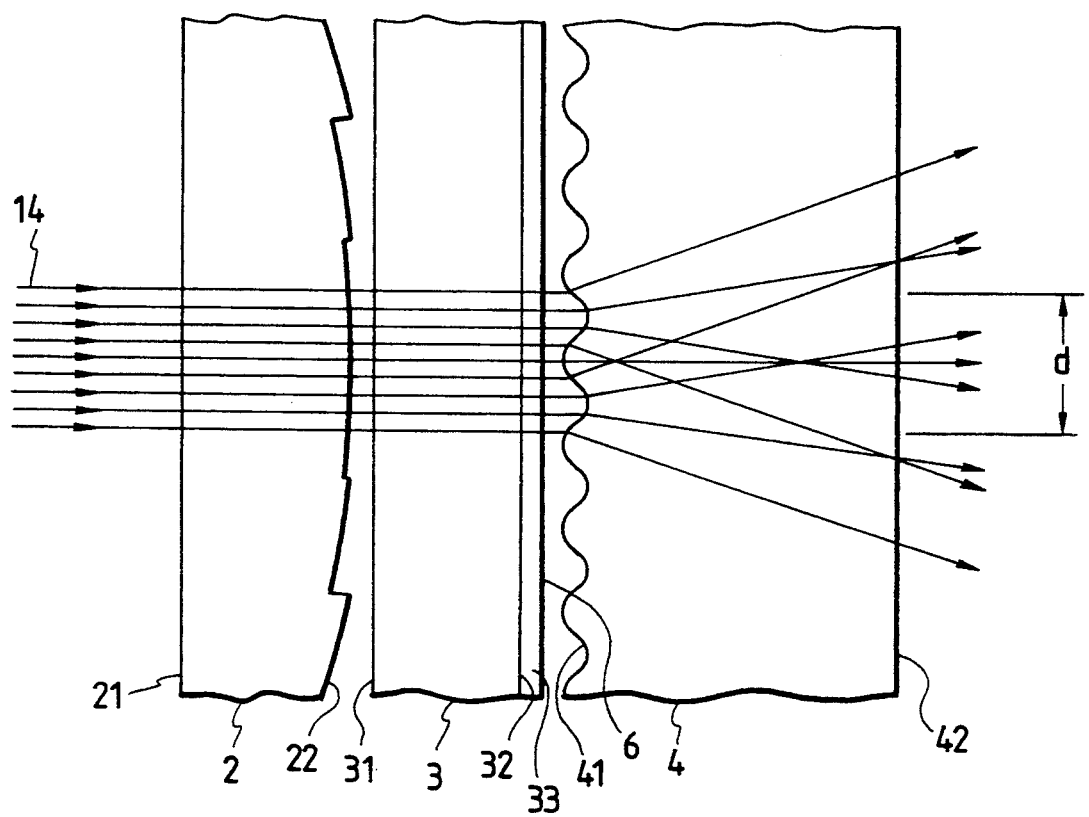
FIG. 48 is a vertical sectional view of the rear-projection screen of FIG. 47.

FIG. 47 is a perspective view of an essential portion of a modification of the rear-projection screen in the fourth embodiment, and FIG. 48 is a vertical sectional view of the rear-projection screen of FIG. 47.

A light absorbing sheet 4 shown in FIG. 47 has an entrance surface 41 formed by vertically and alternately arranging horizontally elongate convex lenticular lenses convex toward the video source and horizontally elongate concave lenticular lenses concave toward the video source. The rear-projection screen of FIG. 47, similarly to that of FIGS. 42 and 43, has satisfactory focusing characteristics.

A rear-projection screen in a fifth embodiment according to the present invention will be described hereinafter with reference to FIGS. 49 and 50.

Figure 49:
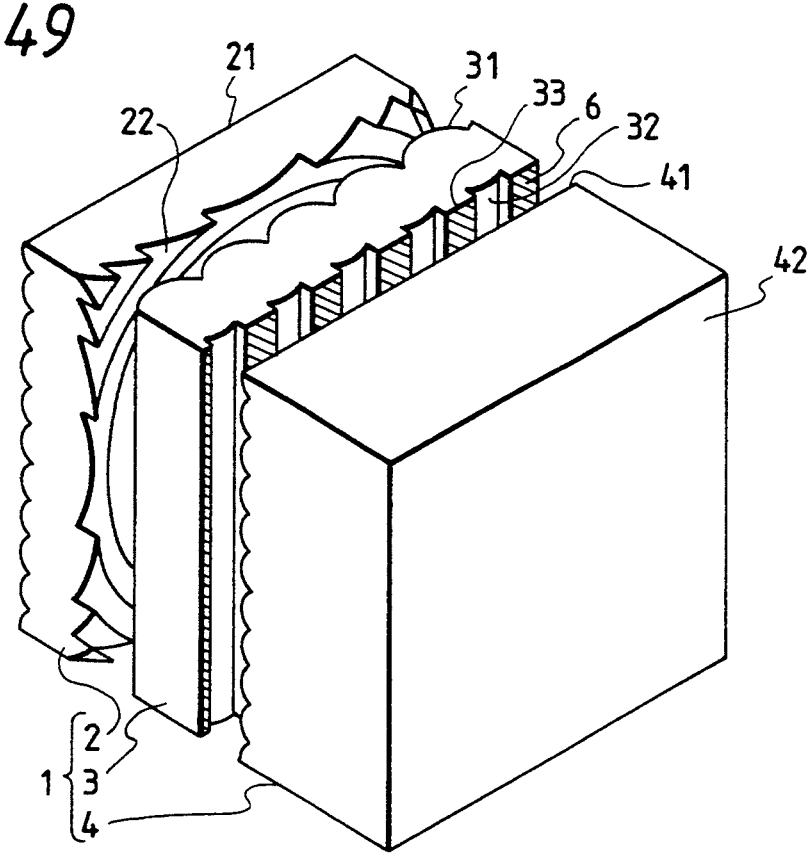
FIG. 49 is a perspective view of an essential portion of a rear-projection screen in a fifth embodiment according to the present invention.

FIG. 49 is a perspective view of an essential portion of the rear-projection screen in the fifth embodiment, in which parts like or corresponding to those shown in FIGS. 35 and 42 are denoted by the same reference characters and the description thereof will be omitted.

Referring to FIG. 49, the rear-projection screen 1 comprises a Fresnel lens sheet 2 of a thickness smaller than that of the Fresnel lens sheet of the prior art rear-projection screen, a lenticular lens sheet 3 and a light absorbing sheet 4. The Fresnel lens sheet 2 has an entrance surface 21 formed, similarly to the entrance surface 21 of the Fresnel lens sheet 2 in the third embodiment shown in FIG. 35, by vertically arranging horizontally elongate lenticular lenses. The light absorbing sheet 4 has an entrance surface 41 formed, similarly to the entrance surface 41 of the light absorbing sheet 4 shown in FIG. 42, by vertically arranging horizontally elongate lenticular lenses.

In the fifth embodiment, light rays are diffused vertically by the horizontally elongate lenticular lenses forming the entrance surface 21 of the Fresnel lens sheet 2, and the horizontally elongate lenticular lenses forming the entrance surface 41 of the light absorbing sheet 4. The base sheet of the lenticular lens sheet 3 contains the light diffusing material scarcely.

The focusing characteristics of the rear-projection screen 1 are slightly inferior to those of the rear-projection screen in the fourth embodiment, but superior to those of the prior art rear-projection screen because the thickness of the Fresnel lens sheet 2 is relatively small.

Thus, the rear-projection screen 1 in the fifth embodiment has satisfactory focusing characteristics and vertical directional characteristics covering a wide range of vertical viewing angle, and is capable of displaying an image in high brightness and high contrast.

Figure 50:
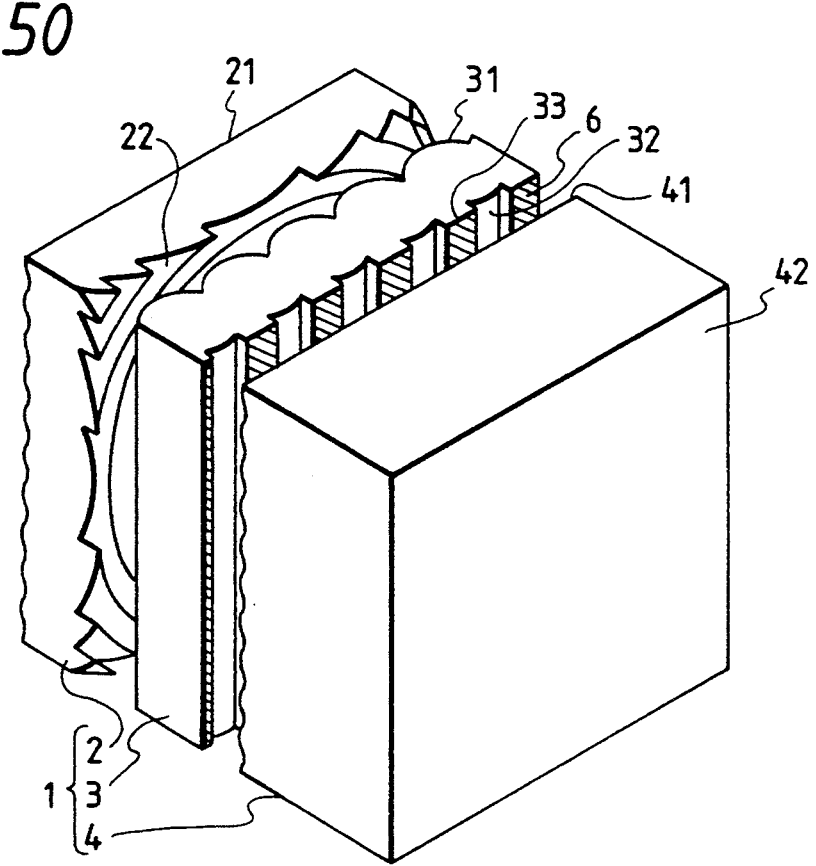
FIG. 50 is a vertical sectional view of the rear-projection screen of FIG. 49.

FIG. 50 is a perspective view of an essential portion of a rear-projection screen in a modification of the rear-projection screen in the fifth embodiment shown in FIG. 49.

Referring to FIG. 50, the rear-projection screen 1 comprises a Fresnel lens sheet 2, a lenticular lens sheet 3 and a light absorbing sheet 4. The Fresnel lens sheet 2 has an entrance surface 21 formed by alternately and vertically arranging horizontally elongate lenticular lenses convex toward the video source, i.e., horizontally elongate convex lenticular lenses, and horizontally elongate lenticular lenses concave toward the video source, i.e., horizontally elongate concave lenticular lenses. The light absorbing sheet 4 has an entrance surface 41 similar to the entrance surface 21 of the Fresnel lens sheet 2.

If light rays are diffused primarily by the horizontally elongate lenticular lenses of either the Fresnel lens sheet 2 or the light absorbing sheet 4 and secondarily by the horizontally elongate lenticular lenses of the other, the entrance surface of the latter may be formed, similarly to the entrance surface of the Fresnel lens sheet of the prior art rear-projection screen, by vertically arranging only horizontally elongate convex lenticular lenses convex toward the video source, because the surfaces of horizontally elongate lenticular lenses for the secondary light diffusion have a gentle, convex shape and are easy to form by molding.

The rear-projection screens in the first, third, fourth and fifth embodiment are capable of obscuring ghost images attributable to the unnecessary reflection of the light rays by the Fresnel lens forming the exit surface 22 of the Fresnel lens sheet 2. Functions to obscure ghost images will be described hereinafter.

Figure 51A:
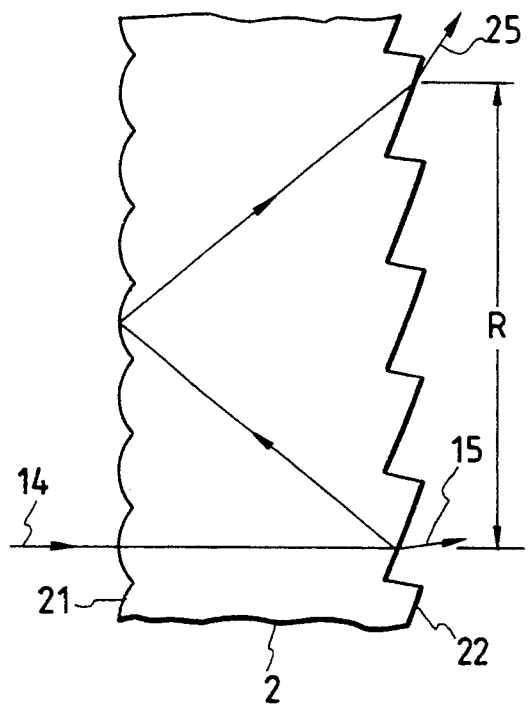
FIGS. 51a and 51b are fragmentary vertical sectional views of a Fresnel lens sheet included in the prior art rear-projection screen and a Fresnel lens sheet included in the rear-projection screen of FIG. 36, respectively.
Figure 51B:
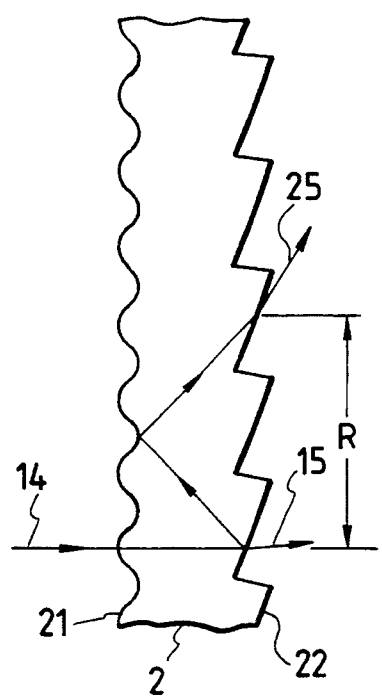
Figure 52A:
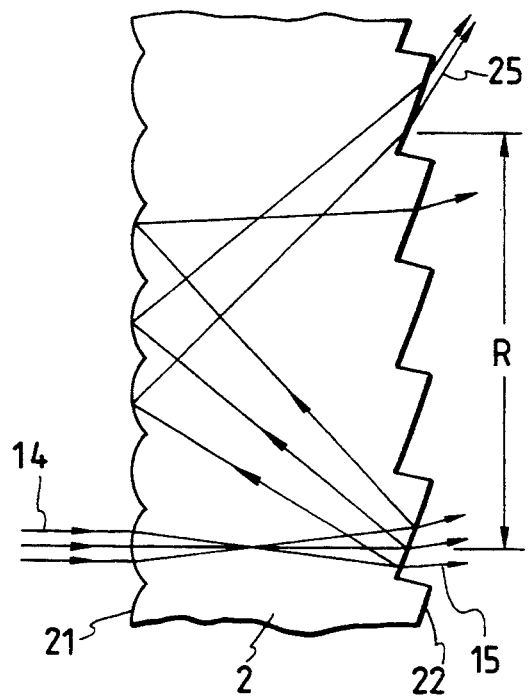
FIGS. 52a and 52b are fragmentary vertical sectional views of a Fresnel lens sheet included in the prior art rear-projection screen and a Fresnel lens sheet included in the rear-projection screen of FIG. 42, respectively.
Figure 52B:
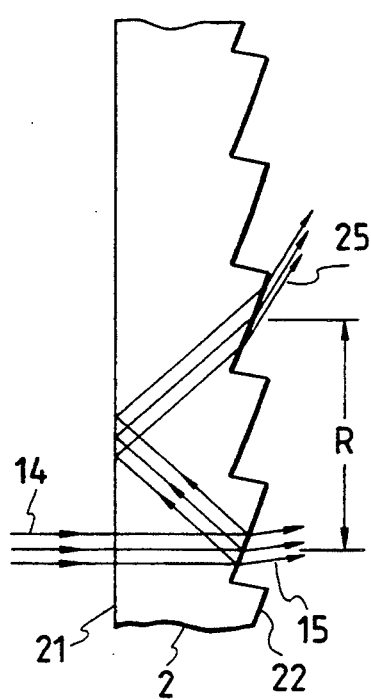

FIGS. 51a and 52a are vertical sectional views of the Fresnel lens sheet 2 of the prior art rear-projection screen 1 of FIG. 1, FIG. 51b is the vertical sectional view of the Fresnel lens sheet 2 of the rear-projection screen 1 of FIG. 36, and FIG. 52b is a vertical sectional view of the Fresnel lens sheet 2 of the rear-projection screen of FIG. 42.

Generally, as shown in FIGS. 51a, 51b, 52a and 52b, most incident light rays 14 travel through the Fresnel lens sheet 2 in outgoing light rays 15, but some of the incident light rays 14 are reflected by the exit surface 22, reflected again by the entrance surface 21 toward the exit surface 22 and become ghost rays 25.

Since the prior art Fresnel lens sheet 2 has a relatively large thickness, the distance R between the desired image and the ghost image is relatively large as shown in FIGS. 51a and 52a, and hence the ghost image is clearly discernible. On the other hand, since the Fresnel lens sheet 2 in the foregoing embodiments has a relatively small thickness, the distance R between the desired image and the ghost image is relatively small as shown in FIGS. 51b and 52b, and hence the ghost image is obscure.

Forming the Fresnel lens sheet 2 in a relatively small thickness approximately equal to that of the lenticular lens sheet 3 improves the focusing characteristics of the rear-projection screen effectively.

In the first or second embodiment, neither the Fresnel lens sheet 2 nor the lenticular lens sheet 3 contains the light diffusing material 15. However, the lenticular lens sheet 3 may contain a small amount of the light diffusing material 15 for auxiliary light diffusing function. In the third, fourth and fifth embodiments, none of the Fresnel lens sheet 2, the lenticular lens sheet 3 and the light absorbing sheet 4 contains the light diffusing material 15. However, either the lenticular lens sheet 3 or the light absorbing sheet 4, or both the lenticular lens sheet 3 and the light absorbing sheet 4 may contain a small amount of the light diffusing material for auxiliary light diffusing function. When only a properly small amount of the light diffusing material 15 is added to the sheet or the sheets for auxiliary light diffusing function, the vertical directional characteristics are enhanced substantially without deteriorating the focusing characteristics and without reducing the contrast of the image.

Although the lenticular lens sheet 3 in each of the foregoing embodiments has the entrance surface 31 formed by the first vertically elongate lenticular lenses and the exit surface 32 formed by the second vertically elongate lenticular lenses, the exit surface 32 of the lenticular lens sheet 3 may be a flat surface provided with the light absorbing strips 16. When the exit surface 32 of the lenticular lens sheet 3 is a flat surface provided with the light absorbing strips 16, the degree of color shift increases but the performance of the rear-projection screen other than that of suppressing color shift is equivalent to that of the rear-projection screens in the foregoing embodiments.

The exit surface 42 of the light absorbing sheet 4 may be finished by surface finishing processes including a glare-proof process, an antistatic process and a surface hardening process. A typical glare-proof process finishes the exit surface 42 of the light absorbing sheet 4 in a mat surface or coats the exit surface 42 with an optical antireflection film. The glare-proof process reduces the reflection of ambient images and the ambient light on the exit surface 42. The antistatic process prevents the static attraction of dust to the surface 42 of the light absorbing sheet 4. The surface hardening process enhances the resistance of the exit surface 42 of the light absorbing sheet 4 against physical damages resulting from the impingement of matters on the exit surface 42 of the light absorbing sheet 4.

A rear-projection image display as shown in FIG. 13 provided with one of the rear-projection screens 1 of the first to fifth embodiments will be described hereinafter.

Preferably, the rear-projection image display is provided with a means for enhancing the contrast of the image.

As shown in FIGS. 13 and 14, the rear-projection image display is provided with three projection CRTs 7R, 7G and 7B (only the green projection CRT 7G for projecting a green image is shown in FIG. 13) for projecting images of three primary colors. Since the three projection CRTs 7R, 7G and 7B and the associated components are the same in function and construction, only the green projection CRT 7G and the associated components will be described.

Figure 53:
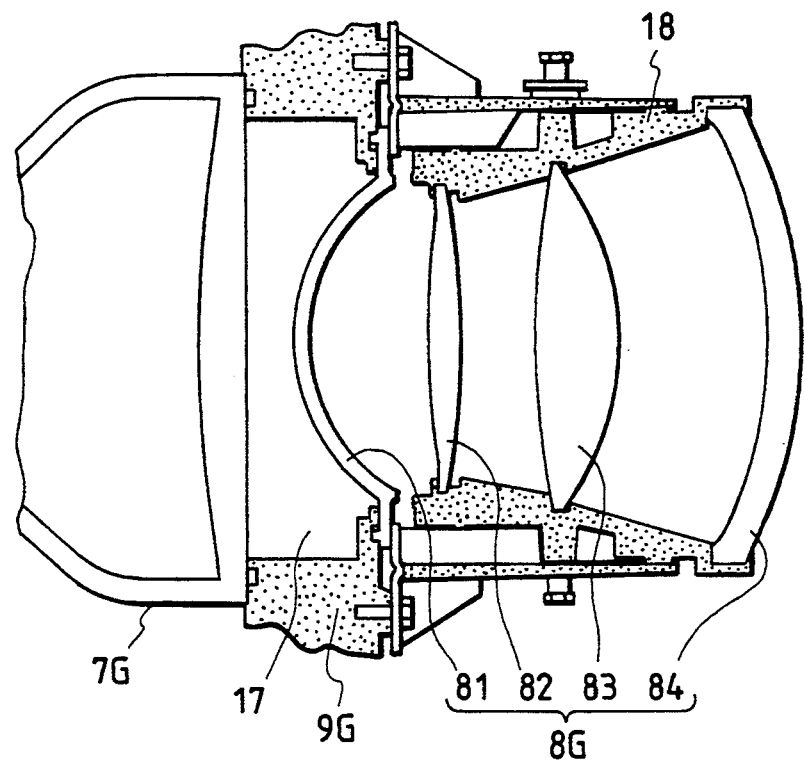
FIG. 53 is a sectional view of a coupler connecting a projection CRT and a projection lens unit included in the rear-projection image display of FIG. 13.

Referring to FIG. 53, the green projection CRT 7G is connected to a projection lens unit 8G by a coupler 9G. The projection lens unit 8G comprises a lens barrel 18, a first lens 81, a second lens 82, a third lens 83 and a fourth lens 84. The first lens 81 is a concave lens having a convex surface and a concave surface and disposed with the convex surface thereof on the side of the projection CRT 7G. A liquid coolant 17, such as ethylene glycol, water, glycerol or a mixture of these liquid coolant, is sealed in a space between the projection CRT 7G and the first lens 81. If the space is filled merely with air instead of the liquid coolant 17, some of the light rays projected by the projection CRT 7G and traveling toward the first lens 81 stray within the projection optical system. If the stray light rays reach the rear-projection screen 1 after being reflected repeatedly in the projection optical system or the console 12, the contrast of the image is decreased.

When the space is filled with the liquid coolant 17, reflection loss of the light rays at interfaces between the projection CRT 7G and the liquid coolant 17 and between the liquid coolant 17 and the first lens 81 is very small and the image is displayed in high contrast, because the respective refractive indices of the screen of the projection CRT 7G, the liquid coolant 17 and the first lens 81 are approximately equal values on the order of 1.5.

The projection lens unit 8G consisting of the four lenses 81, 82, 83 and 84 is such as disclosed in Japanese Patent Laid-open (Kokai) No. Hei 1-250916. However, the rear-projection image display may employ a projection lens unit other than that shown in FIG. 53, such as disclosed in Japanese Patent Laid-open (Kokai) No. Hei 3-246512 or Hei 3-276113 or U.S. Pat. No. 4,963,007.

In constructing the rear-projection image display as shown in FIG. 13 by using the rear-projection screen 1 in one of the foregoing embodiments, it is preferable that the rear-projection image display incorporates conventional focusing characteristics improving means.

One of the focusing characteristics improving means is a reflective optical thin film formed on a major surface of the base of the reflecting mirror 11 facing the projection lens unit 8G and the rear-projection screen 1.

Figure 54A:
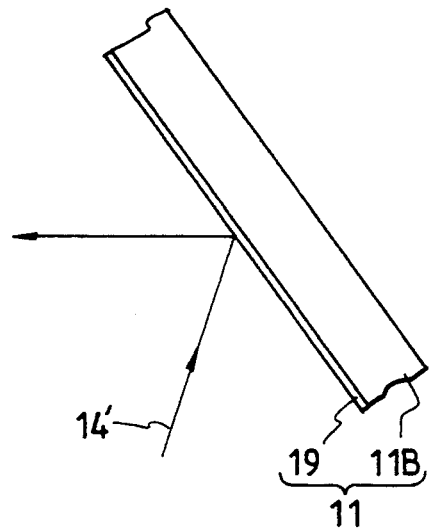
FIGS. 54a and 54b are sectional views of a reflecting mirror included in the rear-projection image display of FIG. 13 and a reflecting mirror included in the prior art rear-projection screen.
Figure 54B:
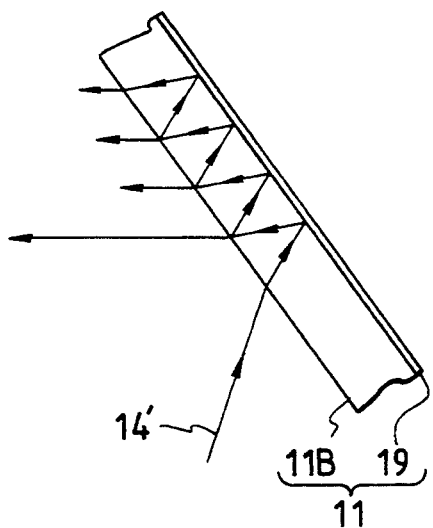

FIG. 54a shows a reflecting mirror 11 comprising a base 11B, i.e., a grass plate, and a reflective optical thin film 19 formed on the front major surface of the base 11B facing the projection lens unit 8G and the rear-projection screen 1, and FIG. 54b shows a reflecting mirror 11 comprising a base 11B, i.e., a grass plate, and a reflecting optical film 19 formed on the back major surface of the base 11B opposite the front major surface.

In the reflection mirror of FIG. 54b, multiple reflection occurs between the the front and back major surfaces of the base 11B to expand the incident light rays 14' and, consequently, the image cannot be satisfactorily focused on the rear-projection screen 1.

On the other hand, in the reflection mirror 11 of FIG. 54a, the front major surface coated with the reflective optical thin film 19 reflects the incident light rays 14' and multiple reflection does not occur between the front and back major surfaces and, consequently, the image can be satisfactorily focused on the rear-projection screen 1.

As is apparent form the foregoing description, according to the present invention, light rays projected by the video sources, such as projection CRTs, travels through the projection lens units and fall on the rear-projection screen, the light rays are diffused horizontally by the vertically elongate lenticular lenses forming the entrance surface and the exit surface of the lenticular lens sheet, and the light rays are diffused vertically primarily by the horizontally elongate lenticular lenses forming the entrance surface or the exit surface of the Fresnel lens sheet or the horizontally elongate lenticular lenses forming the entrance surface of the light absorbing sheet, or by the combined light diffusing effect of these horizontally elongate lenticular lenses. The horizontally elongate lenticular lenses having a relatively small radius of curvature enhances the vertical directional characteristics of the rear-projection screen and increases the vertical angular range of visibility.

Since the vertical directional characteristics of the rear-projection screen can be enhanced sufficiently by the horizontally elongate lenticular lenses of the Fresnel lens sheet and those of the light absorbing sheet, the lenticular lens sheet and the light absorbing sheet need not contain any light diffusing material or may contain only a very small amount of the light diffusing material. Accordingly, the image is not obscured by the light diffusing effect of the light diffusing material and the image can be focused satisfactorily. Since there is only a little possibility of scattering the incident light rays and the ambient light, such as illuminating light, by the light diffusing material and stray rays are produced scarcely, the image can be displayed in high brightness and high contrast on the rear-projection screen.

Since the semitransparent, colored light absorbing sheet is disposed next to the lenticular lens sheet with respect to the direction of travel of the light rays or the semitransparent, colored lenticular lens sheet is used, the reflection loss ratio of the ambient light is greater than that of the incident light rays and hence the rear-projection screen displays the image in improved contrast.

Since the Fresnel lens sheet is formed in a relatively small thickness approximately equal to that of the lenticular lens sheet so that the horizontally elongate lenticular lenses forming the entrance surface of the Fresnel lens sheet and the vertically elongate lenticular lenses forming the entrance surface of the lenticular lens sheet are disposed close to each other, the origin of horizontal divergence of the light rays and the origin of vertical divergence of the light rays are close to each other, so that the image can be satisfactorily focused on the rear-projection screen even if the vertical directional characteristics of the rear-projection screen are enhanced.

Since the rear-projection screen is provided with the light absorbing sheet having a relatively large thickness and the Fresnel lens sheet having a thickness smaller than that of the Fresnel lens sheet of the prior art rear-projection screen, ghost images resulting from the unnecessary reflection of light rays by the Fresnel lens forming the exit surface of the Fresnel lens sheet can be obscured, and the image can be satisfactorily focused when the entrance surface of the Fresnel lens sheet is formed by the horizontally elongate lenticular lenses.

Furthermore, if the light rays are diffused vertically only by the horizontally elongate lenticular lenses forming the entrance surface of the light absorbing sheet, the focusing characteristics are satisfactory even if the vertical directional characteristics are enhanced.

Still further, When the exit surface of the light absorbing sheet or the lenticular lens sheet is finished by a glare-proof process, the reflection of matters on the viewing side and the ambient light on the rear-projection screen can be prevented. When the exit surface of the light absorbing sheet or the lenticular lens sheet is finished by an antistatic process, the static attraction of dust to the exit surface can be prevented. When the exit surface of the light absorbing sheet or the lenticular lens sheet is finished by a surface hardening process, the resistance of the exit surface against damages resulting from the impingement of matters on the exit surface can be enhanced.

What is claimed is:

1. A rear-projection screen for a rear-projection image display having a video source, comprising: a Fresnel lens sheet disposed on the side of the video source; and a lenticular lens sheet disposed on the viewing side:
   wherein the Fresnel lens sheet has a first entrance surface formed by contiguously and vertically arranging a plurality of horizontally elongate lenticular lenses having a convex, vertical cross section convex toward the video source, and an exit surface having the shape of a convex Fresnel lens, and the lenticular lens sheet has a second entrance surface formed by contiguously and horizontally arranging a plurality of first vertically elongate lenticular lenses;
   each of the horizontally elongate lenticular lenses forming the entrance surface of said Fresnel lens sheet having a convex, vertical cross section convex toward the video source, and meeting an inequality:

$$l_0 \geq 2 l_1$$

where $l_0$ is the distance between the vertex of the convex, vertical cross section and a focal point on the optical axis where light rays are focused by a portion of the horizontally elongate lenticular lens around the optical axis, and $l_1$ is the distance between the vertex of the convex, vertical cross section and a focal point on the optical axis where light rays are focused by a portion of the horizontally elongate lenticular lens remote from the optical axis.

2. A rear-projection screen for a rear-projection image display having a video source, comprising:
   a Fresnel lens sheet disposed on a side toward the video source, the Fresnel lens sheet having an exit surface having the shape of a convex Fresnel lens and having an entrance surface formed at least along a plane of incidence by alternately, contiguously and vertically arranged horizontally elongate convex lenticular lenses convex toward the video source and horizontally elongate concave lenticular lenses concave toward the video source; and
   a lenticular lens sheet disposed on a viewing side, the lenticular lens sheet having a second entrance surface formed by contiguously and horizontally arranging a plurality of first vertically elongate lenticular lenses.

3. A rear-projection screen according to claim 1, wherein the refracting power of a portion of each of the horizontally elongate lenticular lenses forming the entrance surface of said Fresnel lens sheet, remote from the optical axis of the horizontally elongate lenticular lens is greater than that of a portion of the same around the optical axis.

4. A rear-projection screen according to claim 1, wherein each of the horizontally elongate lenticular lenses forming the entrance surface of said Fresnel lens sheet has a convex, vertical cross section convex toward the video source, and meets an inequality:

$$l_0 \geq 2 l_1$$

where $l_0$ is the distance between the vertex of the convex, vertical cross section and a focal point on the optical axis where light rays are focused by a portion of the horizontally elongate lenticular lens around the optical axis, and $l_1$ is the distance between the vertex of the convex, vertical cross section and a focal point on the optical axis where light rays are focused by a portion of the horizontally elongate lenticular lens remote from the optical axis.

5. A rear-projection screen according to claim 1, wherein each of the horizontally elongate lenticular lenses forming the entrance surface of said Fresnel lens sheet has a convex, vertical cross section convex toward the video source and symmetrical with respect to the optical axis thereof, and the second derivative of an equation $Z=f(r)$, where r is the distance between a point on the convex contour of the convex, vertical cross section and the optical axis and Z is the distance in parallel direction to the optical axis between the same point on the convex contour and the vertex of the convex, vertical cross section, defining the convex contour of the convex, vertical cross section is variable.

6. A rear-projection screen for a rear-projection image display having a video source, comprising: a Fresnel lens sheet disposed on the side of the video source; and a lenticular lens sheet disposed on the viewing side;
   wherein the Fresnel lens sheet has an entrance surface having the shape of a convex Fresnel lens, and an exit surface formed by vertically and contiguously arranging a plurality of horizontally elongate lenticular lenses, and the lenticular lens sheet has an entrance surface formed by horizontally and contiguously arranging a plurality of first vertically elongate lenticular lenses.

7. A rear-projection screen according to claim 6, wherein the exit surface of said Fresnel lens sheet is formed by alternately, contiguously and vertically arranging horizontally elongate convex lenticular lenses convex toward the video source and horizontally elongate concave lenticular lenses concave toward the video source.

8. A rear-projection screen according to claim 6, wherein the refracting power of a portion of each of the horizontally elongate lenticular lenses forming the exit surface of said Fresnel lens sheet, remote from the optical axis of the horizontally elongate lenticular lens is smaller than that of a portion of the same around the optical axis.

9. A rear-projection screen according to claim 6, wherein each of the horizontally elongate lenticular lenses forming the exit surface of said Fresnel lens sheet has a convex, vertical cross section convex toward the viewing side, and meets an inequality:

$l_0 \geq 2l_1$ where $l_0$ is the distance between the vertex of the convex, vertical cross section and a focal point on the optical axis where light rays are focused by a portion of the horizontally elongate lenticular lens around the optical axis, and $l_1$ is the distance between the vertex of the convex, vertical cross section and a focal point on the optical axis where light rays are focused by a portion of the horizontally elongate lenticular lens remote from the optical axis.

10. A rear-projection screen according to claim 6, wherein each of the horizontally elongate lenticular lenses forming the exit surface of said Fresnel lens sheet has a convex, vertical cross section convex toward the viewing side and symmetrical with respect to the optical axis thereof, and the second derivative of an equation $Z=f(r)$, where r is the distance between a point on the convex contour of the convex, vertical cross section and the optical axis and Z is the distance in parallel direction to the optical axis between the same point on the convex contour and the vertex of the convex, vertical cross section, defining the convex contour of the convex, vertical cross section is variable.

11. A rear-projection screen according to claim 1, wherein the exit surface of said lenticular lens sheet is finished by subjecting the same to at least one of a glare-proof process, an antistatic process and a surface hardening process.

12. A rear-projection screen according to claim 1, wherein said lenticular lens sheet is a semitransparent, colored sheet.

13. A rear-projection screen according to claim 1, wherein said lenticular lens sheet contains a light diffusing material.

14. A rear-projection screen according to claim 1, wherein a semitransparent, colored light absorbing sheet is disposed on the exit side of said lenticular lens sheet.

15. A rear-projection screen according to claim 14, wherein said light absorbing sheet has an entrance surface formed by contiguously and vertically arranging a plurality of horizontally elongate lenticular lenses.

16. A rear-projection screen according to claim 15, wherein the entrance surface of said light absorbing sheet is formed by alternately, contiguously and vertically arranging horizontally elongate convex lenticular lenses convex toward the video source and horizontally elongate concave lenticular lenses concave toward the video source.

17. A rear-projection screen for a rear-projection image display having a video source, comprising: a Fresnel lens sheet disposed nearest to the video source; a lenticular lens sheet disposed next to the Fresnel lens sheet on the viewing side; and a light absorbing sheet disposed next to the lenticular lens sheet on the viewing side;
wherein at least either the entrance surface or the exit surface has the shape of a Fresnel lens, the lenticular lens sheet has an entrance surface formed by contiguously and horizontally arranging a plurality of first vertically elongate lenticular lenses, and the light absorbing sheet has an entrance surface formed by contiguously and vertically arranging a plurality of horizontally elongate lenticular lenses.

18. A rear-projection screen according to claim 17, wherein the entrance surface of said light absorbing sheet is formed by alternately, contiguously and vertically arranging horizontally elongate convex lenticular lenses convex toward the video source and horizontally elongate concave lenticular lenses concave toward the video source.

19. A rear-projection screen according to claim 17, wherein the refracting power of a portion of each of the horizontally elongate lenticular lenses forming the entrance surface of said light absorbing sheet, remote from the optical axis of the horizontally elongate lenticular lens is greater than that of a portion of the same around the optical axis.

20. A rear-projection screen according to claim 17, wherein each of the horizontally elongate lenticular lenses forming the entrance surface of said light absorbing sheet has a convex, vertical cross section convex toward the video source, and meets an inequality:

$l_0 \geq 2l_1$ where $l_0$ is the distance between the vertex of the convex, vertical cross section and a focal point on the optical axis where light rays are focused by a portion of the horizontally elongate lenticular lens around the optical axis, and $l_1$ is the distance between the vertex of the convex, vertical cross section and a focal point on the optical axis where light rays are focused by a portion of the horizontally elongate lenticular lens remote from the optical axis.

21. A rear-projection screen according to claim 17, wherein each of the horizontally elongate lenticular lenses forming the entrance surface of said light absorbing sheet has a convex, vertical cross section convex toward the video source and symmetrical with respect to the optical axis thereof, and the second derivative of an equation $Z=f(r)$, where r is the distance between a point on the convex contour of the convex, vertical cross section and the optical axis and Z is the distance in parallel direction to the optical axis between the same point on the convex contour and the vertex of the convex, vertical cross section, defining the convex contour of the convex, vertical cross section is variable.

22. A rear-projection screen according to claim 14, wherein the entrance surface of said light absorbing sheet is finished by a glare-proof process.

23. A rear-projection screen according to claim 14, wherein the exit surface of said light absorbing sheet is finished by at least one of a glare-proof process, an antistatic process and a surface hardening process.

24. A rear-projection screen according to claim 14, wherein at least either said lenticular lens sheet or said light absorbing sheet contains a light diffusing material.

25. A rear-projection screen according to claim 14, wherein the flexural rigidity of said light absorbing sheet is the highest among those of said Fresnel lens sheet, said lenticular lens sheet and said light absorbing sheet.

26. A rear-projection screen according to claim 14, wherein the thickness of said light absorbing sheet is the greatest among those of said Fresnel lens sheet, said lenticular lens sheet and said light absorbing sheet.

27. A rear-projection screen according to claim 1, wherein a plurality of vertically elongate light absorbing strips of a finite width are arranged on the exit surface of said lenticular lens sheet substantially opposite to the boundaries between the adjacent first vertically elongate lenticular lenses, respectively.

28. A rear-projection screen according to claim 1, wherein the exit surface of said lenticular lens sheet is formed by horizontally arranging a plurality of second vertically elongate lenticular lenses substantially opposite to the first vertically elongate lenticular lenses, respectively, and horizontally arranging a plurality of vertically elongate light absorbing strips of a finite width on the boundaries between the adjacent second vertically elongate lenticular lenses, respectively.

29. A rear-projection screen according to claim 1, wherein the refracting power of a portion of each of the first vertically elongate lenticular lenses forming the entrance surface of said lenticular lens sheet, remote from the optical axis of the first vertically elongate lenticular lens is smaller than that of a portion of the same around the optical axis.

30. A rear-projection screen according to claim 1, wherein each of the first vertically elongate lenticular lenses forming the entrance surface of said lenticular lens sheet has a convex, horizontal cross section convex toward the video source and symmetrical with respect to the optical axis thereof, and the sign of the second derivative of an equation $Z=f(r)$, where r is the distance between a point on the convex contour of the convex, horizontal cross section and the optical axis and Z is the distance in parallel directional to the optical axis between the same point on the convex contour and the vertex of the convex, horizontal cross section, defining the convex contour of the convex, horizontal cross section for a point on the convex contour near the optical axis and the sign of the second derivative of the equation $Z=f(r)$ for a point on the convex contour remote from the optical axis are different from each other.

31. A rear-projection screen according to claim 28, wherein each of the second vertically elongate lenticular lenses forming the exit surface of said lenticular lens sheet has a convex, horizontal cross section convex toward the viewing side and symmetrical with respect to the optical axis thereof, and the sign of the second derivative of an equation $Z=F(r)$, where r is the distance between a point on the convex contour of the convex, horizontal cross section and the optical axis and Z is the distance in parallel direction to the optical axis between the same point on the convex contour and the vertex of the convex, horizontal cross section, defining the convex contour of the convex, horizontal cross section for a point on the convex contour near the optical axis and the sign of the second derivative of the equation $Z=f(r)$ for a point on the convex contour remote from the optical axis are different from each other.

32. A rear-projection screen according to claim 1, wherein said Fresnel lens sheet and said lenticular lens sheet meet an inequality:

$$t_F \leq 2.5 t_L$$

where $t_F$ is the thickness of said Fresnel lens sheet and $t_L$ is the thickness of said lenticular lens sheet.

33. A rear-projection screen according to claim 1, wherein the entrance surface of said Fresnel lens sheet is finished by a glare-proof process.

34. A rear-projection screen according to claim 1, wherein the entrance surface of said lenticular lens sheet is finished by a glare-proof process.

35. A rear-projection image display provided with a rear-projection screen according to claim 1.

36. A rear-projection image display comprising: a rear-projection screen according to claim 1; video sources; projection lens units disposed respectively in front of the video sources to magnify images projected by the corresponding video sources and to project the magnified images on the rear side of the rear-projection screen; and connectors respectively connecting the video sources and the corresponding projection lens units;
wherein the surface on the side of the video source of a lens among the component lenses of each projection lens unit, nearest to the video source is a convex surface and the surface on the rear-projection screen of the same lens is a concave surface, a space within each connector formed between the video source and the convex surface of the lens of the projection lens unit, nearest to the video source is filled up with a liquid refrigerant.

37. A rear-projection image display comprising: a rear-projection screen according to claim 1; video sources; projection lens units disposed respectively in front of the video sources to magnify images projected by the corresponding video sources and to project the magnified images; couplers respectively connecting the video sources and the corresponding projection lens units; and a reflecting mirror disposed so as to reflect the images projected by the video sources and magnified by the lens units on the rear side of the rear-projection screen;
wherein the surface on the side of the video source of a lens among the component lenses of each projection lens unit, nearest to the video source is a convex surface and the surface on the rear-projection screen of the same lens is a concave surface, a space within each coupler formed between the video source and the convex surface of the lens of the projection lens unit, nearest to the video source is filled up with a liquid coolant, and the reflecting mirror comprises a base, and a reflective optical thin film formed over the surface of the base facing the projection lens units and the rear-projection screen.

* * * * *